US011526261B1

(12) United States Patent
Leach et al.

(10) Patent No.: US 11,526,261 B1
(45) Date of Patent: Dec. 13, 2022

(54) SYSTEM AND METHOD FOR AGGREGATING AND ENRICHING DATA

(71) Applicant: KPMG LLP, New York, NY (US)

(72) Inventors: James Arthur Leach, New York, NY (US); Shuo Tian, New York, NY (US); David Geiger, Falls Church, VA (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 17/675,560

(22) Filed: Feb. 18, 2022

(51) Int. Cl.
| G06F 3/048 | (2013.01) |
| G06F 3/0484 | (2022.01) |
| G06Q 10/04 | (2012.01) |
| G06F 17/18 | (2006.01) |
| G06F 3/0482 | (2013.01) |
| G06F 9/451 | (2018.01) |

(52) U.S. Cl.
CPC .......... G06F 3/0484 (2013.01); G06F 3/0482 (2013.01); G06F 9/451 (2018.02); G06F 17/18 (2013.01); G06Q 10/04 (2013.01); G06F 2203/04803 (2013.01)

(58) Field of Classification Search
CPC .......... G06N 20/00; G06N 20/20; G06N 5/02; G06N 5/046; G06F 16/248; G06F 17/18; G06F 3/04842; G06F 3/0484; G06F 3/0482; G06F 2203/04803
See application file for complete search history.

(56) References Cited

U.S. PATENT DOCUMENTS

| 7,480,640 | B1 * | 1/2009 | Elad ........................ | G06Q 10/10 |
| | | | | 706/14 |
| 7,730,003 | B2 * | 6/2010 | Pinto ...................... | G06Q 10/04 |
| | | | | 703/22 |
| 7,933,762 | B2 * | 4/2011 | Pinto ...................... | G05B 17/02 |
| | | | | 703/22 |
| 10,255,085 | B1 * | 4/2019 | Valsaraj ................. | G06F 16/904 |
| 10,552,002 | B1 * | 2/2020 | Maclean ................. | G06N 20/00 |
| 10,607,150 | B2 * | 3/2020 | Sainani .................... | H04L 41/20 |
| 10,719,301 | B1 * | 7/2020 | Dasgupta ............ | G06F 11/3688 |
| 10,884,039 | B2 * | 1/2021 | Siebel ..................... | G06Q 50/06 |
| 10,963,788 | B1 * | 3/2021 | Parker .................... | G06N 20/00 |
| 10,983,682 | B2 * | 4/2021 | Leonard ................ | G06T 11/206 |
| 11,037,685 | B2 * | 6/2021 | Lefkofsky ............ | G06K 9/6256 |

(Continued)

*Primary Examiner* — Steven B Theriault

(74) *Attorney, Agent, or Firm* — Nelson Mullins Riley & Scarborough LLP; Anthony A. Laurentano

(57) ABSTRACT

An intelligent forecasting system that includes sources of financial and non-financial input data and a user interface generator for generating user interfaces having window elements that display the input data. The window element includes a persistent navigation pane element having vertically stacked actuatable navigation soft buttons for accessing one or more portions of an intelligent forecasting. The navigation soft buttons include, among other buttons, an Outlier Treatment soft button for processing the input data by applying thereto a statistical processing model to detect outliers in the input data, a Model Selection soft button for selecting a statistical forecasting model to apply to the input data, a Signal Explorer soft button for selecting a signal transformation method for transforming the input data, a Model Prediction soft button for selecting one of the statistical forecasting models to apply to the input data, and a Simple Prediction soft button for automatically generating forecasts.

34 Claims, 24 Drawing Sheets

(56) References Cited

U.S. PATENT DOCUMENTS

| | | | |
|---|---|---|---|
| 11,100,395 B2* | 8/2021 | Parker | G06F 17/17 |
| 11,222,077 B1* | 1/2022 | Martin | G06N 20/10 |
| 2005/0216315 A1* | 9/2005 | Andersson | G06Q 40/00 |
| | | | 705/4 |
| 2006/0247859 A1* | 11/2006 | Ladde | G06Q 10/00 |
| | | | 702/3 |
| 2007/0112889 A1* | 5/2007 | Cook | G06F 16/244 |
| 2008/0249999 A1* | 10/2008 | Renders | G06F 16/355 |
| 2012/0197608 A1* | 8/2012 | Pinto | G06Q 40/025 |
| | | | 703/2 |
| 2014/0122370 A1* | 5/2014 | Jamal | G06Q 30/0201 |
| | | | 705/348 |
| 2016/0162519 A1* | 6/2016 | Stowe | G06F 17/40 |
| | | | 707/755 |
| 2017/0017708 A1* | 1/2017 | Fuchs | G06F 16/288 |
| 2017/0243132 A1* | 8/2017 | Sainani | H04L 41/20 |
| 2018/0040064 A1* | 2/2018 | Grigg | H04L 41/147 |
| 2018/0285900 A1* | 10/2018 | Bhattacharyya | G06Q 30/0202 |
| 2018/0330261 A1* | 11/2018 | Melli | G06F 17/18 |
| 2019/0332964 A1* | 10/2019 | Fokoue-Nkoutche | G06N 20/20 |
| 2019/0333645 A1* | 10/2019 | Fokoue-Nkoutche | G16H 50/80 |
| 2019/0394083 A1* | 12/2019 | Sglavo | H04L 41/0663 |
| 2020/0143246 A1* | 5/2020 | Li | G06F 16/2477 |
| 2020/0160229 A1* | 5/2020 | Atcheson | G06N 20/00 |
| 2020/0210393 A1* | 7/2020 | Beaver | G06F 17/18 |
| 2021/0042382 A1* | 2/2021 | Freeman | G06K 9/6226 |
| 2021/0056451 A1* | 2/2021 | Han | G06N 7/005 |
| 2021/0110298 A1* | 4/2021 | Bisson-Krol | G06F 3/04845 |
| 2021/0174207 A1* | 6/2021 | Parker | G06N 3/08 |
| 2021/0256406 A1* | 8/2021 | Mueller | G06K 9/6226 |
| 2021/0342836 A1* | 11/2021 | Cella | G06K 9/6218 |
| 2022/0004897 A1* | 1/2022 | Jadon | G06N 5/04 |
| 2022/0059240 A1* | 2/2022 | Schaeffer | G16B 45/00 |
| 2022/0292308 A1* | 9/2022 | Schwiep | G06K 9/6261 |

* cited by examiner

SYSTEM AND METHOD FOR AGGREGATING AND ENRICHING DATA

BACKGROUND OF THE INVENTION

The present invention is directed to data aggregation and enrichment systems, and in particular is directed to systems and methods for aggregating, enriching and normalizing data, and the associated graphical user interfaces.

Today, enterprises, such as companies, generate vast amounts of data during their normal business operations. The generated data typically includes many different types of data, including for example financial data, human resource data, customer-related data, environmental data, and the like. The generation of the vast amounts of data makes it challenging for companies to properly and efficiently capture, aggregate and organize the data so that the data can be later used in meaningful ways. Further, the generated data is typically stored in disparate systems across many different servers, which can be at physically remote locations. The data can be stored, for example, in different types of databases having different inherent structures. As such, the data when extracted from the different database types is inherently incompatible with each other.

Traditional methodologies exist for trying to reconcile the different types of data extracted from the different database types. These methods include the brute force creation of specific software configured for translating the different types of data so as to be compatible with one or more different types of databases. A drawback of these types of methods includes the extensive resources and expertise that are required to create the software to translate the data. As such, enterprises inherently do not perform these types of activities except in limited situations because of the costs associated with this endeavor.

Other conventional methodologies include the use of common data models for creating and placing the data into a more uniform structure that has a defined set of attributes and entities. A drawback of this approach is that most databases do not employ common data models. Further, the meager few that do exist oftentimes do not employ a proper and complete set of identities and attributes that are needed for specific data generated by the enterprise. As such, the common data models themselves oftentimes require a relatively detailed degree of customization, which requires a high level of expertise and is hence resource intensive.

Another drawback of conventional data analysis systems is that data scientists oftentimes have to create custom software to perform selected forecasting tasks. This is expensive and time consuming.

SUMMARY OF THE INVENTION

The present invention is directed to a system and method for allowing a user via a series of user interfaces generated by a user interface generator to select one or more statistical forecasting models and methods, train time series models, generate predictions from the processed data, identify data outliers, and extract useful information about data signals without having to create custom software to perform these functions. The system and method of the present invention can be applied to any time-series data sets, and the system and method allows the user to train daily, weekly, quarterly, and monthly time series models in a modularized code-based system that generates a user interface framework for the user to employ, thus significantly simplifying the overall process The intelligent forecasting machine language unit and associated software application can thus allow the user to train the time series models, make predictions based on the model data, identify selected outliers, and extract useful information without writing any software code. The software application can also automate model selection, parameter tuning, signal selection, and signal evaluation in a single data pipeline, which minimizes the user workload, using a series of custom user interfaces. The application can employ traditional statistical techniques and time series models to replace potential outliers in a given input data. Further, the software application can enable the user, via the user interfaces, to overwrite an outlier replacement value. The user interfaces can display to the user in an organized manner the machine language or model data that is generated by the intelligent forecasting machine language unit. The user interfaces can allow the user to input additional data to generate insights and predictions based on the source data without having to separately and independently generate software code to implement the desired functionality. The application can be used across any selected number and type of time-series datasets, and the system allows the user to train the models on or over any selected period of time, such as daily, weekly, quarterly, and monthly time series models.

The present invention is directed to an intelligent forecasting system that includes one or more sources of financial and non-financial data, an electronic device having a processor for processing one or more of the financial and non-financial data to form input data, a storage element for storing the input data, and a user interface generator for generating a plurality of user interfaces having one or more window elements that display selected portions of the processed input data. The window element of one or more of the user interfaces includes a persistent navigation pane element formed along a left side of the window element having a plurality of vertically stacked actuatable navigation soft buttons for accessing one or more portions of an intelligent forecasting sequence having a plurality of forecasting steps. The navigation soft buttons include a Data Upload soft button for allowing a user, when actuated, to upload one or more files having at least a portion of the input data; an Outlier Treatment soft button for allowing the user, when actuated, to process at least a portion of the input data by applying thereto one or more statistical processing models to detect one or more outliers in the input data having an outlier value associated therewith and to replace one or more of the outlier values with a replacement value; a Model Selection soft button for allowing the user, when actuated, to select one or more statistical forecasting models to apply to the input data; a Signal Explorer soft button for allowing the user, when actuated, to select one or more signal transformation methods for processing and transforming the input data; a Signal Selection soft button for allowing the user, when actuated, to select one or more signals to incorporate into the input data; a Model Prediction soft button for allowing the user, when selected, to select one or more of the statistical forecasting models to apply to the input data; a Simple Prediction soft button for allowing the user to automatically generate a plurality of forecasts by processing the data using one or more of the statistical forecasting models; and a pane element for simultaneously displaying along with the navigation pane element and the plurality of navigation soft buttons information associated with one or more of the navigation soft buttons and one or more of the plurality of forecasting steps.

When the Outlier Treatment (OT) soft button is actuated by the user, then the user interface generator generates a first user interface having first and second horizontally aligned OT top pane regions and an OT bottom pane region disposed below the first and second OT top pane regions. The first OT top pane region includes for display on the first user interface a plurality of drop down menu elements that includes a first Target drop down menu element for allowing a user to select from a drop down menu a type of input data to be processed to form an input data type; a Detection Model drop down menu element for allowing a user to select from a drop down menu one or more statistical processing models to apply to the input data type that is selected in the first Target drop down menu element so as to detect and identify one or more outlier data points in the input data type, wherein each of the outlier data points has an associated data point value; and a Treatment Model drop down menu element for allowing a user to select from a drop down menu one or more statistical treatment models to apply to the one or more outlier data points to treat the outlier data points by replacing the outlier data point value with a replacement data point value.

The statistical processing model that is selectable in the Detection Model drop down menu element includes one or more of a Bayesian structural time series (BSTS) model, a Quartile Analysis model, a TBATS model, an ETS model, a Facebook (FB) Prophet model, and an auto regressive integrated moving average (ARIMA) model.

The first OT top pane region further includes an indicating element for visually indicating the status of one or more selected features of the top pane region. The indicating element includes a horizontally extending scale element having a plurality of predetermined increments or units formed thereon. The first OT top pane region also includes a first plurality of selectable radio buttons disposed below the indicating element that are indicative of a selected data time period. The data time periods can include daily, weekly, monthly and quarterly data time periods.

The second OT top pane region is disposed horizontally adjacent to and aligned with the first OT top pane region and is configured for displaying a table element having tabulated therein selected time data related to the first plurality of selectable radio buttons and one or more of the input data types selected by the user via the first Target drop down menu element.

The OT bottom pane region is disposed below the first and second OT top pane regions and is configured to display a plot graphically illustrating the input data type selected by the first Target drop down menu element over a selected period of time. The OT bottom pane region includes a second plurality of actuatable soft buttons that are directed to the selected period of time that is associated with the plot.

According to the present invention, when the Model Selection (MS) soft button of the navigation pane element is actuated by the user, the user interface generator generates a second user interface having first and second horizontally aligned MS top pane regions and an MS bottom pane region disposed vertically below the first and second MS top pane regions. The first MS top pane region includes for display on the second user interface a plurality of drop down menu elements including a second Target drop down menu element for allowing a user to select the input data to be processed; a Model drop down menu element for allowing a user to select one or more statistical forecasting models to apply to the input data selected in the second Target drop down menu element so as to generate predictions based on the input data, a Display Model drop down menu element for allowing a user to select a type of statistical forecasting model to apply to the input data and to display in the bottom pane region; a Rolling Window Schema soft button horizontally aligned with the Display Model drop down menu element that allows the user, when actuated, to display a first action box for allowing the user to enter one or more selections; and a Forecast Period field box disposed vertically below the plurality of drop down menu elements, wherein the field box allows the user to enter a selected number of time periods within the field box.

The first MS top pane region also includes a plurality of selectable radio buttons disposed horizontally adjacent to the Forecast Period field box for allowing the user to enter a selected data time period. The data time periods can include daily, weekly, monthly and/or quarterly data time periods. The first MS top pane region further includes a selectable sliding soft button for allowing the user to apply, when actuated, one or more tuning parameters to the target data. The second MS top pane region is configured to display a table configured to tabulated selected information associated with the input data. The MS bottom pane region is configured to include a plot of an output of the statistical forecasting model selected in the Display Model drop down menu element when applied to the input data selected by the second Target drop down menu element over a selected period of time.

According to the present invention, when the Rolling Window Schema soft button is actuated by the user, the user interface generator generates a third user interface that includes for display on the third user interface the first action box that is simultaneously displayed with the navigation pane element. The first action box can include a Test Range field box for allowing the user to enter a selected date period to define a date test range of a rolling window; a Window field box disposed vertically below the Test Range field box for allowing the user to define or select one or more parameters associated with the rolling window; a Skip field box disposed horizontally adjacent to the Window field box for allowing the user to designate a portion of the rolling window to skip; a Tuning Measure drop down menu element disposed vertically below the Window field box for allowing the user to select a tuning model to apply to the input data for determining a prediction accuracy of the selected statistical forecasting model selected by the user from the Model drop down menu element; and a Report Type drop down menu element disposed horizontally adjacent to the Tuning Measure drop down menu element and vertically below the Skip field box for allowing the user to select a report type for reporting the input data.

The user interface generator can also generate a fourth user interface when the user enters the selections in the second Target drop down menu element and in the Model and Display Model drop down menu elements. The fourth user interface includes first and second horizontally aligned and adjacent top pane regions and a bottom pane region disposed vertically below the first and second top pane regions. The first top pane region includes for display on the fourth user interface a graphical element that graphs a comparison of an accuracy of a plurality of statistical forecasting models relative to each other. The second pane region is horizontally adjacent to and aligned with the first pane region and is configured to display a first table that tabulates information associated with the graph in the first top pane region and a second table that tabulates information associated with one or more of the selected forecasting accuracy models. The bottom pane region is configured to display a plot that graphically represents information associated with the input data types selected by the user via the second Target drop down menu element and one or more of the statistical forecasting models selected by the user via the Model drop down menu element.

According to the present invention, when the Signal Explorer (SE) soft button of the navigation pane element is actuated by the user, the user interface generator generates a fourth user interface that includes first and second horizontally adjacent and aligned SE top pane regions and an SE bottom pane region disposed vertically below the first and second SE top pane regions. The first SE top pane region includes for display on the fourth user interface a plurality of drop down menu elements including a third Target drop down menu element for allowing the user to select the input data to be processed, wherein the input data also includes a plurality of signals; a Method drop down menu element for allowing the user to select one or more correlation methods to apply to the input data selected in the third Target drop down menu element to determine a value indicative of a strength of the correlation between the plurality of signals in the input data; a Signal Transformation soft button disposed vertically below the Method drop down menu element for allowing the user, when actuated, to generate a second action box that allows the user to enter one or more parameters associated with a signal transformation of the plurality of signals; and a Returned Signal field box disposed vertically below the Signal Transformation soft button for allowing the user to enter a number of signals for processing by the one or more correlation methods selected via the Method drop down menu element. The first SE top pane region further comprises a plurality of selectable radio buttons disposed horizontally adjacent to the returned signal field box for allowing the user to enter a selected data time period for analysis. The data time periods can include daily, weekly, monthly and/or quarterly data time periods.

The second SE top pane region includes a table having a first column listing one or more of the plurality of signals selected by the user via the Returned Signal field box, and a second column listing one or more correlation values generated by the correlation method selected by the user via the Method dop down menu element. The SE bottom pane element includes a plot of one or more of the plurality of signals selected by the user via the Returned Signal field box and one or more correlation values generated by the correlation method selected by the user via the Method dop down menu element.

According to the present invention, when the Signal Explorer soft button of the navigation pane element is actuated by the user, the user interface generator generates a fifth user interface having the second action box simultaneously displayed with the navigation pane element. The second action box includes a Transformation Type drop down menu element for allowing the user to select one or more transformation methods to apply to the data; a first horizontal plurality of field boxes disposed below the Transformation Type drop down menu element for allowing the user to enter selected metrics associated with the transformation method selected by the user via the transformation type drop down menu element; a second horizontal plurality of field boxes disposed vertically below the first horizontal plurality of field boxes for allowing the user to enter selected metrics associated with the transformation method selected by the user via the transformation type drop down menu element; a Difference Type drop down menu element disposed vertically below the second horizontal plurality of field boxes for allowing the user to select a difference type to be applied to the input data; and a Difference Prior field box disposed horizontally adjacent to the Difference Type drop down menu element for allowing the user to enter a prior difference value therein to be applied to the input data.

Upon actuation of the Signal Selection (SS) soft button in the navigation pane element, the user interface generator generates a sixth user interface having first and second horizontally aligned SS top pane regions and an SS bottom pane region disposed vertically below the first and second SS top pane regions. The first SS top pane region includes for display on the sixth user interface a plurality of drop down menu elements including a second Model drop down menu element for allowing the user to select one or more statistical forecasting models to apply to the input data; a Trend drop down menu element disposed vertically below the second Model drop down menu element for allowing the user to select a type of trend to apply to the input data; an Autoregression drop down menu element disposed horizontally adjacent to the Trend drop down menu element for allowing the user to determine whether an autoregression technique is applied to the input data; a second Rolling Window Schema soft button disposed vertically below the Trend drop down menu element and the Autoregression drop down menu element for allowing the user, when actuated, to display a third action box for entering information associated with the statistical forecasting model; and a second Forecast Period field box disposed vertically below the Rolling Window Schema soft button for allowing the user to enter a selected number of time periods within the field box for the rolling window.

The first SS top pane element can also include a plurality of selectable radio buttons disposed horizontally adjacent to the forecast period field box for allowing the user to enter a selected data time period. The data time periods can include daily, weekly, monthly and/or quarterly data time periods. The first SS top pane region further includes a second selectable sliding soft button for allowing the user to apply, when actuated, a parallel process to the data.

According to the present invention. when the second Rolling Window Schema soft button is actuated by the user, the user interface generator generates a seventh user interface for displaying a third action box for allowing the user to select one or more parameters associated with the rolling window. The third action box can include a second Test Range soft button for allowing the user to input date ranges that define the temporal extents of the rolling window; a plurality of horizontally aligned field boxes disposed vertically below the second Test Range soft button, wherein the plurality of aligned field boxes includes a second Window field box disposed vertically below the Test Range field box for allowing the user to define or select one or more parameters associated with the rolling window, a second Skip field box disposed horizontally adjacent to the Window field box for allowing the user to designate a portion of the rolling window to skip, and a Threshold field box for setting a threshold value associated with the rolling window; a first plurality of horizontally arranged and aligned drop down menu elements disposed below the plurality of field boxes, wherein the first plurality of drop down menu elements includes a Selection Measure drop down menu element for allowing the user to select one or more forecasting accuracy models, and a second Report Type drop down menu element for allowing the user to select a type of report; and a second plurality of horizontally arranged and aligned drop down menu elements disposed below the first plurality of drop down menu elements, wherein the second plurality of drop down menu elements includes a Selection Set drop down menu element for allowing the user to select a set type, and a Signal Forecast drop down menu element for allowing the user to select a signal forecast condition.

According to the present invention, when the Model Prediction (MP) soft button is actuated, the user interface generator generates an eighth user interface that includes first and second horizontally aligned MP top pane regions and an MP bottom pane region disposed below the first and second MP top pane regions. The first MP top pane region includes for display on the eighth user interface a plurality of drop down menu elements including a fourth Target drop down menu element for allowing the user to select the type of data to be processed as the input data; a third Model drop down menu element disposed below the fourth Target drop down menu element for allowing the user to select one or more statistical forecasting models to apply to the input data; a second Trend drop down menu element disposed vertically below the third Model drop down menu element for allowing the user to select a type of trend to apply to the input data; and a second Autoregression drop down menu element disposed horizontally adjacent to and aligned with the second Trend drop down menu element for allowing the user to determine whether an autoregression technique is to be applied to the input data. The first MP top pane region further includes a third Forecast Period field box disposed vertically below the second Trend drop down menu element for allowing the user to enter a selected number of time periods within the field box for the rolling window.

The first MP top pane region can also include a plurality of selectable radio buttons disposed horizontally adjacent to and aligned with the third Forecast Period field box for allowing the user to select a data time period for processing the input data. The data time periods associated with the fourth plurality of selectable radio buttons can include daily, weekly, monthly and/or quarterly data time periods. The second MP top pane region can be configured for displaying a table element having tabulated therein time data related to the forecast periods selected by the user in the third Forecast Period field box and the fourth plurality of selectable radio buttons and prediction information related to the input data selected by the fourth Target drop down menu element and generated by the statistical forecasting model selected by the user by the third Model drop down menu element. The MP bottom pane region can be configured to display a plot graphically illustrating model prediction data over a selected period of time, and wherein the MP bottom pane region includes a plurality of actuatable soft buttons that are directed to a time frame that is associated with the plot.

According to the present invention, when the Simple Prediction (SP) soft button is actuated, the user interface generator generates a ninth user interface that includes first and second horizontally aligned SP top pane regions and an SP bottom pane region disposed below the first and second SP top pane regions. The first SP top pane region includes for display on the ninth user interface a fifth Target drop down menu element for allowing the user to select the type of data to be processed as the input data; a fourth Model drop down menu element disposed below the fifth Target drop down menu element for allowing the user to select one or more statistical forecasting models to apply to the input data; and a Prediction Date field box for allowing the user to enter a date for which a prediction is requested. The second SP top pane region is configured for displaying a table element having tabulated therein time data related to the time data entered by the user in the Prediction Date field box, and a plurality of different data types selected by the user via the fifth Target drop down menu element. The SP bottom region is configured to display a plot graphically illustrating the data type over a selected period of time, and wherein the SP bottom pane region includes a plurality of actuatable soft buttons that are directed to the period of time that is associated with the plot.

The present invention is also directed to a computer implemented method that includes receiving one or more sources of financial and non-financial data to form input data, processing and storing the input data, and generating a plurality of user interfaces having one or more window elements that display selected portions of the input data. The window element of one or more of the plurality of user interfaces can include a persistent navigation pane element formed along a left side of the window element having a plurality of vertically stacked actuatable navigation soft buttons for accessing one or more portions of an intelligent forecasting sequence having a plurality of forecasting steps. The plurality of navigation soft buttons can include a Data Upload soft button for allowing a user, when actuated, to upload one or more files having at least a portion of the input data; an Outlier Treatment soft button for allowing the user, when actuated, to process at least a portion of the input data by applying thereto one or more statistical processing models to detect one or more outliers in the input data having an outlier value associated therewith and to replace one or more of the outlier values with a replacement value; a Model Selection soft button for allowing the user, when actuated, to select one or more statistical forecasting models to apply to the input data; a Signal Explorer soft button for allowing the user, when actuated, to select one or more signal transformation methods for processing and transforming the input data; a Signal Selection soft button for allowing the user, when actuated, to select one or more signals to incorporate into the input data; a Model Prediction soft button for allowing the user, when selected, to select one or more of the statistical forecasting models to apply to the input data; a Simple Prediction soft button for allowing the user to automatically generate a plurality of forecasts by processing the data using one or more of the statistical forecasting models; and simultaneously displaying a pane element along with the navigation pane element and the plurality of navigation soft buttons information associated with one or more of the navigation soft buttons and one or more of the plurality of forecasting steps.

The method of the present invention also includes generating a first user interface when the Outlier Treatment (OT) soft button is actuated by the user, wherein the first user interface includes first and second horizontally aligned OT top pane regions and an OT bottom pane region disposed below the first and second OT top pane regions. The first OT top pane region includes for display on the first user interface a plurality of drop down menu elements including a first Target drop down menu element for allowing a user to select from a drop down menu a type of input data to be processed to form an input data type; a Detection Model drop down menu element for allowing a user to select from a drop down menu one or more statistical processing models to apply to the input data type that is selected in the first Target drop down menu element so as to detect and identify one or more outlier data points in the input data type, wherein each of the outlier data points has an associated data point value; and a Treatment Model drop down menu element for allowing a user to select from a drop down menu one or more statistical treatment models to apply to the one or more outlier data points to treat the outlier data points by replacing the outlier data point value with a replacement data point value.

The method also includes providing in the first OT top pane region an indicating element for visually indicating the status of one or more selected features of the top pane region. The indicating element includes a horizontally extending scale element having a plurality of predetermined increments or units formed thereon. The second OT top pane region is disposed horizontally adjacent to and aligned with the first OT top pane region and is configured for displaying a table element having tabulated therein selected time data related to the first plurality of selectable radio buttons and one or more of the input data types selected by the user via the first Target drop down menu element. The OT bottom pane region is disposed below the first and second OT top pane regions and is configured to display a plot graphically illustrating the input data type selected by the first Target drop down menu element over a selected period of time. The OT bottom pane region includes a second plurality of actuatable soft buttons that are directed to the selected period of time that is associated with the plot.

According to the present invention, the method can also include generating a second user interface when the Model Selection (MS) soft button of the navigation pane element is actuated by the user. The second user interface includes first and second horizontally aligned MS top pane regions and an MS bottom pane region disposed vertically below the first and second MS top pane regions. The first MS top pane region includes for display on the second user interface a plurality of drop down menu elements including a second Target drop down menu element for allowing a user to select the input data to be processed; a Model drop down menu element for allowing a user to select one or more statistical forecasting models to apply to the input data selected in the second Target drop down menu element so as to generate predictions based on the input data, a Display Model drop down menu element for allowing a user to select a type of statistical forecasting model to apply to the input data and to display in the bottom pane region; a Rolling Window Schema soft button horizontally aligned with the Display Model drop down menu element that allows the user, when actuated, to display a first action box for allowing the user to enter one or more selections; and a Forecast Period field box disposed vertically below the plurality of drop down menu elements, wherein the field box allows the user to enter a selected number of time periods within the field box.

The method also includes generating a third user interface when the Rolling Window Schema soft button is actuated by the user. The third user interface includes for display thereon the first action box that is simultaneously displayed with the navigation pane element. The first action box can include a Test Range field box for allowing the user to enter a selected date period to define a date test range of a rolling window; a Window field box disposed vertically below the Test Range field box for allowing the user to define or select one or more parameters associated with the rolling window; a Skip field box disposed horizontally adjacent to the Window field box for allowing the user to designate a portion of the rolling window to skip; a Tuning Measure drop down menu element disposed vertically below the Window field box for allowing the user to select a tuning model to apply to the input data for determining a prediction accuracy of the selected statistical forecasting model selected by the user from the Model drop down menu element; and a Report Type drop down menu element disposed horizontally adjacent to the Tuning Measure drop down menu element and vertically below the Skip field box for allowing the user to select a report type for reporting the input data.

According to the present invention, the method can include generating a fourth user interface when the user enters the selections in the second Target drop down menu element and in the Model and Display Model drop down menu elements. The fourth user interface includes first and second horizontally aligned and adjacent top pane regions and a bottom pane region disposed vertically below the first and second top pane regions. The first top pane region includes for display on the fourth user interface a graphical element that graphs a comparison of an accuracy of a plurality of statistical forecasting models relative to each other. The second pane region is horizontally adjacent to and aligned with the first pane region and is configured to display a first table that tabulates information associated with the graph in the first top pane region and a second table that tabulates information associated with one or more of the selected forecasting accuracy models. The bottom pane region is configured to display a plot that graphically represents information associated with the input data types selected by the user via the second Target drop down menu element and one or more of the statistical forecasting models selected by the user via the Model drop down menu element.

The method of the invention also includes generating a fourth user interface when the Signal Explorer (SE) soft button of the navigation pane element is actuated by the user. The fourth user interface includes first and second horizontally adjacent and aligned SE top pane regions and an SE bottom pane region disposed vertically below the first and second SE top pane regions. The first SE top pane region includes for display on the fourth user interface a plurality of drop down menu elements including a third Target drop down menu element for allowing the user to select the input data to be processed, wherein the input data also includes a plurality of signals; a Method drop down menu element for allowing the user to select one or more correlation methods to apply to the input data selected in the third Target drop down menu element to determine a value indicative of a strength of the correlation between the plurality of signals in the input data; a Signal Transformation soft button disposed vertically below the Method drop down menu element for allowing the user, when actuated, to generate a second action box that allows the user to enter one or more parameters associated with a signal transformation of the plurality of signals; and a Returned Signal field box disposed vertically below the Signal Transformation soft button for allowing the user to enter a number of signals for processing by the one or more correlation methods selected via the Method drop down menu element.

According to the present invention, the method includes generating a fifth user interface when the Signal Explorer soft button of the navigation pane element is actuated by the user. The fifth user interface has the second action box simultaneously displayed with the navigation pane element, where the second action box includes a Transformation Type drop down menu element for allowing the user to select one or more transformation methods to apply to the data; a first horizontal plurality of field boxes disposed below the Transformation Type drop down menu element for allowing the user to enter selected metrics associated with the transformation method selected by the user via the transformation type drop down menu element; a second horizontal plurality of field boxes disposed vertically below the first horizontal plurality of field boxes for allowing the user to enter selected metrics associated with the transformation method selected by the user via the transformation type drop down menu element; a Difference Type drop down menu element disposed vertically below the second horizontal plurality of field boxes for allowing the user to select a difference type to be applied to the input data; and a Difference Prior field box disposed horizontally adjacent to the Difference Type drop down menu element for allowing the user to enter a prior difference value therein to be applied to the input data.

The method also includes generating a sixth user interface when the Signal Selection (SS) soft button in the navigation pane element is actuated by the user. The sixth user interface includes first and second horizontally aligned SS top pane regions and an SS bottom pane region disposed vertically below the first and second SS top pane regions. The first SS top pane region includes for display on the sixth user interface a plurality of drop down menu elements including a second Model drop down menu element for allowing the user to select one or more statistical forecasting models to apply to the input data; a Trend drop down menu element disposed vertically below the second Model drop down menu element for allowing the user to select a type of trend to apply to the input data; an Autoregression drop down menu element disposed horizontally adjacent to the Trend drop down menu element for allowing the user to determine whether an autoregression technique is applied to the input data; a second Rolling Window Schema soft button disposed vertically below the Trend drop down menu element and the Autoregression drop down menu element for allowing the user, when actuated, to display a third action box for entering information associated with the statistical forecasting model; and a second Forecast Period field box disposed vertically below the Rolling Window Schema soft button for allowing the user to enter a selected number of time periods within the field box for the rolling window.

According to the present invention, the method can also include generating a seventh user interface when the second Rolling Window Schema soft button is actuated by the user. The seventh user interface displays a third action box for allowing the user to select one or more parameters associated with the rolling window, where the third action box includes a second Test Range soft button for allowing the user to input date ranges that define the temporal extents of the rolling window; a plurality of horizontally aligned field boxes disposed vertically below the second Test Range soft button, wherein the plurality of aligned field boxes includes a second Window field box disposed vertically below the Test Range field box for allowing the user to define or select one or more parameters associated with the rolling window, a second Skip field box disposed horizontally adjacent to the Window field box for allowing the user to designate a portion of the rolling window to skip, and a Threshold field box for setting a threshold value associated with the rolling window; a first plurality of horizontally arranged and aligned drop down menu elements disposed below the plurality of field boxes, wherein the first plurality of drop down menu elements includes a Selection Measure drop down menu element for allowing the user to select one or more forecasting accuracy models, and a second Report Type drop down menu element for allowing the user to select a type of report; and a second plurality of horizontally arranged and aligned drop down menu elements disposed below the first plurality of drop down menu elements, wherein the second plurality of drop down menu elements includes a Selection Set drop down menu element for allowing the user to select a set type, and a Signal Forecast drop down menu element for allowing the user to select a signal forecast condition.

The method also includes generating an eighth user interface when the Model Prediction (MP) soft button is actuated. The eighth user interface includes first and second horizontally aligned MP top pane regions and an MP bottom pane region disposed below the first and second MP top pane regions. The first MP top pane region includes for display on the eighth user interface a plurality of drop down menu elements including a fourth Target drop down menu element for allowing the user to select the type of data to be processed as the input data; a third Model drop down menu element disposed below the fourth Target drop down menu element for allowing the user to select one or more statistical forecasting models to apply to the input data; a second Trend drop down menu element disposed vertically below the third Model drop down menu element for allowing the user to select a type of trend to apply to the input data; and a second Autoregression drop down menu element disposed horizontally adjacent to and aligned with the second Trend drop down menu element for allowing the user to determine whether an autoregression technique is to be applied to the input data. The first MP top pane region further includes a third Forecast Period field box disposed vertically below the second Trend drop down menu element for allowing the user to enter a selected number of time periods within the field box for the rolling window.

The present invention also includes generating a ninth user interface when the Simple Prediction (SP) soft button is actuated by the user. The ninth user interface includes first and second horizontally aligned SP top pane regions and an SP bottom pane region disposed below the first and second SP top pane regions, where the first SP top pane region includes for display on the ninth user interface a fifth Target drop down menu element for allowing the user to select the type of data to be processed as the input data; a fourth Model drop down menu element disposed below the fifth Target drop down menu element for allowing the user to select one or more statistical forecasting models to apply to the input data; and a Prediction Date field box for allowing the user to enter a date for which a prediction is requested.

The data aggregation and normalization system of the present invention enables a user to provide a data development and hosting platform in a cloud-native environment. The system of the invention can also employ a series of machine learning techniques (e.g., accelerators) and/or prediction and detection units that can process the data and extract and generate meaningful insights and predictions therefrom. The integrated platform provided by the system of the present invention allows the user to integrate together in a connected system multiple different data storage types and applications that generates data of different types, and an associated processing system that can process the different types of data, store the data in a common data model so as to normalize the data, determine the data lineage of the data, and then process the data using different types of techniques. For example, the cleaned and normalized data can be processed by one or more machine language techniques. Alternatively, the data can be processed by a prediction unit for generating meaningful insights and predictions or by an anomaly detection unit for detecting one or more anomalies in the data.

The present invention is directed to a data aggregation and normalization system for aggregating data from disparate data sources, processing the data to clean the data and to normalize or standardize the data using one or more common data models, and then applying one or more discrete machine learning techniques or prediction units to the normalized data to provide data insights and predictions. The normalized data can also be processed by one or more reporting modules to provide one or more customized reports.

The present invention is directed to a data aggregation and normalization system for enriching and normalizing data, comprising a plurality of data sources for providing data that is generated by a plurality of different types of data systems that are managed by different types of software applications, a data extraction unit for extracting selected portions of the data from the plurality of data sources to form extracted data, a data storage unit for storing the extracted data, and a data preprocessing and enrichment unit for processing and enriching the extracted data to form cleaned data that is stored in the data storage unit. The data preprocessing and enrichment unit can include a data cleaning unit for cleaning the extracted unit to form cleaned data, a common data model unit for inserting the cleaned data into a common data model to normalize the cleaned data, an assessment unit for assessing a quality of the cleaned data in the common data model, and a data lineage unit for determining a lineage of selected portions of the cleaned data. The system can also include a machine language module having a plurality of predefined machine learning units for applying one or more selected artificial intelligence and machine learning (AI/ML) techniques to selected portions of the cleaned data to form machine language data, a transformation unit for transforming the machine language data into a selected reporting format, and a reporting unit for generating one or more reports from the data in the reporting format.

The system of the present invention can also include a data feedback loop for reintroducing to one or more of the plurality of data sources the transformed data for subsequent processing by the data preprocessing and enrichment unit.

The data extraction unit can be configured to copy the data from the data sources, transform the copied data by converting the data into a selected format, and load the data in the data storage unit. The data lineage unit can apply a plurality of business rules to the cleaned data.

The cleaned data can include transaction data, product data, and user data, and the machine language module can further include a prediction unit for processing the transaction data and the user data and generating a prediction based on an interest in one or more selected products of a selected user. According to the present invention, the prediction unit can include a filter unit for processing the transaction data and the user data and for generating a product interest score indicative of the interest in the one or more selected products by the selected user.

The filter unit of the present invention can include a pattern filter unit for identifying from the transactional data a set of users having similar product preferences to the selected user and for generating based thereon a first product interest score indicative of a first interest level in the product by the selected user; a neuro pattern filter unit for identifying from the transactional data and the user data a set of users having similar product preferences to the selected user and for generating based thereon a second product interest score indicative of a second interest level in the product by the selected user, a page rank unit for processing the product data and the user data and for generating therefrom a community interest score associated with the one or more selected products; a user feature extraction unit for processing the user data and for identifying and extracting one or more primary user features based on the user data having a user feature score associated therewith; a product feature extraction unit for processing the product data and for identifying and extracting one or more primary product features based on the product data having a product feature score associated therewith; a scoring unit for receiving and processing the first product interest score, the second product interest score, the community interest score, the user feature score, and the product feature score to determine therefrom a final product score indicative of the user interest in the one or more selected products; and a ranking unit for ranking the final product interest scores.

The community interest score generated by the page rank unit is based on a number of web links directed to one or more web pages listing the one or more selected products, and the user feature extraction unit employs a principal component analysis technique to determine the one or more primary user features. The product feature extraction unit employs a principal component analysis technique to determine the one or more primary product features.

According to the present invention, the machine language module can further include an anomaly detection unit for detecting one or more anomalies in the cleaned data. The anomaly detection unit can include a segmentation unit for segmenting the cleaned data into a plurality of data segments; an entropy determination unit for determining entropy values for each of the plurality of data segments and for determining a plurality of distributions of the entropy values; an entropy change determination unit for comparing each of the plurality of distributions of the entropy values with each of the remaining ones of the plurality of distributions of the entropy values and for determining therefrom a change in the entropy value of each of the plurality of data segments relative to each other to form a plurality of distributions of entropy change values; an entropy selection unit for analyzing and selecting one or more distributions of entropy change values that trend in an upward direction, wherein the entropy change values correspond to one or more anomalies; and a removal unit for identifying selected ones of the plurality of distributions of entropy change values that are identical to each other, clustering together the identical ones of the plurality of distributions of entropy change values, and then removing duplicates of the identical ones of the plurality of distributions of entropy change values. Further, the segmented data is arranged in a hierarchical manner and the change in the entropy value can be determined by employing a K-L divergence technique.

The present invention is also directed to a method for enriching and normalizing data from a plurality of different types of data systems that are managed by different types of software applications, comprising extracting with a data extraction unit selected portions of data from a plurality of data sources to form extracted data, wherein the plurality of data sources provides data that is generated by a plurality of different types of data systems that are managed by different types of software applications, storing the extracted data in a data storage unit, and processing and enriching the extracted data with a data preprocessing and enrichment unit to form cleaned data that is stored in the data storage unit. The processing and enriching of the cleaned data includes cleaning the extracted unit with a data cleaning unit to form cleaned data, inserting the cleaned data into a common data model to normalize the cleaned data, assessing a quality of the cleaned data in the common data model, and determining with a data lineage unit a lineage of selected portions of the cleaned data. The method of the present invention also includes applying one or more selected artificial intelligence and machine learning (AI/ML) techniques to selected portions of the cleaned data to form machine language data, wherein the one or more selected artificial intelligence and machine learning (AI/ML) techniques is stored in a machine language module having a plurality of predefined machine learning units, transforming the machine language data into a selected reporting format, and generating with a reporting unit one or more reports from the data in the reporting format. The data extraction unit is configured to copy the data from the data sources, transform the copied data by converting the data into a selected format, and load the data in the data storage unit.

The method also includes applying a plurality of business rules to the cleaned data with the data lineage unit and reintroducing to one or more of the plurality of data sources the transformed data for subsequent processing by the data preprocessing and enrichment unit with a data feedback loop.

The cleaned data can include transaction data, product data, and user data, and the machine language module can further include a prediction unit for processing the transaction data and the user data and generating a prediction based on an interest in one or more selected products of a selected user. The prediction unit can filter with a filter unit the transaction data and the user data and generating a product interest score indicative of the interest in the one or more selected products by the selected user. The filter unit can also be configured for identifying from the transactional data a set of users having similar product preferences to the selected user and generating based thereon a first product interest score indicative of a first interest level in the product by the selected user with a pattern filter unit, and identifying from the transactional data and the user data a set of users having similar product preferences to the selected user and generating based thereon a second product interest score indicative of a second interest level in the product by the selected user with a neuro pattern filter unit. The prediction unit can further include processing with a page rank unit the product data and the user data and generating therefrom a community interest score associated with the one or more selected products, processing with a user feature extraction unit the user data and identifying and extracting one or more primary user features based on the user data having a user feature score associated therewith, processing with a product feature extraction unit the product data and identifying and extracting one or more primary product features based on the product data having a product feature score associated therewith, processing with a scoring unit the first product interest score, the second product interest score, the community interest score, the user feature score, and the product feature score to determine therefrom a final product score indicative of the user interest in the one or more selected products, and ranking the final product interest scores.

The community interest score generated by the page rank unit is based on a number of web links directed to one or more web pages listing the one or more selected products, and the user feature extraction unit employs a principal component analysis technique to determine one or more primary user features. The product feature extraction unit employs a principal component analysis technique to determine the one or more primary product features.

According to the method of the present invention, the machine language module further comprises an anomaly detection unit for detecting one or more anomalies in the cleaned data. The anomaly detection unit can be configured to segment the cleaned data into a plurality of data segments; determine with an entropy determination unit entropy values for each of the plurality of data segments and for determining a plurality of distributions of the entropy values; compare with an entropy change determination unit each of the plurality of distributions of the entropy values with each of the remaining ones of the plurality of distributions of the entropy values and determine therefrom a change in the entropy value of each of the plurality of data segments relative to each other to form a plurality of distributions of entropy change values; select with an entropy selection unit one or more distributions of entropy change values that trend in an upward direction, wherein the entropy change values correspond to one or more anomalies; identify selected ones of the plurality of distributions of entropy change values that are identical to each other; cluster together the identical ones of the plurality of distributions of entropy change values; and then remove duplicates of the identical ones of the plurality of distributions of entropy change values.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

The present invention is directed to a data aggregation and normalization system for aggregating data from disparate data sources, processing the data to clean the data and to normalize or standardize the data using one or more data models, and then applying one or more discrete machine learning techniques to the normalized data to provide meaningful data insights and predictions. The normalized data can also be processed by one or more reporting modules to provide one or more customized reports to an end user.

As used herein the term "financial data" can include any data that is associated with or contains financial or financial related information. The financial information can include structured and unstructured data, such as information that is presented free form or in tabular formats, and is related to data associated with financial, monetary, or pecuniary interests. The financial data can oftentimes reside in or be extracted from enterprise resource planning (ERP) systems that are designed to aggregate financial as well as other types of data.

As used herein, the term "non-financial data" is intended to include data that is not financial in nature, and can include, for example, environmental related data, user related data, customer-related data, content related data, product related data, supply chain related data, workflow related data, operations related data, reporting related data, manufacturing related data, human resource related data, internet related data including social media information or other publicly available datasets (e.g., census, public government report data), and the like.

As used herein, the term "enterprise" is intended to include a structure or collection of structures (e.g., buildings), facility, business, company, operation, organization, country, or entity of any size. Further, the term is intended to include an individual or group of individuals, or a device of any type.

As used herein, the term "financial unit, "financial subsystem," "financial system" or "financial infrastructure" is intended to include any unit implemented in hardware, software or a combination thereof that applies financial rules and models to data of any type, including financial data and environmental data, so as generate one or more financial reports. The financial rules and modeling can include applying known and/or custom business concepts, accounting concepts, tax concepts, audit concepts, consulting concepts or advisory concepts.

As used herein, the term "financial reports" is intended to include any statement or report that exists in any suitable format (e.g., printed or in digital file format) that sets forth or includes financial data, including, for example, tax returns, income statements, cash flow statements, balance sheets, 10-K statements, 10-Q statements, audit reports, annual reports, loan applications, credit history reports, invoices, and the like.

Figure 1:
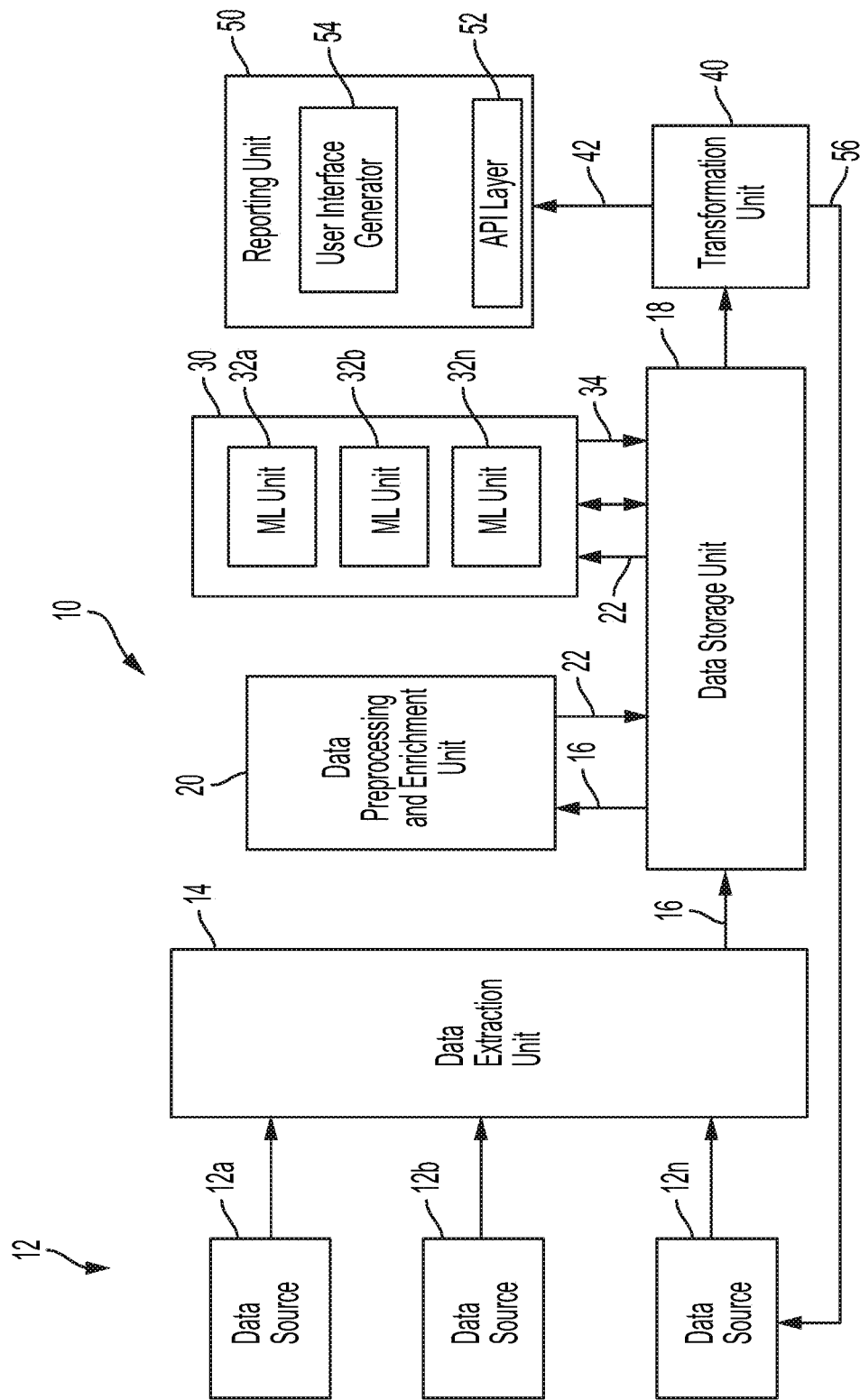
FIG. 1 is a schematic block diagram illustration of a data aggregation and normalization system according to the teachings of the present invention.

FIG. 1 is directed to a data aggregation and normalization system for collecting, collating or aggregating data, such as for example financial and non-financial data, from a variety of different data sources, and then cleaning and enriching the data for subsequent use in a variety of different ways. As shown, the data aggregation and normalization system 10 can include a plurality of data sources 12, and specifically data sources 12a-12n that are sources of data to be processed by the system 10 of the present invention. According to one example, the data sources 12 can include data from data records generated and stored in a number of different systems that are managed by different types of software applications, including for example software applications from Oracle, Salesforce, and the like. The data acquired by the data sources 12a-12n can be conveyed through any suitable data connection, such as via a network, to a data extraction unit 14. The illustrated data extraction unit 14 can extract, transform and load (ETL) the extracted data 16 into a data storage unit 18. Specifically, the data extraction unit 14 is configured to copy the data from the data sources 12, transform the data by converting the file or format structure of the source data into another usable form or suitable format, and then load the data in the data storage unit 18. The data extraction unit 14 thus serves as one or more extract, transform and load (ETL) data pipelines between the data sources 12 and the data storage unit 18. Examples of a suitable ETL software application or system that can be employed to extract and load the data from the data sources 12 includes the ETL software platform from Informatica, USA. The data storage unit 16 can be configured to store the extracted data 16 in any suitable form or format. The data storage unit 18 can be in essence a data lake or a data warehouse. As such, the data storage unit 18 can be configured to store the extracted data in a raw data format, usually as object blobs or files. The data storage unit 18 can also be configured to store processed data in addition to the raw data. The data storage unit 18 can be constructed as a single data store for storing raw and processed data that can be subsequently used for tasks such as reporting, visualization, advanced analytics, machine learning, and the like. The data storage unit 18 can employ, according to one practice, multiple different data buckets that provides a place to store extracted data (e.g., raw data), a place to store cleaned data, provides a workspace for AI/ML modeling processing and a storage area for machine language models, prediction units, and data associated therewith or generated thereby (e.g., trusted data). The data storage unit 18 can include structured data from relational databases (e.g., rows and columns), semi-structured data (e.g., CSV, logs, XML, JSON), unstructured data (e.g., emails, documents, PDFs), and binary data (e.g., images, audio, video). The data storage unit 18 can be implemented in hardware and software on premises (i.e., within the data centers of an enterprise), distributed between multiple different locations or premises, or can be hosted in the cloud using known cloud hosting services from vendors such as Amazon, Microsoft, Amazon, Google, and the like.

Figure 2:
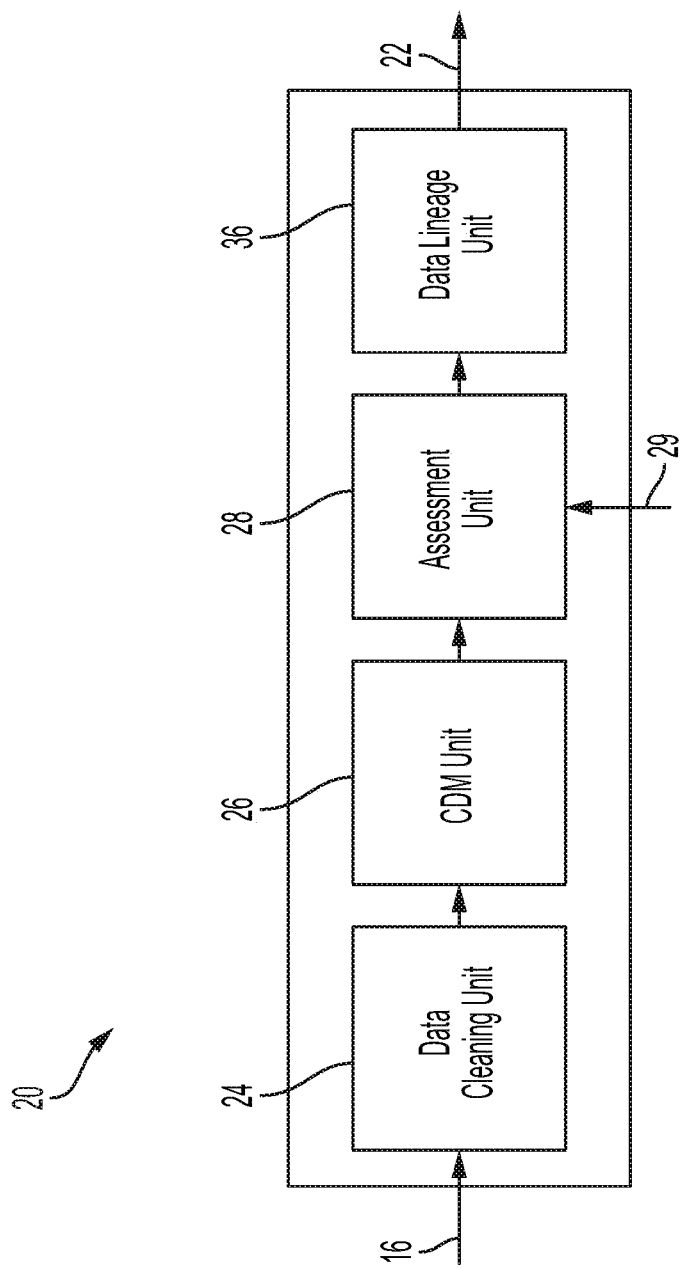
FIG. 2 is a schematic block diagram illustrating the processing components of the data preprocessing and enrichment unit of the data aggregation and normalization system of FIG. 1 according to the teachings of the present invention.

The illustrated data storage unit 18 can communicate with a data preprocessing and enrichment unit 20 for preprocessing and enriching the data for subsequent use by the data aggregation and normalization system 10. As used herein, the term "enrich," "enriching," or "enriched" is intended to include the ability to ingest and integrate data, and then apply logic and structure to the data so as to curate, correct and/or clean the data. Specifically, the data preprocessing and enrichment unit 20 can be configured to pull the extracted data stored in the data storage unit 18 and then perform a series of preprocessing and enrichment operations on the data. As shown for example in FIG. 2, the data preprocessing and enrichment unit 20 can include a data cleaning unit 24 for initially cleaning selected portions of the extracted data stored in the data storage unit 20. As used herein, the terms "data cleaning," "cleaning," and "clean" include the process of detecting and correcting or removing corrupt, inaccurate, or duplicate records from data, such as for example from a record set, table, or database by identifying incomplete, incorrect, inaccurate or irrelevant parts of the data and then replacing, modifying, or deleting the raw, dirty or coarse data. Once the data is cleaned by the data preprocessing and enrichment unit 20, the cleaned data 22 is consistent with other similar data or data sets in the system 10. The inconsistencies detected or removed by the data cleaning unit 24 may have been originally caused by user entry errors, by corruption in transmission or storage, or by different data dictionary definitions of similar entities located in different data stores.

The cleaned data generated by the data cleaning unit 24 can also be used as data to populate a common data model to provide a comprehensive data framework and common interface for the preprocessed data. For example, the data preprocessing unit 20 can further include a common data module (CDM) generation unit 26 for generating or storing a common data model that incorporates or includes the cleaned data received from the data cleaning unit 24. The common data model can serve to conform, organize, and normalize elements of data and standardize or normalize how the data elements relate to one another and to the properties of real-world entities. As is known, data models can include a set of standardized, extensible data schemas that employ a defined set of data entities, data attributes, relationships, and semantic metadata (i.e., traits). The data entity can describe the structural shape and semantic meaning for records of the data. The entities can thus represent physical objects, locations, interactions, individuals, point-in-time measurements, data types, and the like. The entity can also describe the meaning and shape of the data through a set of attributes, which can include an atomic or simple attribute type and a more complex, composite attribute type. The common data model allows downstream applications to be able to use the data stored therein by providing a common, normalized, standardized, and shared data language for the applications to use. The common data model of the present invention can utilize the entities in the Microsoft common data model, and can further include entities such as order lines and suppliers and ledger code combinations. Further, the entities in the Microsoft common data model can be further enhanced to include additional attributes, such as the Account, Product, Company, Invoice, order, Order product, Customer Journey, Lead, Contact, Event, User, Case, Task, Contract, ledger, Journal Header and Line, and Sales Invoice entities.

The data preprocessing and enrichment unit 20 can also employ an assessment unit 28 for assessing the data quality of the cleaned data in the common data model by determining or identifying the data that is anomalous. This can be performed by analyzing historical data and then detecting discrepancies, or can employ if desired data from third party data sources 29 that can be employed to detect anomalies in the cleaned data. The historical data can be employed to construct a series of correlated rules and then using the number of rules flagged, or lack of rules flagged, to determine anomalous, error containing, or net-new data types (e.g., a new kind of financial report). As used herein, the term "anomalies" or anomaly" is intended to mean inconsistencies, redundancies, or errors in the cleaned data. The anomalies can be naturally occurring and can result in data that does not match the real-world the data source or database purports to represent. The anomalies can include for example update anomalies, insertion anomalies, deletion anomalies, and the like. Further, as used herein, the term "quality" or "data quality" is intended to mean data that is fit for its intended use in operations, decision making, planning, and the like, and correctly represents the real-world construct to which the data refers.

Figure 3:
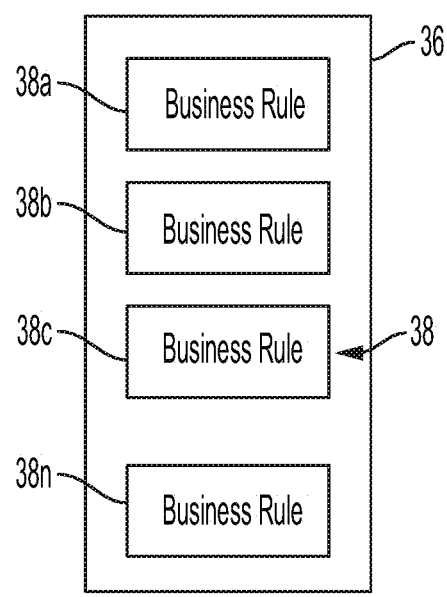
FIG. 3 is a schematic block diagram illustrating the processing components of the data lineage unit of the data preprocessing and enrichment unit of FIG. 2 according to the teachings of the present invention.

The data preprocessing and enrichment unit 20 can also employ a data lineage unit 36 for determining the lineage of selected cleaned data. The illustrated data lineage unit 36 is shown for example in FIGS. 2 and 3. The data lineage unit 36 can determine the source of the data and the lineage or path that the data follows or flows when processed by the data aggregation and normalization system 10. The data lineage unit 36 can be configured to generate a data lineage map or graph or the like to represent or illustrate the flow of data in the system. The data lineage unit 36 can also be configured to employ one or more business rules 38, illustrated as business rules 38a-38n, for applying selected different business rules to the cleaned data. The term "business rule" as used herein is intended to mean a particular predefined manner or way in which a software application performs, processes or treats data, and which has a business connotation. While business rules are generally conceptual in nature, in a software application they are usually implemented by some fragments or snippets of source code, which enforce the validations or execute the associated calculations. According to one practice, the data can be employed by any selected combination of business rules so as to process the data in a predefined manner and according to a predefined technique. Business rules modify the raw data to prepare the data for later applications by both updating exiting data and calculating new data based on the predefined business rules. The cleaned and enriched data can then be stored in the data storage unit 18.

The illustrated data aggregation and normalization system 10 can also employ a machine language module 30 that employs a set of predefined machine learning units 32a-32n for applying one or more selected artificial intelligence and machine learning (AI/ML) models or techniques to selected portions of the cleaned data 22. The machine language module 30 can also employ one or more separate prediction units for generating predictions and/or insights from the cleaned and enriched data. The machine learning techniques can be custom or commonly available artificial intelligence and machine learning methodologies (e.g., computer science algorithms) that have been proven to work with large volumes of data and are able to capture and identify intricate or detailed patterns in the data. The present invention can optionally allow the users to preselect the machine learning methodology applied to the cleaned data prior to application of the data. The machine learning techniques employed by the machine learning units 32a-32n can include, for example, a supervised learning technique (e.g., regression or classified techniques), an unsupervised learning technique (e.g., mining techniques, clustering techniques, and recommendation system techniques), a semi-supervised technique, a self-learning technique, or a reinforcement learning technique. Examples of suitable machine language techniques include Random Forest, neural network, clustering, XGBoost, bootstrap XGBoost, Deep learning Neural Nets, Decision Trees, regression Trees, and the like. The machine learning algorithms may also extend from the use of a single algorithm to the use of a combination of algorithms (e.g., ensemble methodology) and may use some of the existing methods of boosting the algorithmic learning, bagging of results to enhance learning, incorporate stochastic and deterministic approaches, and the like, to ensure that the machine learning is comprehensive and complete. The machine learning units 32a-32n can generate insights and predictions that can be stored in the data storage unit 18. According to one practice, AI/ML models or techniques can be packaged within containerized API applications, which can be deployed at scale, for example, within a Kubernetes-based environment. The machine language data 34 generated by the machine language module 30 can be stored in the data storage unit 18 as trusted data since it has a relatively high fidelity.

The data aggregation and normalization system 10 can also employ a transformation unit 40 for transforming the trusted data (e.g., the machine language data) into transformed data 42 having a format suitable for use by the reporting unit 50 via an application programming interface (API) layer 52. For example, when the trained machine language models are stored in the data storage unit 18, the transformation unit 40 can convert and update the configurations of the trained models for use by the reporting unit 50. Alternatively, if the machine language data includes results from one or more of the machine language units or includes a series of predictions or insights (e.g., in j son or tabular parquet format), the transformation unit 40 can transform or update the relevant tables in the API database layer 52. This update result is then reflected in microservices or applications that pull data from the table.

Further, the illustrated system 10 an employ a data feedback loop 56 for reintegrating or reintroducing to one or more of the data sources the transformed data for subsequent processing by the data preprocessing and enrichment unit 20. Furthermore, the AI/ML model results, predictions and insights can be fed back into the relevant data pipelines, such as for example into the data sources 12a-12n. This technique allows enriched data and AI/ML model results to be leveraged by additional models and to be integrated within data source systems.

The reporting unit 50 can include an application programming interface for enabling selected reporting software applications to interface with the transformed data. The reporting software applications can include any selected commercially available or custom reporting applications that generate selected user interfaces for reporting and displaying selected information.

Figure 4:
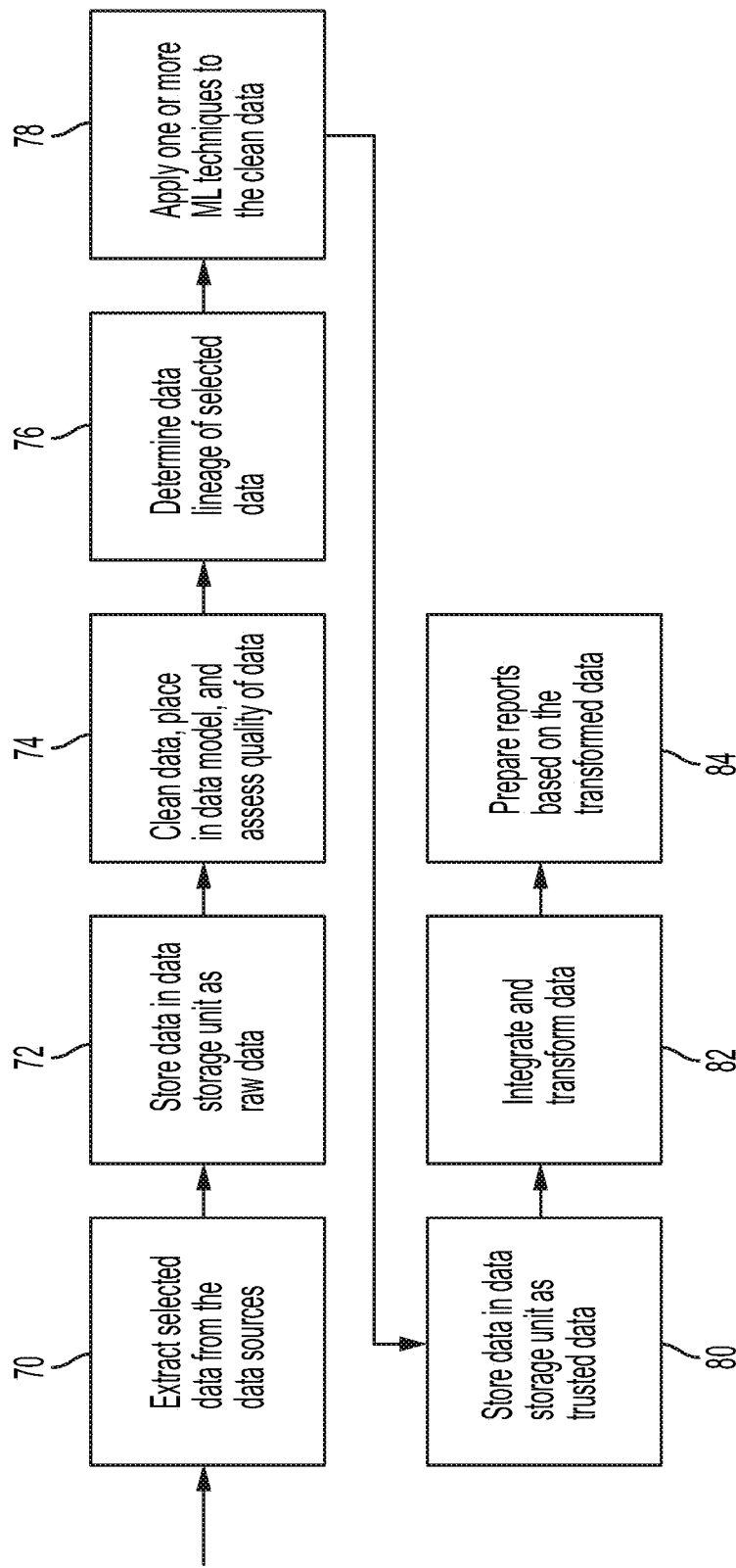
FIG. 4 is a schematic flow chart diagram illustrating the method of forming normalized data by the data aggregation and normalization system of FIG. 1 according to the teachings of the present invention.

In operation, as shown for example in FIG. 4, the data extraction unit 14 pulls or extracts selected data from the data sources 12a-12n, step 70. For example, the data aggregation and normalization system 10 can employ a Microsoft Azure Data Factory software platform that employs extract, transform, and load (ETL) software to form data driven workflows (e.g., pipelines) that helps extract and integrate selected data records from the data sources, transform the data using for example compute services such as HDInsight Hadoop, Spark, Data Lake Analytics, or Machine Learning, and then loading or publishing the data. Alternatively, the system 10 can employ other types of ETL software or platforms, such as for example the software platform from Informatica, USA. The extracted data 16, which is in essence raw data, can be stored in the data storage unit 18, step 72. The data storage unit 18 can include multiple storage units that can be located in a single location or can be dispersed throughout a network. Further, the data storage unit 18 can also include remote storage resources that are cloud hosted by one or more cloud storage providers, such as for example Microsoft, Amazon Web Services, Google, and the like. According to one practice, the data storage unit 18 can employ binary large object (BLOB) storage that is in essence binary data stored as a single entity. In Microsoft Azure, the blob storage can employ multiple containers or buckets that store blob type data. In the current embodiment, the data storage unit 18, if implementing blob type storage, can store the raw data in a raw blob data container or bucket.

The data aggregation and normalization system 10 of the present invention can employ a data preprocessing and enrichment unit 20 for preprocessing the extracted raw data to form cleaned data 22, step 74. The cleaned data 22 can also be stored in the data storage unit 18. The data preprocessing and enrichment unit 20 can be constructed in any selected manner to form the cleaned data 22. According to one embodiment, the data preprocessing and enrichment unit 20 can employ a data cleaning unit 24 for cleaning the extracted data. The data preprocessing and enrichment unit 20 can also employ a common data model (CDM) unit 26 for mapping or placing the data in a common data model. The common data model can have a set of defined attributes and entities for organizing the data in a standardized data format. The data in the common data model can then be processed by an assessment unit 28 for assessing the quality of the data. As used herein, "data quality" or "quality of data" is intended to mean a measure of the condition of data based on a series of factors, which can include for example accuracy, completeness, reliability, consistency, timeliness, and/or accessibility of the data. The data from the assessment unit 28 can then be processed by a data lineage unit 36 for determining and then displaying a data lineage map or graph of selected data, step 76. The data lineage unit 36 can also apply or overlay one or more business rules to the data. The cleaned data 22 can then be stored in the data storage unit 14 in, for example, a cleaned blob data bucket.

The cleaned data 22 can then be processed or consumed by a machine language module 30 that employs one or more machine language units 32*a*-32*n*. The machine language units can process the cleaned data using one or more pre-stored, predefined and trained machine language techniques for generating insights, predictions, machine language models, and the like, so as to form machine language or trusted data 34, step 78. Specifically, selected ones of the entities representative of selected portions of the cleaned data can be processed or consumed by selected ones of the machine language units. As the machine language module 30 processes the cleaned data, the module 30 can store the intermediate processing results in the data storage unit 18. The machine language data 34, when generated, can then be stored in the storage unit 18 as machine language or trusted data 34, step 80. According to one practice, the machine language data 34 and the intermediate results can be stored in separate and distinct blob data buckets. According to one practice, the data storage unit can function as a data lake with multiple different data buckets providing a place to land or store the extracted data, the cleaned data, the intermediate results, and the trusted or machine language data.

The illustrated data aggregation and normalization system can also employ a transformation unit for transforming the machine language data into a format that is suitable for use by one or more applications employed by the reporting unit 50, step 82. The transformation unit can transform the data using suitable techniques, such as for example by using a data mapping technique. Data mapping is the process of matching data fields or elements from a data source, such as the machine language data, to related data fields at a destination, such as one or more applications in the reporting unit 50. The data mapping technique allows the system to establish relationships between data models that are in different sources or systems. According to another practice, the transformation unit 40 can implement one or more data pathways or pipelines for transforming and exchanging data between the data storage unit 18 and the reporting unit 50. According to one embodiment, the data pathways can include a pathway for conveying data about the trained ML models in the form of serialized binary-files to as to update configurations of one or more applications in the reporting unit 50 that employ the ML model data. Alternatively, if the machine language data includes insights and predictions, which can be represented as data objects in Java Script Object Notation (JSON) or in tabular parquet format, then the transformation unit 40 can update the relevant tables in one or more applications in the reporting unit 50. Further, the transformation unit 50 can update or feed back into the relevant data sources the machine language data as application enhancements employing another data pathway or loop 56.

The transformed data 42 can then be conveyed to one or more reporting or visual representation software applications stored in or which form part of the reporting unit 50 via the API layer 52. The API layer 52 allows the transformed data and other system software applications to communicate with the applications of the reporting unit, as well as with external third party applications. The reporting unit 50 can employ one or more reporting applications that can be configured for generating one or more reports, including financial reports, based on the transformed data, step 86. Further, a system user can interface with the reporting unit 50 so as to construct a selected report.

The data aggregation and normalization system employs the illustrated units and modules to form a complete, efficient, and robust data normalization unit for automatically extracting, cleaning, and normalizing data for subsequent use by a reporting unit. The selected combination of units, including the data extraction unit and the data preprocessing and enrichment unit, provide for specific synergies and efficiencies when processing and enriching the data. For example, the system cleans the extracted data and then normalizes the data by loading or storing in a common data model. The data once in the model can be examined or processed for quality by the assessment unit to ensure that the data is in proper form. The data lineage unit can then determine a lineage or flow path of selected portions of the cleaned data through the system 10. This approach automates selected tasks when developing data pipelines and leverages highly scalable and performant technologies which meet the demands of large datasets.

Figure 5:
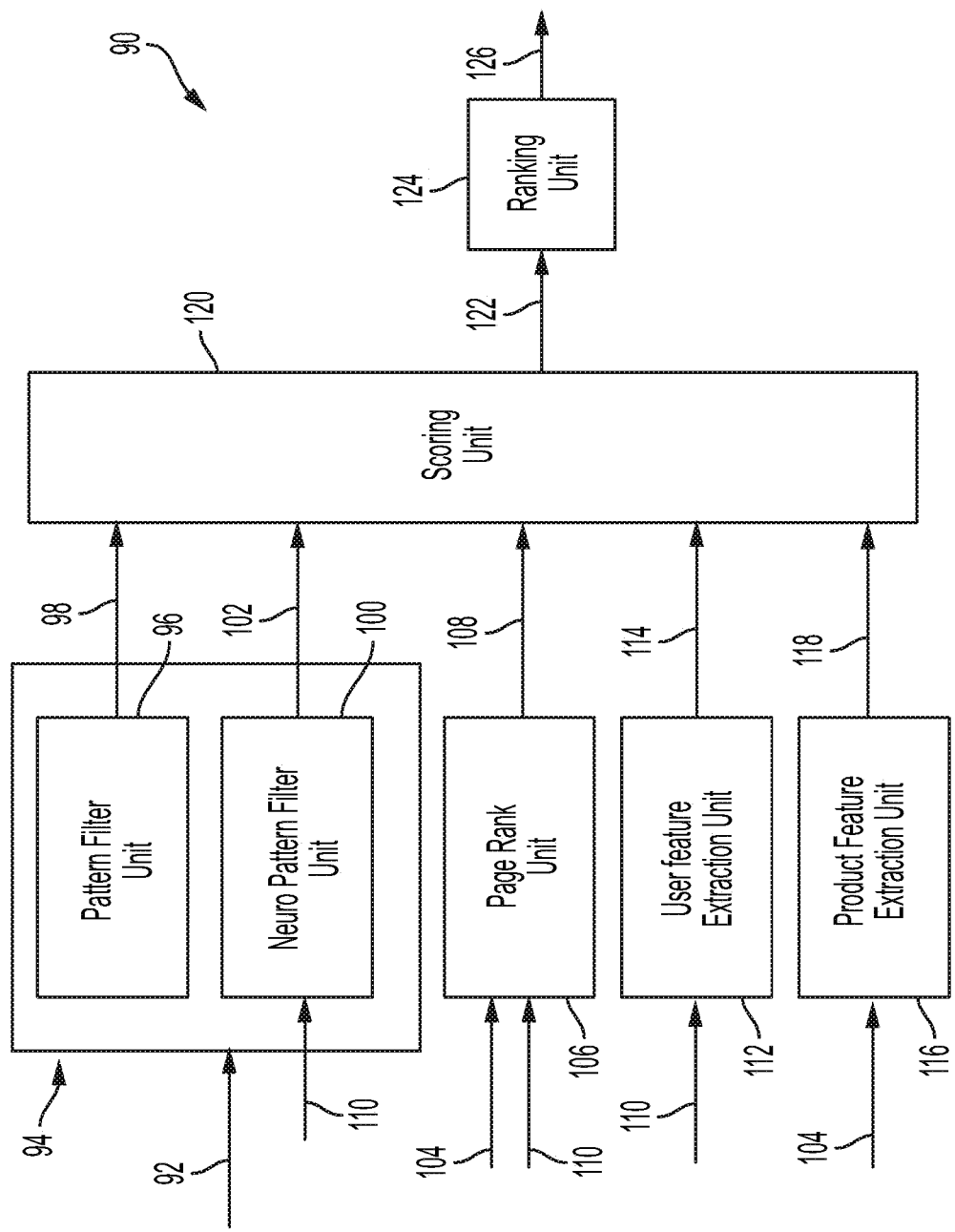
FIG. 5 is a schematic block diagram showing the elements of a prediction unit that forms part of the data aggregation and normalization system according to the teachings of the present invention.

The machine language module 30 of the data aggregation and normalization system 10 of the present invention can also optionally include a prediction unit for generating insights and predictions from the cleaned data according to the teachings of the present invention. FIG. 5 illustrates one embodiment of a prediction unit 90 for predicting user or customer interest in a product according to the teachings of the present invention. The data sources 12 can include non-financial data that is processed by the data preprocessing and enrichment unit 20 so as to clean and normalize the data. The non-financial data can include, for example, transaction related data, product related data, and user related data. The prediction unit 90 processes the input data and generates product recommendations and predictions based thereon. As used herein, the term "transaction related data" or "transaction data" is intended to include any selected type of data related or corresponding to the buying or selling of goods or services or related to business conducted between one or more enterprises. The transaction data can include, for example, user data, product data, geographic related information, date and time related data, purchase data including current and historical, and the like. As used herein, the term "product related data" or "product data" is intended to include any type of data identifying or related or corresponding to a product, such as an item, object or system available for use. The product data can include product identification information including product name, product type, quantity, product number, product description, unit of measure, cost and price, specifications, data sheets, image of product, and the like. Further, as used herein, the term "user related data" or "user data" is intended to include any types of data related or corresponding to a user or a collection of users, including, for example, content feature data, profile data, identification data such as name, address, city, state and the like, demographic data including age, gender, race, location, occupation, education, employment, marital status, income level, height, weight, behavior-derived type data including for example Life-Time Value (LTV) data, login persona data (e.g., daily, weekly, and monthly user type data), and the like.

The cleaned data 22 generated by the data preprocessing and enrichment unit 20 can include transaction data 92 that is processed by a filter unit 94 for filtering the transaction data to find patterns in the data and to generate an interest score having an interest score value associated therewith and indicative of a user's interest in a particular product or service. The filter unit 94 establishes relationships between products and users (e.g., customers) and then generates recommendations based on the transaction data. According to one embodiment, the filter unit 94 can include a pattern filter unit 96 for identifying one or more patterns in the transaction data. For example, the pattern filter unit 96 first identifies a set of users similar to a selected user having similar product preferences and then identifies or determines patterns of similarities between products that appear to be of interest between the users. The patterns can be related to, for example, the purchase of products by users that are similar to a selected user. The pattern filter unit 96 can generate a map or matrix of users to products and can then determine similar products that may be of interest to the selected user based on an affinity towards those products by other users that have interacted with those products. Based on this pattern of information, the pattern filter unit 96 can determine the likelihood that the selected user may purchase a selected product based on the selection preferences and interests of the similar users. Based on this information, the pattern filter unit 96 can recommend products to the selected user that may be of interest. According to one practice, the pattern filter unit can employ a collaborative filtering technique. In this regard, the pattern filter unit 96 can automatically make predictions (i.e., filtering) about the interests of the selected user by collecting preferences or taste information from many users having similar interests. The pattern filter unit 96 can then generate a first product interest score 98 having a selected value associated therewith that is indicative of an interest level in a selected product by the selected user. The first product interest score value can be any selected numerical designation, and is preferably a value having a range between 0 and 1.

The illustrated filter unit 94 can also include a neuro pattern filter unit 100 for also processing and filtering the transaction data 92 as well as user data 100. The user data 100 can include content feature data that includes, for example, profile and demographic data about the user. The neuro pattern filter unit 100 can process and filter the transaction data 92 and the user data 100 by representing the user-item relationship as a vector of latent features which are projected into a shared feature space using a non-linear representation. In this feature space, the user-item interactions can be modeled using the inner product of user-item latent vectors. Further, the neuro pattern filter unit 100 can model the user-item feature interaction through a neural network architecture so as to learn user-item interactions. As such, and similar to the pattern filter unit 96, the neuro pattern filter unit 100 can filter out items that a user may like based on the reactions of similar users, and can determine or find patterns in the data. Specifically, the neuro pattern filter unit 100 can initially identify a set of users similar to a selected user and then identify patterns of similarities between products that appear to be of interest between the users. The patterns can also be related to, for example, the purchase of products by users that are similar to a selected user. According to one practice, the neuro pattern filter unit 100 can employ a neuro collaborative filtering technique. In this regard, the neuro pattern filter unit 100 can automatically make predictions (i.e., filtering) about the interests of the selected user by collecting preferences or taste information from many users having similar interests. That is, the neuro pattern filter unit can identify from the transactional data and the user data a set of users having similar product preferences to the selected user. The neuro pattern filter unit 100 can then generate a second product interest score 102 having a selected value associated therewith that is indicative of a user interest level in a particular product. The second product interest score value can be any selected numerical designation, and is preferably a value having a range between 0 and 1.

The illustrated prediction unit 90 can also employ a page rank unit 106 for processing product data 104 and the user data 110 and then determining based thereon a community interest score in one or more products. As used herein, the term "community interest" is intended to mean an interest in an item, object or service that is common between multiple different users. Further, the term "community interest score" is intended to mean a value associated with or quantifying the community interest in the item, product or service. The page rank unit 106 operates by counting or determining the number and quality of web links directed to one or more web pages hosting or listing a selected product to determine an estimate of the importance of the product. The more links that are directed to the selected product, then the higher the importance value of the product. Thus, as more users (e.g., community) link to the product, the higher the importance of the product, and hence the higher an associated community interest score associated with the product. The page rank unit 106 thus generates a community interest score 108 associated with the product. The community interest score 108 can have a selected value associated therewith having a range between 0 and 1.

The prediction unit 90 can further include a user feature extraction unit 112 for processing user data 110, determining and identifying selected relevant or important user features or elements, and then generating a plurality of user feature scores or values 114 that can be weighted relative to each other. As used herein, the term "user feature" is intended to include specific relevant traits or attributes of a user or a set of users that can function as variables when employed in a machine learning technique. The user features can include, for example, demographic features such as age, gender, race, location, occupation, education, employment, marital status, income level, height, weight, and the like, as well as profile data features and identification features such as name, address, city, state and the like. The user feature extraction unit 112 can identify the important or primary relevant features in the user data 110 by applying a selection reduction technique, such as for example a principal component analysis technique, to reduce the dimensionality of the user data by identifying the primary features or principal components in a dataset defined by the user data. As used herein, the term "primary features" is intended to mean variables that are highly correlated with the identified target variable and typically do not correlate with each other. The user feature extraction unit 112 can then determine and identify the important or primary user features, and can then apply a weighting technique to the user features so as to weight the user features relative to each other. For example, the user features that are more important or applicable to a selected user can be assigned a higher weighted value. The user feature extraction unit 112 then generates a set of user features having associated scores or values 114 that are weighted relative to each other.

The prediction unit 90 can also include a product feature extraction unit 116 for processing the product data 104, determining and identifying selected important or primary product features or elements, and then generating a plurality of product feature scores or values 118 that can be weighted relative to each other. As used herein, the term "product feature" is intended to include specific relevant traits or attributes of a product that deliver value to a user and which can differentiate the product in the marketplace and provides a benefit or set of benefits to the user. The product features can function as variables when employed in a machine learning technique. The product features can include, for example, product type, product name, quantity, size, color, product number, product description, unit of measure, cost and price, product image, and the like. The product feature extraction unit 116 can identify the important or primary relevant features in the product data 104 by applying a selection reduction technique, such as for example a principal component analysis technique, to reduce the dimensionality of the product data by identifying the primary features or principal components in a dataset defined by the product data. The product feature extraction unit 116 can then determine and identify the important or primary product features, and can then apply a weighting technique to the product features so as to weight the features relative to each other. For example, the product features that are more important or applicable to a selected user can be assigned a higher weighted value. The product feature extraction unit 116 then generates a set of product features having associated scores or values 118 that are weighted relative to each other.

The first product interest score 98 and associated value, the second product interest score 102 and associated value, the community interest score 108 and associated value, the user feature score 114 and associated value, and the product feature score 118 and associated value can be conveyed or transferred to a scoring unit 120 for processing the scores or values. In particular, the scoring unit can determine a final product interest score 122 based on the scores and values provided as inputs. The final product interest score 122 generated by the scoring unit 120 and any associated value can be an average of the input scores, a median of the input scores, the best or highest input score received by the scoring unit 120, or by some other meaningful numerical combination input scores. The scoring unit 120 can employ a neural network technique for processing and managing the input score values, and preferably can employ a feed forward neural network. The final product interest score 122 can have a value associated therewith between the range of 0 and 1. The final product interest score 122 can be conveyed to a ranking unit 124 for selecting and ranking the final product interest scores associated with a number of different products. The ranking unit can rank the scores in any selected manner or fashion, and preferably ranks the scores from highest to lowest scores. The ranking unit 124 can then generate rank data 126 indicative of the product rankings. The ranking unit 124 also allows for additional business consideration to be incorporated with rankings output from the machine learning unit to prepare a final set of recommendations. For example, the scoring unit 120 can output the top best recommendations for a customer as a series of products. If the scoring unit is preset to provide the top five recommendations, then the product series can include product 1, product 2, product 3, product 4, and product 5. The ranking unit 124, however, may incorporate a business preference to sell more of a selected product (e.g., product 4), and change the product ranking to reflect this business preference as, for example, product 1, product 4, product 2, product 3, product 5. Business considerations may also prioritize related products in a group in the ranking. For example, the scoring unit 120 may output product 1a, product 2a, product 1b, product 3, product 2b. But the ranking unit 124 prioritizes related products and changes the ranking to product 1a, product 1b, product 2a, product 2b, and product 3. The ranking data thus serves as predictions regarding the products and product features that the user have interest. The rank data forms part of the machine language data that can be stored in the data storage unit 18. This collection of units allows for a flexible approach which can begin to work when a client has a minimal amount of data, and becomes more sophisticated as more data becomes available.

Figure 6:
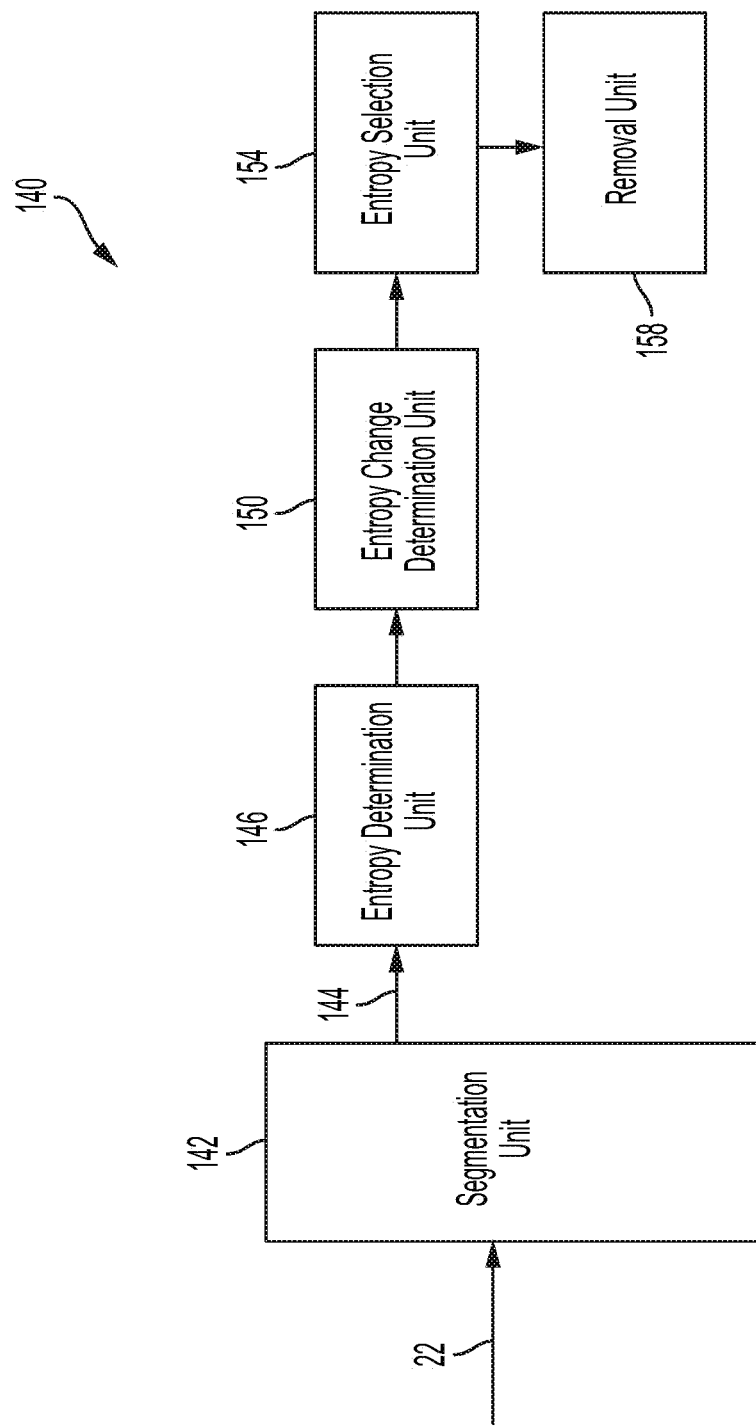
FIG. 6 is a schematic block diagram showing the elements of an anomaly detection unit that forms part of the data aggregation and normalization system according to the teachings of the present invention.
Figure 7:
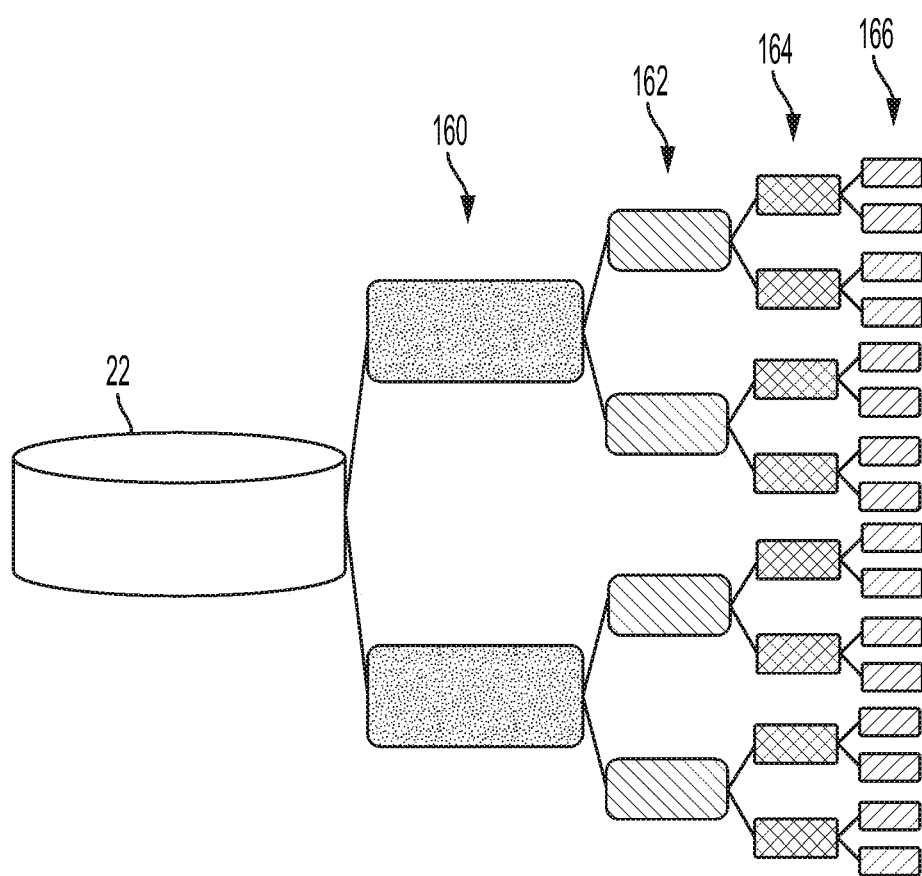
FIG. 7 is a schematic representation of segmented data that is segmented by a segmentation unit that forms part of the anomaly detection unit according to the teachings of the present invention.
Figure 8:
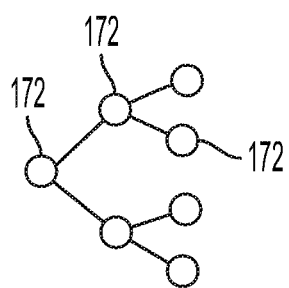
FIG. 8 is a schematic representation of a decision tree that represents segmented data according to the teachings of the present invention.

As illustrated in FIG. 6, the machine language module 30 of the present invention can also include an optional anomaly detection unit 140 for identifying and detecting anomalies in selected portions of the cleaned data 22. As used herein, the term "anomalies" and "anomaly" is intended to mean the detection of data, items, events or observations that do not conform to and differ significantly from an expected outcome or pattern or from other items in a dataset, locally or globally, that are usually undetectable by a system or by a human subject matter expert. The detection of anomalies can be applicable in a variety of domains, such as, for illustrative purposes only, intrusion detection, financial fraud detection, fault detection, system health monitoring, event detection in sensor networks, defect detection in images using machine vision, system inefficiencies, and the like. The anomaly detection unit 140 can include a segmentation unit 142 for segmenting the cleaned data, presented in the form of a dataset, into a plurality or series of data segments. The segmentation unit 142 can segment or group together the cleaned data into two or more subsets, which can in turn be further segmented as needed. The data can be segmented according to one or more data attributes, date type, use cases, and the like. The data attribute can be any selected data descriptor (e.g., so as to represent categorical variables) that describes other data. The data 22 can be segmented into a series of combinations of the data based on the selected variables and attributes. An illustrative example of the data segmentation process performed by the segmentation unit 142 is shown for example in FIG. 7. The illustrated cleaned data 22 can be segmented for example into macro segments 160, which can be further segmented or divided into multiple additional groups or tiers of segments 162, 164, 166. The data segments can be arranged in any selected pattern or manner, and are preferably arranged in a hierarchical manner. The data segments can also be represented in a decision tree or process flow format 170 as a series of nodes 172, representing the subpopulations, and corresponding edges 174, which represent a logical statement distinguishing the subpopulations, as shown for example in FIG. 8. The data segments are represented as the nodes 172 in the tree 170.

Figure 9A:
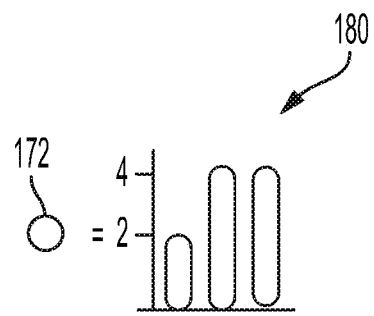
FIG. 9A is a graphical representation of a distribution of entropy values generated by the anomaly detection unit according to the teachings of the present invention.

The anomaly detection unit 140 also includes an entropy determination unit 146 for determining the entropy of each of the segmented data 144 associated with the data segments 160, 162, 164, and 166. As used herein, "entropy" is intended to mean a measure of the amount of disorder or surprise in a system, data, data segment, and the like. The entropy of the data can be measured and quantified according to known techniques, and can be calculated into an entropy value that typically ranges between 0 and 1 or higher, where the higher the number corresponds to a higher amount of disorder in the data or system. The entropy values can be collated to form a distribution of entropy values. For example, as shown in FIG. 9A, each of the data segments or tiers of data segments (e.g., sub-populations) can be represented as a node 172 in the decision tree, and an entropy value can be calculated for the subpopulation distribution 180 indicating its level of surprise or disorder. As such, the entropy value is a statistic of the sub-population. The sub-population distribution can be represented as a graph having the number of members along the Y-axis and distribution bins represented along the X-axis. A relatively flat distribution is indicative of the outcome as being relatively equal and the surprise or amount of disorder is maximized since all possible outcomes are present. Further, in the edge between two sub-population distributions 180, the differences in entropy values between data segments is indicative of a selected amount or degree of disorder or surprise.

Figure 9B:
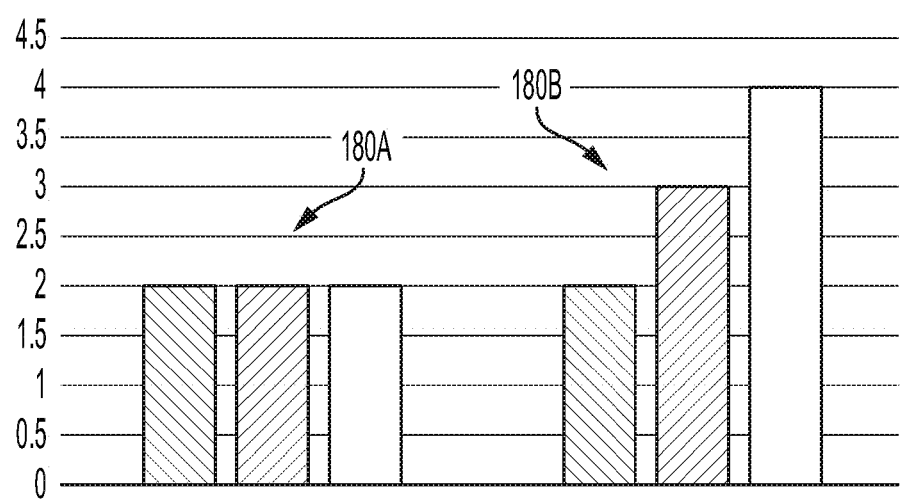
FIG. 9B is a graphical representation of a distribution of entropy change values generated by the anomaly detection unit according to the teachings of the present invention.

The anomaly detection unit 140 can also include an entropy change determination unit 150 for determining a change in entropy of each of the data segments or sub-populations of data segments relative to each. The difference or change in entropy can be represented as an entropy change value that is indicative of or a measure of the change in disorder or surprise between the data segments. The entropy change values can correspond to the edges 174 in the decision tree 170. The change in entropy can be determined or calculated by using a Kullback-Leibler (K-L) divergence technique. The entropy change value is a measure of a difference between two random data segments or sub-populations of data segments. The entropy change values can be organized so as to identify a distribution of entropy change values across the data segments or sub-populations of data segments. According to one practice, the entropy change values can be calculated or determined between respective entropy distributions. For example, as shown in FIG. 9B, the changes in entropy values associated with the constituent portions of a first distribution of data segments or sub-populations 180A is compared with the changes in entropy values associated with the constituent portions of a second distribution of data segments or sub-populations 180B. If the entropy distributions that are compared with each other are the same, then the change in entropy values is zero. In the illustrated example, the second entropy distribution 180B is different from the first entropy distribution, and hence when compared with each other the unit 150 determines that there is a selected measure of entropy change that exists in the system. The entropy change value enables the anomaly detection unit 140 to identify potential anomalies in the data segments.

Figure 9C:
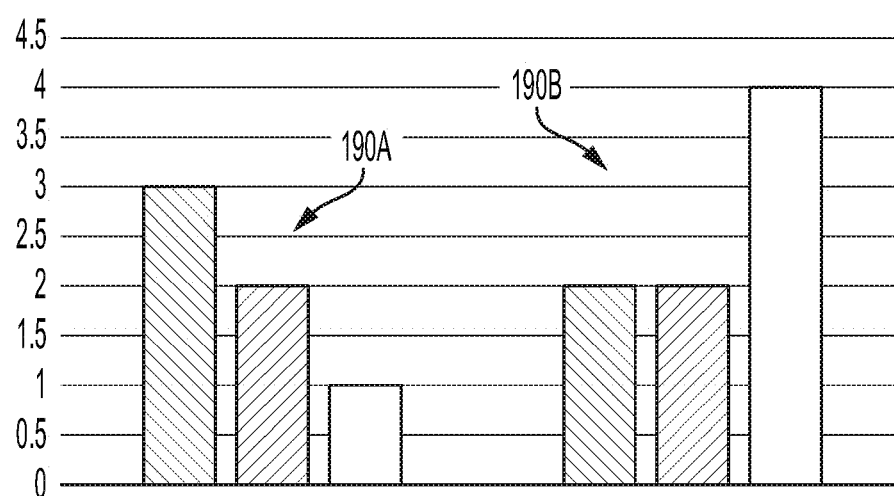
FIG. 9C is a graphical representation of multiple different distributions of entropy change values generated by the anomaly detection unit according to the teachings of the present invention.

The illustrated anomaly detection unit 140 can further include an entropy selection unit 154 for analyzing the distribution of entropy change values generated by the entropy change determination unit 150 and then selecting the entropy change values from among the distributed entropy change values that have the greatest impact on the mean value of the entropy change values. Entropy is a technique that captures various changes in distributions. From a business perspective, only the changes that move the mean up or down are likely to be material from a business perspective. As such, the anomaly detection unit 140 can select instances of an entropy change and also where the change or difference is significant, since it moves the distribution in the correct direction. Specifically, the entropy selection unit 154 identifies and selects the distributions of entropy change values that trend in an upward direction and hence add to or increase the overall mean cost. Alternatively, the entropy selection unit 154 can identify and select the entropy change values that trend in a downward direction. From the selected values, the entropy selection unit 154 can identify or select the relevant data segments from a business perspective. For example, as shown for example in FIG. 9C, the illustrated chart shows a first distribution of entropy change values 190A and a second distribution of entropy change values 190B. The first distribution 190A has a declining or negative entropy change value and the second distribution 190B has an increasing or positive entropy change value. As such, the second distribution can be identified and selected by the entropy selection unit 154 since it has a positive or greater impact on the mean entropy values.

Figure 9D:
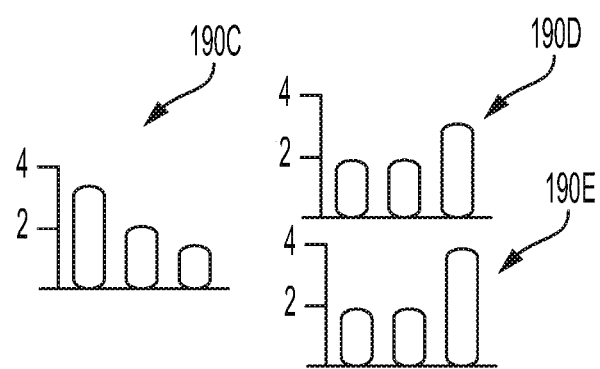
FIG. 9D is a graphical representation of a selection and clustering of distributions of entropy values according to the teachings of the present invention.

The anomaly detection unit 140 still further includes a removal unit 158 for identifying and clustering together entropy change values that have similar entropy change value distributions. For example, as shown in FIG. 9D, sample distributions of entropy change values 190C, 190D and 190E are illustrated. The distribution of entropy change values 190C is different than the distributions 190D and 190E. Further, the distributions 190D and 190E are the same. As such, the removal unit 158 can identify the distributions 190D and 190D, and since they are the same, perform a clustering technique and cluster together the distributions 190D and 190E. The similarity of the distributions of the entropy change values can correspond to data segments that have an identical anomaly associated therewith. Oftentimes, the similarity corresponds to a parent-child hierarchical arrangement of data segments that are highly similar and represent the same underlying anomaly. When this occurs, the entropy selection unit 154 can select one of the entropy value distributions as a representative distribution and remove the identical distributions. For example, the removal unit 158 can select either distribution 190D or 190E as a representative distribution and remove the non-selected distribution. The remaining distributions of entropy change values correspond to anomalies that exist in the data segments. The removal unit 158 thus enables the removal of redundant information, such as distributions of entropy change values, so that the system can process the data with fidelity and with a high degree of accuracy. The entropy change values can be forwarded to the reporting unit 50 and then inserted into any suitable visualization software for review by the user.

The anomaly detection unit 140, being a combination of the segmentation unit 142, the entropy detection unit 146, entropy change determination unit 150, entropy selection unit 154, and the removal unit 158, has a specific advantage of being a systematic protocol for identifying unambiguous sub-population anomalies in a dataset in a comprehensive and unbiased way. The segmentation unit 142 can identify all possible subpopulations. The entropy determination and change units utilize a sensitive information statistic to identify a wide variety of differences in sub-populations, which captures a wide range of potential anomalies, and then the entropy selection and removal units refine this range of sub-population differences to identify unambiguous local and global anomalies that are potentially material to the objectives of the business.

Efficiency can be gained through changes to the configuration of the segmentation, entropy selection, and removal units. The segmentation unit 142 can be configured through directed hierarchical searches of sub-populations to follow a particular business objective. Less permissive selection criteria in the entropy selection and removal units can restrict the analysis to more significant or material anomalies. For example, the initial analysis of complex supply chain data, and a broad, unbiased selection of all sub-populations in the data would be desirable to identity anomalies and potential business objectives. A follow-up analysis can then attempt a more specific search by configuring an ordered search hierarchy in the segmentation unit and less-permissive configurations in the entropy selection and removal units. For example, a broad analysis of the supply chain data can determine that some combination of day-of-week shipped and destination US states have anomalous high shipping costs. A follow-up analysis hierarchically segmenting first by day-of-week and then by US states with less-permissive selection thresholds can isolate the underlying cause of the anomalous shipping costs. Systematically identifying underlying cost anomalies allows an organization to adapt its supply chain operations to better service its business goals.

The machine language module 30 of the present invention can also include a machine language unit, such as an intelligent forecasting machine language unit 32n, for processing time series financial and non-financial data (e.g., input data) and for making intelligent predictions based on the input data by applying thereto one more statistical forecasting models or techniques. The intelligent forecasting machine language unit 32n can employ or utilize the input data to train and tune one or more statistical forecasting models, generate predictions and insights based on the model data and the input data, identify outliers in the model data, determine the prediction accuracy of the various statistical forecasting models relative to each other, and then extrapolate or generate insights and predictions based on the input data and based on the forecasting model data. The intelligent forecasting machine language unit 32n can generate machine language data 34 that is subsequently processed by a user interface (UI) generator 54 that can optionally form part of the reporting unit 50. The user interface generator 54 can generate a series or sequence of user interfaces that can be displayed on a display device that form part of an intelligent forecasting sequence having a series of forecasting steps. The forecasting steps can correspond to or be implemented by the series of user interfaces. The display device can form part of the system 10 or can be a user display, such as a display that forms part of a separate electronic device, such as a computer, a tablet or the like. Further, the UI generator can access a software application stored in the intelligent forecasting machine language unit 32n that can provide the user, such as a data scientist, the ability to rapidly develop and train models for their specific time series needs based on the model data, benchmark the model data across time-series datasets, and then quickly and efficiently analyze and understand a selected project workflow. The software application can thus allow the user to train the time series models, make predictions based on the model data, identify selected outliers, and extract useful information without writing any software code. The software application can also automate model selection, parameter tuning, signal selection and evaluation, in a single data pipeline, which minimizes the user workload, using a series of custom user interfaces. The application can employ traditional statistical forecasting techniques and time series models to identify and replace potential outliers in a given input dataset. Further, the software application can enable the user, via the user interfaces, to overwrite or replace a value associated with the outlier data with an outlier replacement value. The user interfaces can display to the user in an efficient, highly intuitive, and organized manner the machine language or model data that is generated by the intelligent forecasting machine language unit 32n. The user interfaces can allow the user to input additional information about the statistical forecasting models to generate insights and predictions based on the input data without having to separately and independently generate software code to implement the desired functionality. The application associated with the intelligent forecasting machine language unit 32n can be used across any selected number and type of time-series datasets, and the system 10 of the present invention allows the user to train the models over any selected period of time.

Suitable examples of the user interfaces that can be generated by the data aggregation and normalization system of the present invention are shown for example in FIGS. 10-21. The user interfaces can be generated in a selected sequence to allow the user, such as a data scientist, to review the input data and the model data in real time, rapidly select or develop appropriate models for their specific time series needs, benchmark the models across various types of datasets, and quickly visualize, display and hence understand a project workflow.

Figure 10:
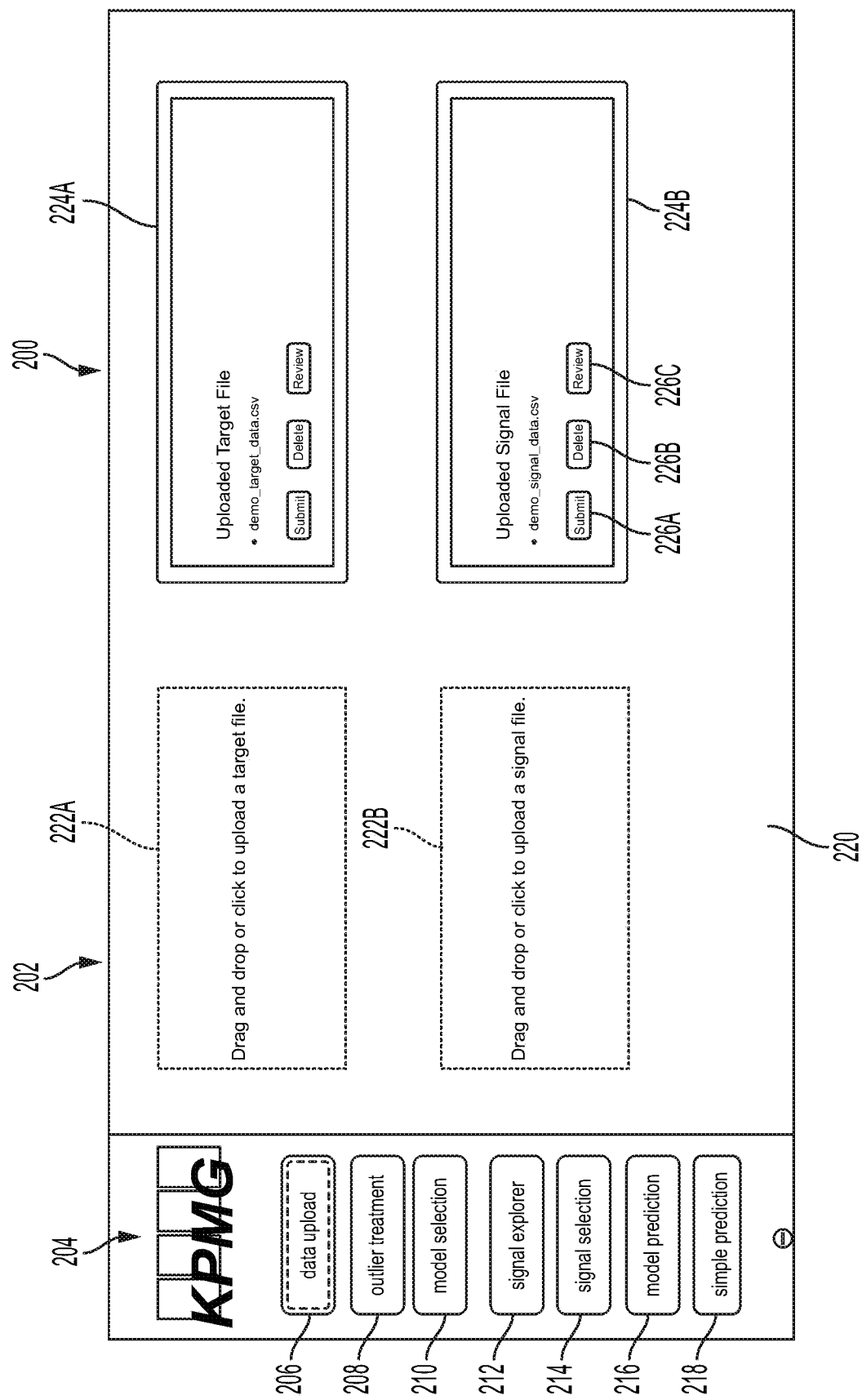
FIG. 10 is a user interface generated by the system of the present invention for display on a display device showing the window when a Data Upload soft button in a navigation pane button is actuated by a user.

As shown in FIG. 10, the user interface generator 54 can generate for display on a display device a selected graphical user interface that forms part of a window element 200 (herein generally referred to as a window, a frame or a page). The window element 200 can define and display the series of user interfaces. The graphical user interface is a series or system of interactive, selectable and actuatable visual components that can be executed by underlying software, such as for example, in part, by the software application stored in the intelligent forecasting machine language unit 32n. For the sake of simplicity, the user interfaces are described below as having been generated by the software application when stored in the intelligent forecasting machine language unit 32n, although one of ordinary skill in the art will readily recognize that the software application can also be stored, in whole or in part, in the data storage unit 18, the reporting unit 50, or the user interface generator 54. The user interfaces described herein can include one or more pane elements, tab elements, sub-tab elements, ribbons, bars, soft buttons, icons, radio buttons, carets, objects, menus (e.g., drop down menus), and other types of graphical elements that are selectable and actuatable by the user and which convey information, execute commands, and represent actions that can be taken by the user. The objects or icons or other displayed elements can remain static or can change or vary when the user interacts with them. Hence, the system 10 includes suitable application software that is executed to produce or generate via the user interface generator 54 the user interfaces of the present invention.

The illustrated window element 200 of the present invention can include along a left side of the window element 200 a persistent navigation pane element 204 that extends from a top portion of the window element to a bottom portion of the window element. The navigation pane element 204 can be configured to continuously and persistently display selected information and can include a plurality of vertically stacked actuatable soft buttons, such as for example, a Data Upload soft button or key 206 that when actuated prompts the user interface generator to generate the user interface 202 that allows the user to upload the input data as for example a time-series dataset that can include daily, weekly, quarterly, and monthly time-series data. The user can also automatically check the input data quality, including data types and index values, determine whether there are any missing values in the data, and test the time series data length and the like. The navigation pane element 204 can also include an actuatable Outlier Treatment soft button 208, an actuatable Model Selection soft button 210, an actuatable Signal Explorer soft button 212, an actuatable Signal Selection soft button 214, an actuatable Model Prediction soft button 216, and an actuatable Simple Prediction soft button 218, the functions and purposes of which are described herein. The user interface 202 can also include a pane element 220 that includes a pair of vertically stacked and dedicated file upload pane regions 222A and 222B that enable the user to upload one or more files to the system. The files can be any selected type of file, and can be for example a signal file. As used herein, the term "signal" is intended to mean a representation or a physical form of data, such as any portion of the input data, or an individual measurable property or characteristic of a phenomenon. The signal file can include a file containing signals related to any selected type of data, such as data forming part of the input datasets. For example, the user via a user control or selection device, such as a mouse, can drag and drop a file into the file upload pane regions. Alternatively, the user can click on a file so as to upload the file. The illustrated pane element 220 also includes a series of vertically stacked dedicated file information pane regions 224A, 224B that are disposed adjacent to, and to the right of, the file upload pane portions 222A, 222B for indicating or displaying information associated with the files that were uploaded via the file upload pane regions 222A, 222B. For example, the file information pane region 224A can display file related information, such as the file name, that is related to the file uploaded via the file upload pane region 222A. Similarly, the file information pane region 224B can display information, such as the file name, that is related to the file uploaded via the file upload pane region 222B. The file information pane regions 224A, 224B can also include one or more soft buttons that allow the user to take or initiate one or more selected actions. For example, one or more of the file information pane regions 224A, 224B can include the soft buttons 226A, 226B and 226C. The soft button 226A is a Submit button that allows the user to submit the uploaded file for processing by the intelligent forecasting machine language unit 32n. The intelligent forecasting machine language unit 32n can then apply one or more selected machine learning techniques to the input datasets, such as for example a statistical forecasting technique. The soft button 226B is a Delete button that when actuated allows the user to delete the uploaded file, and the soft button 226C is a Review button that when actuated allows the user to review selected information, such as a time series data trend, associated with the uploaded file. The navigation pane element and the pane regions can be simultaneously displayed in the user interface 202. Further, when the Data Upload soft button 206 is actuated, the system preferably highlights the soft button by displaying the soft button in a different manner, such as in a different color. This highlighting feature occurs with each of the soft buttons, when actuated, forming part of the navigation pane 204.

Figure 11:
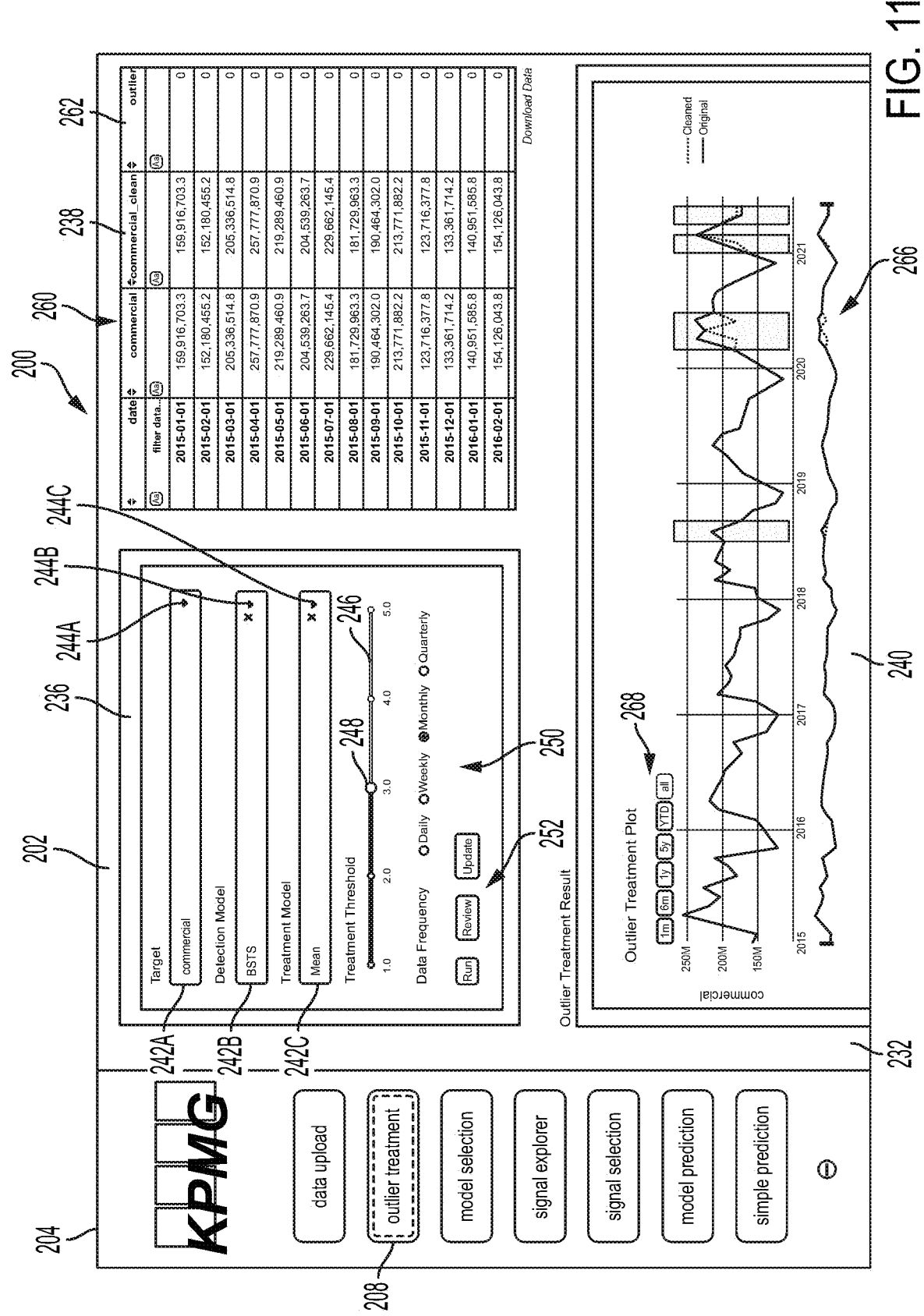
FIG. 11 is a user interface generated by the system of the present invention for display on a display device showing the window when an Outlier Treatment soft button in the navigation pane button is actuated by the user.

As shown in FIG. 11, when the user selects and actuates the Outlier Treatment soft button 208 of the navigation pane element 204, the user interface generator 54 generates the user interface 230 of the window element 200. The illustrated user interface 230 includes the persistent navigation pane element 204 formed along a left hand side of the interface, as well as an adjacent pane element 232. The Outlier Treatment soft button 208, when actuated, instructs the application to process the input data by applying thereto one or more statistical processing techniques and time series models to detect potential outliers in the data, and to replace potential outliers in a given input data with one or more replacement values. The statistical processing techniques help collect, organize, analyze, interpret, and present data and uncover patterns and trends within the data. The statistical processing models can include, for example, one or more known statistical forecasting models, such as data sampling, central tendency (e.g., mean, median, and mode), random variables (e.g., discrete, continuous, skewness, variance, and the like), probability distributions, statistical inference, confidence interval, hypothesis testing, quartile analysis, Bayesian structural time series (BSTS), TBATS forecasting method for modelling time series data, ETS, Facebook Prophet, and autoregressive integrated moving average (ARIMA) techniques. As used herein, the term "outlier" or "outlier data" is intended to mean one or more data points that lie an abnormal distance from other data points in a sample of data points from a population of data points. The data points can have a selected value associated therewith to form data point values. More specifically, the outlier data point values can differ greatly from a majority of a set of data point values and hence fall outside an overall trend that is present in the data. As such, the user or the system can determine what is considered abnormal (e.g., an outlier). Further, the user or the system can also determine those data points that are characterized as normal data points. The characterization of data points as being normal or abnormal can be achieved according to known techniques.

The illustrated pane element 232 can include a pair of adjacent and horizontally aligned top pane regions 236 and 238 and a bottom pane region 240 that is disposed vertically below the top pane regions. The navigation pane element 204, the top pane regions 236 and 238, and the bottom pane region 240 are displayed simultaneously on the user interface 230. The top pane region 236 can include a vertically stacked set of drop down menu elements 242A, 242B, and 242C that allows the user to select and enter certain information and statistical processing models to apply to the input data. For example, the drop down menu element 242A can be a Target drop down menu that allows the user to select via a drop down menu selection caret 244A a preselected data type to be processed to form an input data or input data type. In the current illustrated example, the selected input data type is a financial data type that includes commercial related data. The Target drop down menu can also list any selected types of data that are uploaded by the user, or the selectable types of data can be associated with variables in the selected statistical processing techniques. The drop down menu element 242B in the stacked set of drop down menu elements is a Detection Model drop down menu that allows the user to select via a drop down menu selection caret 244B one or more of a set of preselected statistical processing models that can be applied to the input data type, such as the selected commercial data. In the current example, the user has selected a Bayesian structural time series (BSTS) processing and detection model to be applied to the selected commercial data to detect one or more potential outlier data points in the input commercial data. The statistical processing and detection models in the drop down menu element 242B can also include, for example, in addition to the BSTS, a Quartile Analysis model, a TBATS model, an ETS model, a Facebook (FB) Prophet model, and an auto regressive integrated moving average (ARIMA) model. Further, the drop down menu element 242C is a Treatment Model drop down menu that allows the user to select via a drop down menu selection caret 244C one or more preselected statistical treatment models that can be applied to the input data type, such as the selected commercial data. In the current example, the user has selected a central tendency type of statistical treatment model, such as a Mean treatment model, to be applied to the input data so as to treat the detected outlier data points by replacing the detected outlier data points and associated values with one or more replacement data points and associated values. As such, the statistical treatment model can treat (e.g., correct) the detected outlier data point values with correct or replacement data point values. For example, the mean statistical treatment model can use as a replacement value for the outlier data point value a value that represents the single value of the entire distribution of the dataset. Other selectable treatment models in the drop down menu 242C can include, for example, MEAN, ARIMA, ETS, BSTS, Prophet, Snaive, and TBATS.

The top pane region 236 also includes an indicating element 246, such as the Treatment Threshold indicating element, that can have any selected shape or configuration. The indicating element 246 visually indicates the status of one or more selected features of the top pane region 236. As shown, the illustrated indicating element 246 can have any selected shape and configuration, and preferably includes a horizontally extending scale element having a plurality of predetermined increments or units formed thereon. The predetermined increments can be indicative of one or more selected threshold values or units, such as for example treatment threshold values that can be applied to the data. The user can thus select the threshold value amount. The system of the present invention employ the statistical processing techniques and time series models to detect potential outliers in a given input data, such as the Commercial data. If the processing technique is deemed to be standard, then the statistical processing technique can employ a standard deviation method to detect outliers. If a value is a certain number of standard deviations away from a mean value, then the data point is identified as an outlier. If the statistical processing technique is, for example, ARIMA, ETS or Facebook prophet, then the function uses time series fitted value to identify the outlier data. If the difference between actual data and a fitted value is greater than a certain number of standard deviations away from the mean absolute error (MAE), then the data point is identified as an outlier. The scale element 246 can include or employ a highlight element 248 to visually indicate to the user information associated with the scale element. In the current example, the highlight element 248 indicates that the treatment threshold employs a value of 3.0.

The top pane region 236 can also include a series of selectable radio buttons 250 that are indicative of selected data frequency information. The radio buttons are disposed vertically below the indicating element 246. The selectable radio buttons 250 can be associated with a series of time frames or data frequency metrics over or during which the input data can be analyzed according to the models selected by the drop down menu elements 242B and 242C. In the current example, the radio buttons can correspond to selected time periods, such as daily, weekly, monthly or quarterly time frames or periods. The top pane region 236 can further include a set of actuatable soft buttons 252 that allows the user to select one or more predetermined functions to be performed on the input data. In the current illustrative example, the soft buttons 252 include a Run soft button for running the model or techniques on the input data that is selected by the drop down menu elements 242A-242C, a Review soft button that allows the user to review when actuated the selected features as set forth in the drop down menu elements 242A-242C and the radio buttons 250, and an Update soft button that allows the user to update the displayed information and the techniques to be applied to the data by changing the selections in the drop down menu elements 242A-242C and the radio buttons.

The horizontally adjacent and aligned top pane region 238 can display in any selected data format, such as for example in a tabular format, the type of data selected by the Target drop down menu element 242A. The table can arrange the data in any selected manner and can include a series of columns and rows that are related to the selected metrics. According to the current illustrative example, the top pane region 238 is configured to display a table 260 that includes a date range column for listing a series of dates or date ranges associated with the input data, one or more columns listing the original input data point values associated with the dates of the input data, and one or more columns setting forth data point values associated with the data when cleaned by one or data cleaning or outlier treatment methods. The table 260 can also include an outlier column 262 for indicating whether the data point is an outlier or not.

The bottom pane region 240 can display any selected type of information, and preferably displays a graph or plot 266 that graphically illustrates selected information. In the current illustrative example, the plot 266 is an outlier treatment plot that plots the data point values of the commercial input data over time. The plot can set forth the original data values as well as the values associated with the data when cleaned according to known techniques, and the graph can be configured to highlight one or more section of the plot 266 so as to visually identify or highlight the data associated therewith. The plot 266 thus shows the original data and the new cleaned data after treatment. The illustrated plot 266 is directed to the commercial input data that is selected via the Target drop down menu element 242A. The bottom pane region also includes a series of selectable or actuatable soft buttons 268 that are directed to selected different time frames that are associated with the displayed plot 266. The time frames can be any selected time frame. According to one practice, the soft buttons 268 are associated with time frames of one month, six months, one year, five years, year to date (YTD), and an All button for selecting all of the time frames.

Figure 12:
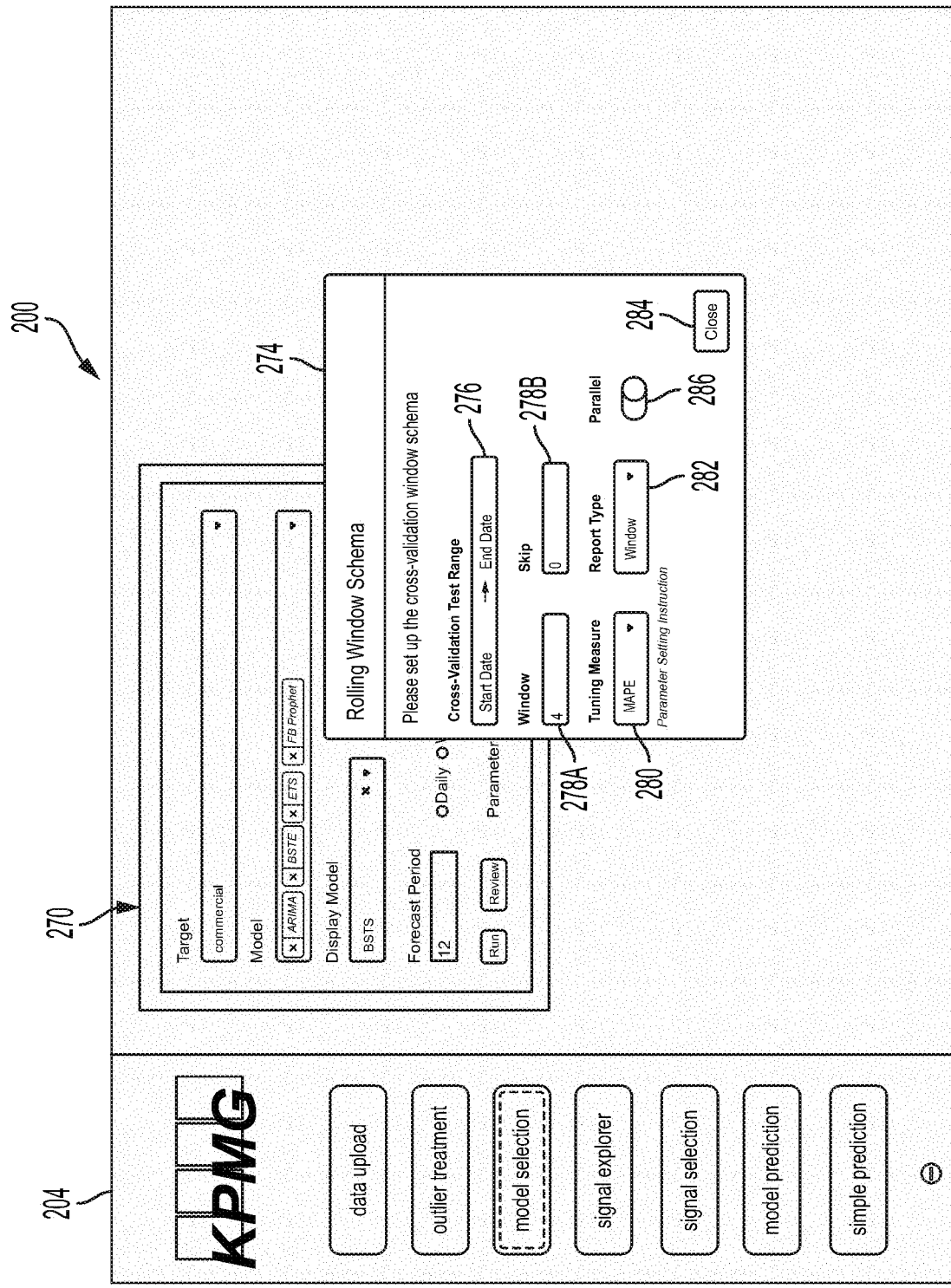
FIG. 12 is a user interface generated by the system of the present invention for display on a display device showing the window and an associated action box when an Outlier Treatment soft button in the navigation pane is actuated by the user.

FIG. 12 illustrates the user interface 270 that is generated by the user interface generator 54 when the Model Selection soft button 210 is selected from the navigation pane element 204 or when the Rolling Schema soft button 302 (FIG. 13) is actuated by the user. The Model Selection soft button 210 is directed to the user's ability to apply one or more different statistical forecasting models (e.g., a time series cross-validation technique) to the input data, while also providing the user with the ability to select the best or appropriate types of statistical forecasting models to apply to the input data. The user interface generator 54 can generate the interface 270, which can be configured to display the navigation pane element 204 and an adjacent pane element 272. The illustrated pane element 272 can include, according to one embodiment, an action box 274 that has one or more selectable or fillable elements for providing additional processing information. For example, the illustrated action box 274 can display elements that allow the user to select different ranges and metrics depending upon the type of model that is to be applied to the input data. In the current illustrative example, the action box 274 can be employed to tune selected parameters (e.g., hyperparameters) for different model types. As used herein, the term "tune" or "tuning" is intended to mean training or modifying one or more parameters of one or more statistical forecasting models to increase or enhance the accuracy of the forecasts or predictions generated by the model. The statistical forecasting model can be adjusted or changed according to known techniques, such as by changing the model type, one or more model coefficients, or increasing/decreasing the model output.

The illustrated action box 274 can allow the user to set up a rolling window schema that includes metrics associated with a selected rolling window. In the current example, the action box 274 can include a Test Range field box 276 for allowing the user to input date ranges that define the temporal extents of the rolling window. Specifically, the Test Range field box 276 allows the user to enter selected dates that function as the start and end dates for a test date range of a rolling window covering a designated portion of the input data. The action box 274 can also include a series of additional field boxes for allowing the user to select additional parameters associated with the rolling window and any selected statistical tuning or forecasting models associated therewith. For example, the set of field boxes can include a Window field box 278A that allows the user to define or select one or more parameters associated with the rolling window, such as the length or size of the window. The rolling window is a defined portion of the input data to which the tuning or forecast model is applied. The field boxes can also include a Skip field box 278B disposed horizontally adjacent to and aligned with the Window field box 278A for allowing the user to designate a portion or segment of the rolling window that should be skipped or omitted. The action box 274 can further include a Tuning Measure drop down menu element 280 for allowing the user to select one or more tuning measure techniques or models that the user can apply to the input data forming part of the rolling window. The drop down menu element 280 is disposed vertically below the Window field box 278A. In the current illustrative example, the Tuning Measure drop down menu element 280 allows the user to select a tuning model, such as the illustrated mean absolute percentage error (MAPE) model or other models to select the best model. Other models that can be selected can include ARIMA, ETS, FB Prophet, BSTS, TBATS, and Snaive. As is known, tuning models can be used to maximize the performance of the statistical forecasting model without overfitting or creating too high of a model variance. In machine learning, this is accomplished by selecting one or more hyperparameters, which can be defined by the user. The selected MAPE model is a measure of a prediction accuracy of a statistical forecasting model. As such, the tuning model can determine the prediction accuracy of the statistical forecasting method selected by the user from the Model drop down menu element 300B, FIG. 13A. The action box 274 can also include a Report Type drop down menu element 282 that allows the user to select the type of report and reporting format. As shown, the report type can include a Window type format, but other format types can be selected, including Period and Out. The Report Type drop down menu element is horizontally adjacent to and aligned with the Tuning Measure drop down menu element 280 and is disposed vertically below the Skip field box 278B. The action box 274 also employs a Close soft button 284 that allows the user when actuated to close the action box 274. Further, the action box includes a Parallel sliding soft button 286 that allows the user to select whether a Parallel technique should be applied to the data. whether to use the parallel algorithm to speed up the fitting function. The application of the parallel technique can be significantly faster than the traditional iterative approach, which is not available in a Windows environment.

Figure 13A:
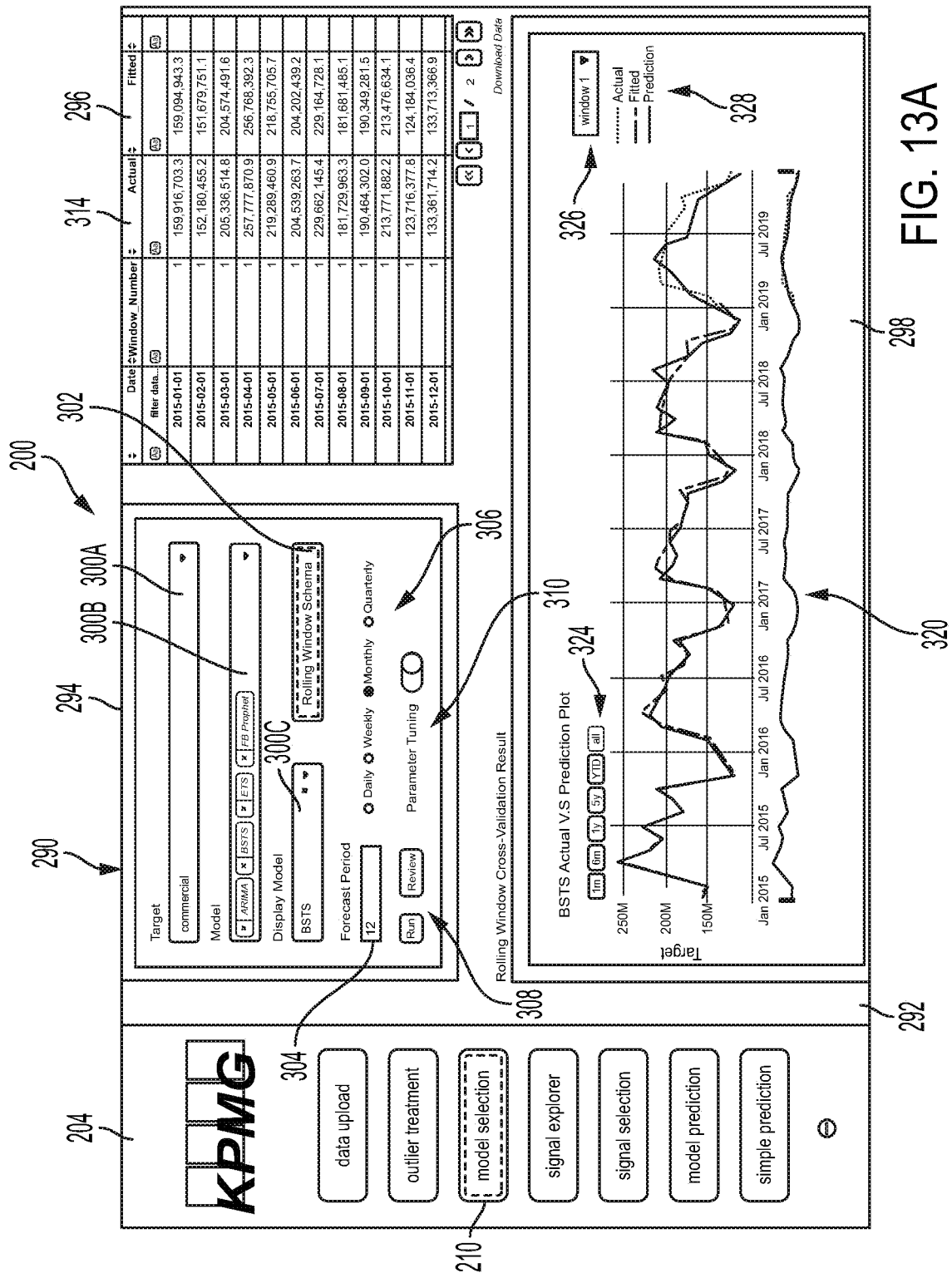
FIG. 13A is a user interface generated by the system of the present invention for display on a display device showing the various pane regions of the window when an Outlier Treatment soft button in the navigation pane is actuated by the user

After the parameters are selected by the user via the action box 274 or when the user actuates the Model Selection soft button 210, the interface generating unit 54 can generate the interface 290, as shown in FIG. 13A. The illustrated user interface 290 can include the persistent navigation pane element 204 and the adjacent pane element 292. According to one embodiment, the pane element 292 can include a pair of horizontally adjacent and aligned top pane regions 294, 296 and a bottom pane region 298 disposed vertically below the top pane regions 294, 296. The top and bottom pane regions are simultaneously displayed with the navigation pane element 204. The Model Selection soft button 210 allows the user to select one or more statistical forecasting models to be applied to the input data. The top pane region 294 of the pane element 292 can include or display a vertically stacked set of drop down menu elements 300A, 300B and 300C that allows the user to select certain types of input data and the models to apply to the input data. For example, the drop down menu element 300A is a Target drop down menu that allows the user to select via a drop down menu selection caret a preselected data type to form the input data. In the illustrated example, the selected data type is commercial related data. The Model drop down menu element 300B allows the user to select via a drop down menu selection caret one or more preselected statistical forecasting models that can be applied to the input data, such as the selected commercial data. The Model drop down menu element 300B is disposed vertically below the Target drop down menu element 300A. In the current example, the user has selected a Bayesian structural time series (BSTS) model, an ARIMA model, an ETS model, and a FB prophet model, to be applied to the input data, so that the user can determine therefrom the best forecasting models to apply to the data. The selected forecasting models process the input data to better understand the data and to derive or generate predictions and insights based on the input data. The drop down menu element 300C is a Display Model drop down menu that allows the user to select which of the statistical forecasting models to display in the bottom pane region 298. The top pane region 294 also includes an actuatable Rolling Window Schema soft button 302 that allows the user, when actuated, to display the action box 274 in FIG. 12. The soft button 302 is horizontally aligned with the Display Model drop down menu element 300C. The top pane region 294 further includes a Forecast Period field box 304 that allows the user to enter a selected time period for analysis. In connection with this time selection, the top pane region 294 also includes a series of selectable radio buttons 306 that are indicative of selected time frames or periods. Specifically, the selectable radio buttons 306 can be associated with a series of time periods that define the time period over which the data can be analyzed employing the selections in the drop down menu elements 300A-300C. The radio buttons correspond to daily, weekly, monthly or quarterly time periods, and the user entry in the field box 304 defines the number of user selected time periods. In the current illustrative example, the radio buttons 306 corresponding to a monthly time period is selected and the user can enter the number "12" in the field box 304, thus indicating that the time period is to cover twelve months of input data. The top pane region 294 can further include a set of actuatable soft buttons 308 that allows the user to select one or more predetermined functions to be performed on the input data. In the current example, the soft buttons 308 include a Run soft button for running the selected forecasting model or technique on the data that is selected by the field box 300A, as well as a Review soft button that allows the user to review, when actuated, the features selected in the field boxes 300A-300C and the radio buttons 306. Still further, the top pane region 294 can include a selectable Parameter Tuning sliding soft button 310 for allowing the user to select whether to apply a set of tuning parameters to the input data. When the soft button is selected or set to False, the system can run all models with default parameters. Alternatively, when set to True, the system can initially run parameter tunning to select the best combination of parameters for each model, and then select the best model based on the results.

The horizontally adjacent and aligned top pane region 296 can display in any selected data format, such as in a tabular format, the type of data selected by the drop down menu element 300A along with any metrics selected in the action box 274. For example, the illustrated table 314 can include a series of columns and rows related to selected metrics, such as date ranges, the number of selected rolling windows via the action box 274, as well as the results of the operations and techniques applied to the data as selected by the user via the drop down menu elements 300A-300C and the action box 274. The actual data column sets forth the actual data, the fitted data column sets forth the sample fitted data, and the prediction column sets forth the prediction results.

The bottom pane region 298 can display any selected type of information, and preferably displays a plot 320 of the output of the statistical forecasting model selected in the Display Model drop down menu element 300C when applied to the input data over a selected period of time. The illustrated plot 266 is directed to the commercial data that is selected via the Target drop down menu element 300A. The plot 320 can include information associated with the actual target data, as well as predicted target data. Specifically, the plot 320 graphically plots the result from the model selection function, and the user can select the drop down menu element 326 to select each rolling window result. The plot 320 includes actual data, model fitted data values, and model test prediction results. The bottom pane region 298 also includes a series of selectable or actuatable soft buttons 324 that are directed to the time frame that is associated with the displayed plot 266. The time frame can be any selected time frame. According to one practice, the soft buttons 268 are associated with time frames of one month, six months, one year, five years, year to date (YTD), and an All button for selecting all of the time frames. The drop down menu element 326 also allows the user to display a selected rolling window in the plot 320. As shown, the "window 1" rolling window is displayed in the plot 320. The bottom pane region 298 can also display a legend 328 that conveys information associated with the contents of the plot 320.

Figure 13B:
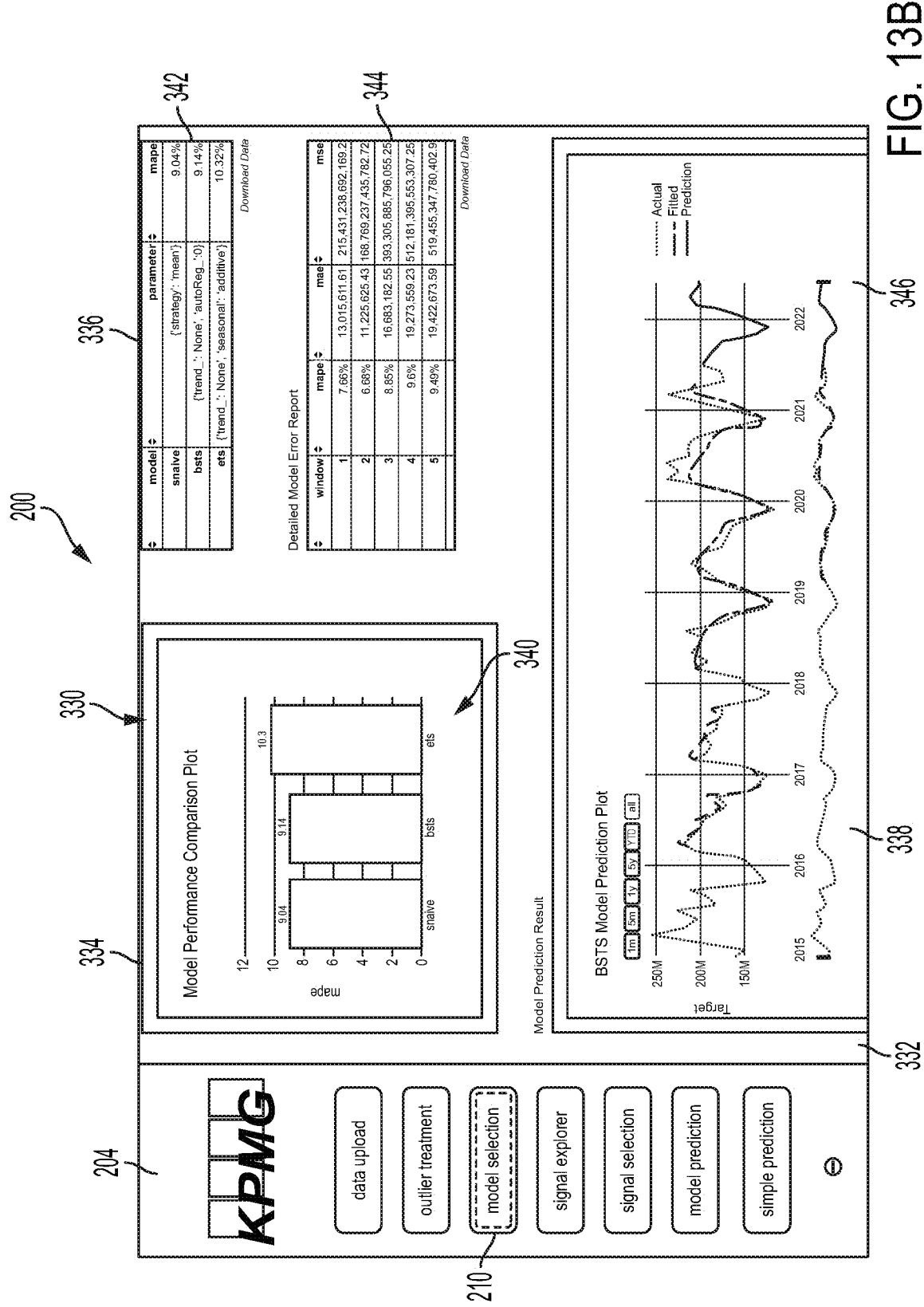
FIG. 13B is a user interface generated by the system of the present invention for display on a display device showing additional pane regions in the window when an Outlier Treatment soft button in the navigation pane is actuated by the user.

The user interface generator 54 can also generate the user interface 330, as shown in FIG. 13B, when the user selects the features and parameters set forth in the action box 274 and in the drop down menu elements 300A-300C of the top pane region 294 of the user interface 290. The illustrated user interface 330 includes the persistent navigation pane element 204 and the adjacent pane element 332. The pane element 332 can include the horizontally adjacent and aligned top pane regions 334, 336 and a bottom pane region 338 disposed vertically below the top pane regions. The top pane region 334 adjacent to the navigation pane element 204 can display any selected type of information, and according to one embodiment displays a graphical element 340 that graphically depicts information associated with one or more of the statistical forecasting models or techniques selected via the drop down menu elements 300A-300C, FIG. 13A. The illustrated graphical element can be for example a graph 340 that compares the accuracy of one or more selected statistical forecasting models relative to each other. The graph 340 can visually display the comparison of the accuracy of a number of different models or techniques relative to each other, such as for example, as shown, a seasonal naïve (SNAIVE) forecasting model, a Bayesian structural time series (BSTS) forecasting model, and an exponential smoothing (ETS) forecasting model, using a forecasting accuracy model, such as for example a mean absolute percentage error (MAPE) model, as a forecasting accuracy measurement technique. The horizontally adjacent and aligned top pane region 336 can also display information associated or related to the statistical forecasting models. The top pane region 336 can be configured to display or include, for example, a pair of tables 342 and 344. The tables 322, 324 can include a series of columns and rows. The illustrated table 342 for example can include a forecasting model column that lists the statistical forecasting models that are being compared relative to each other. The second column can set forth the one or more selected parameters associated with each forecasting technique. For example, if the user selects a Prophet model, then the second column can set forth seasonal parameter data. The third column can set forth an accuracy percentage using the illustrated MAPE forecasting accuracy model. The second table 344 can include a number of rows and columns, and specifically can include a column identifying the rolling windows generated by the system of the present invention, as well as one or more columns identifying the forecasting accuracy models selected by the user and the accuracy percentages associated with each rolling window. The table 344 can also set forth errors by window or by period out, as well as return training error or test error data. The available error measuring techniques can include MAPE, MAE, MSE and RMSE. The bottom pane region 398 can also display information associated with or related to one or more of the statistical forecasting models. According to one embodiment, the bottom pane region 398 can display a plot 346 associated with the forecasting model selected by the user via the drop down menu element 300B. In the current example, the plot 346 includes a BSTS model prediction plot over a selected period of time. The selected forecasting model can take the input data and determine the next twelve periods.

Figure 14:
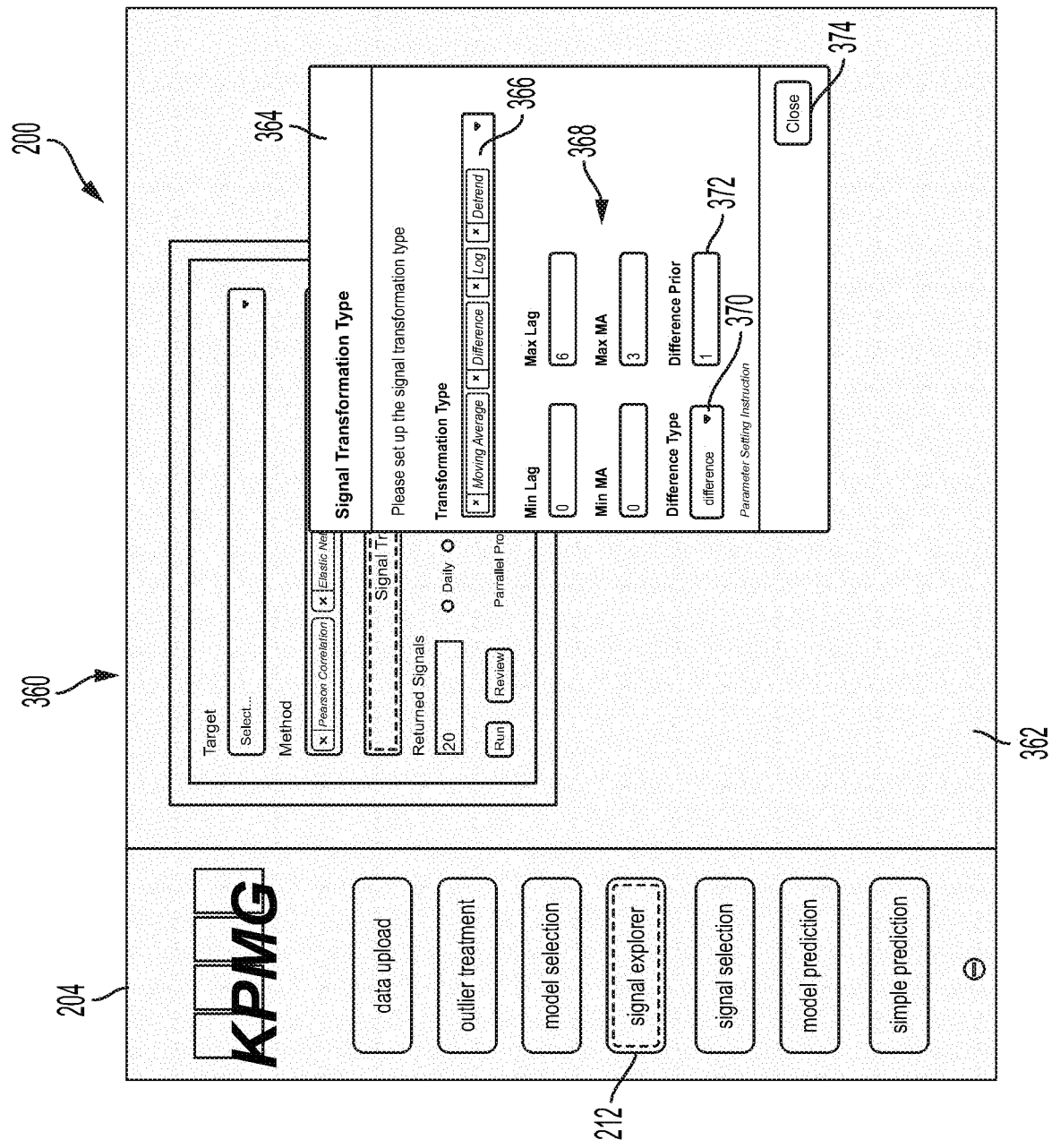
FIG. 14 is a user interface generated by the system of the present invention for display on a display device showing the window and an associated action box when the Signal Explorer soft button in the navigation pane is actuated by the user.
Figure 15:
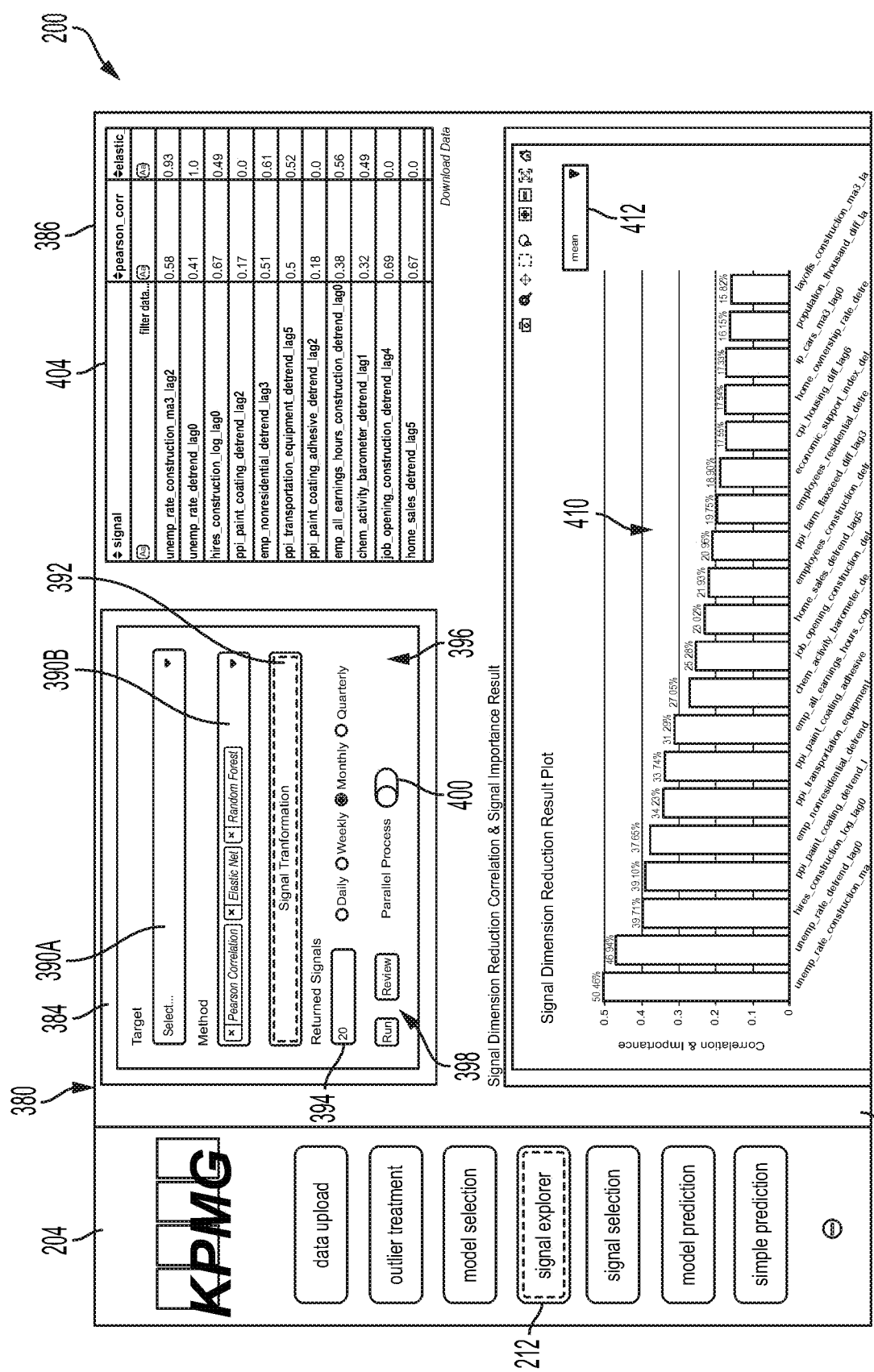
FIG. 15 is a user interface generated by the system of the present invention for display on a display device showing the window and associated pane regions when the Signal Explorer soft button in the navigation pane button is actuated by the user.

FIG. 14 illustrates the user interface 360 that is generated when the Signal Explorer soft button 212 is selected from the navigation pane element 204 or when the Signal Transformation soft button 392, FIG. 15, is actuated by the user. The Signal Explorer soft button 212 is directed to the user's ability to apply different types of signal transformation and correlation functions and methods to the selected input data and associated signals and datasets and then determine, if desired, the best or appropriate transformation method based on any resultant correlation values. As is known, data transformation is a process where the input data is transformed or changed from an initial raw and siloed source state and changed into data that is joined together, dimensionally modeled, de-normalized, and ready for analysis. As such, data transformation helps ensure maximum data quality, which is important to gaining accurate analysis, leading to valuable insights that eventually empower data-driven decisions. More specifically, the transformation functions or techniques process the input data to create different versions of the signal data to make the data more useful for processing by the subsequently applied techniques. The transforms are usually applied so that the data appears to more closely meet the assumptions of a statistical inference model or procedure that is to be applied, or to improve the interpretability or appearance of graphs. The function that is used to transform the data is typically invertible and generally is continuous. As such, the user interface generator 54 can generate the interface 360, which can be configured to display the navigation pane element 204 and a pane element 362. The illustrated pane element 362 can include, according to one embodiment, a signal transformation type action box 364 that has one or more selectable or fillable metric ranges and types of actuation elements that can be input or selected by the user. In the current illustrative example, the illustrated action box 364 can be employed to select the type of transformation methods and functions to be applied to the input data, as well as select any associated metric ranges. Specifically, the action box 364 can include a Transformation Type drop down menu element 366 that allows the user to select one or more transformation functions or methods from a drop down menu to apply to the input data. The possible transformation functions can include moving average, difference (e.g., the change between each period and a prior period, either as a percentage or a simple difference), normalize (e.g., rescaled equivalents (transformed to a 0-1 range) of existing variables in the data), Box-Cox power transformation, and detrend (e.g., remove linear trend along axis). In the current illustrative example, the user selects from the drop down menu a plurality of transformation methods, including a moving average transformation type, a difference transformation type, a log transformation type, and a detrend transformation type. The action box 364 also includes a set of field boxes 368 for defining the parameters of the signal transformation, including for example by selecting the minimum and maximum lag and the minimum and maximum MA of the selected transformation types. The action box 364 can further include a Difference Type drop down menu element 370 for selecting a difference type from a drop down menu to be applied to the input data and a field box 372 for entering a prior difference value to be applied to the input data. The action box 364 can also include a Close soft button 374 for allowing the user to close the action box 364.

Further, when the Signal Explorer soft button 212 is actuated, the user interface generator 54 generates the user interface 380, as shown in FIG. 15. The illustrated user interface 380 includes the navigation pane element 204 and the pane element 382. The Signal Explorer soft button 212 is directed to the user's ability to apply or run different kinds of signal transformation functions or techniques on the input data, including input signal data, and then select the best transformation type based on any resultant transformation value, such as a correlation value, so as to help any applied models make better predictions. The pane element 382 includes an adjacent pair of horizontally aligned top pane regions 384, 386 and a bottom pane region 388 disposed vertically below the top pane regions. The navigation pane element 204, the top panes regions 384 and 386, and the bottom pane region 388 are displayed simultaneously on the user interface 380. The top pane region 384 can include a vertically stacked set of drop down menu elements 390A and 390B that allow the user to select certain types of target data and correlation techniques. For example, the drop down menu element 390A allows the user to select the type of input data that the user wishes to have processed by certain selected correlation methods or techniques. The Method drop down menu element 390B is disposed vertically below the Target drop down menu element 390A and allows the user to select one or more preselected correlation methods or techniques. The correlation methods or techniques allow the user to correlate multiple different types of datasets. In the current illustrative example, the user can select from the drop down menu a Pearson correlation method, an Elastic net correlation method, and a Random Forest correlation method. Other possible methods that can be selected include a GBM (Gradient Boosting Machine) method, a Kendall Correlation method, and a Spearman Correlation method. The top pane region 384 also includes an actuatable Signal Transformation soft button 392 for opening in the user interface 360 the action box 364, as shown in FIG. 14. The top pane region 384 further includes a Returned Signals field box 394 for allowing the user to select the number of returned signals that the user desires to apply thereto the selected correlation methods, as well as wants to return in the dimension reduction function. The top pane region 384 also includes a series of selectable radio buttons 396 that are indicative of selected time period information. Specifically, the selectable radio buttons 396 can be associated with a series of time frames that define the time frame over which the data can be processed or analyzed by employing the selections in the drop down menu elements 390A and 390B. In the current example, the radio buttons 396 can correspond to daily, weekly, monthly or quarterly time frames. The top pane region 384 can still further include a set of actuatable soft buttons 398 that allows the user to select one or more predetermined functions to be performed on the input data. In the current example, the soft buttons 398 can include a Run soft button for running the selected correlation techniques on the data that is selected by the field box 390A, as well as a Review soft button that allows the user to review, when actuated, the features selected in the field boxes 390A-390B and the radio buttons 396. Still further, the top pane region 384 includes a selectable Parallel Process sliding soft button 400 for allowing the user to select whether to apply a parallel process to the selected data so as to speed up the fitting function. The parallel algorithm can be significantly faster than the traditional iteration approach, which is typically not available in a Windows environment.

The horizontally adjacent top pane region 386 can display in any selected data format, such as in a tabular format, the type of input data selected by user via the drop down meu element 390A along with any correlation models selected by the user via the drop down menu element 390B. For example, the illustrated table 404 can include a series of rows and columns related to selected metrics, such as the number of returned signals entered into the field box 394 and the correlation models selected in the Method drop down menu element 390B. The illustrated table 404 can include a column listing and identifying the returned signals forming part of the input data that are being processed by the selected correlation model. The table 404 can also have one or more additional columns listing or setting forth the correlation methods selected by the user via the Method drop down menu element 390B. In the current illustrative example, the table 404 has a column setting forth a first correlation method (e.g., Pearson correlation) selected by the user as well as the correlation values generated by the method when used to process each of the signals set forth in the signal column. Likewise, the table 404 includes another optional column listing another correlation method (e.g., Elastic Net) selected by the user as well as the correlation values generated by the method when processing each of the signals. The table shows the signal importance value for each signal, including correlation value, elastic net signal importance score, and random forecast signal importance score.

The illustrated bottom pane region 388 can display any selected type of information, and preferably displays a Signal Dimension Reduction Result graph or plot 410 of the correlation values along the Y-axis and the signals selected via the Returned Signals field box 394 along the X-axis. The bottom pane region 388 can also include a drop down menu 412 that allows the user to select a selected arithmetic operation to be applied to the signals. In the current illustrative example, the user has selected the arithmetic "mean" of the signal selection method. Specifically, the user can select a "mean" or other individual signal importance scores like correlation, elastic net signal importance score, and random forecast signal importance score.

Figure 16:
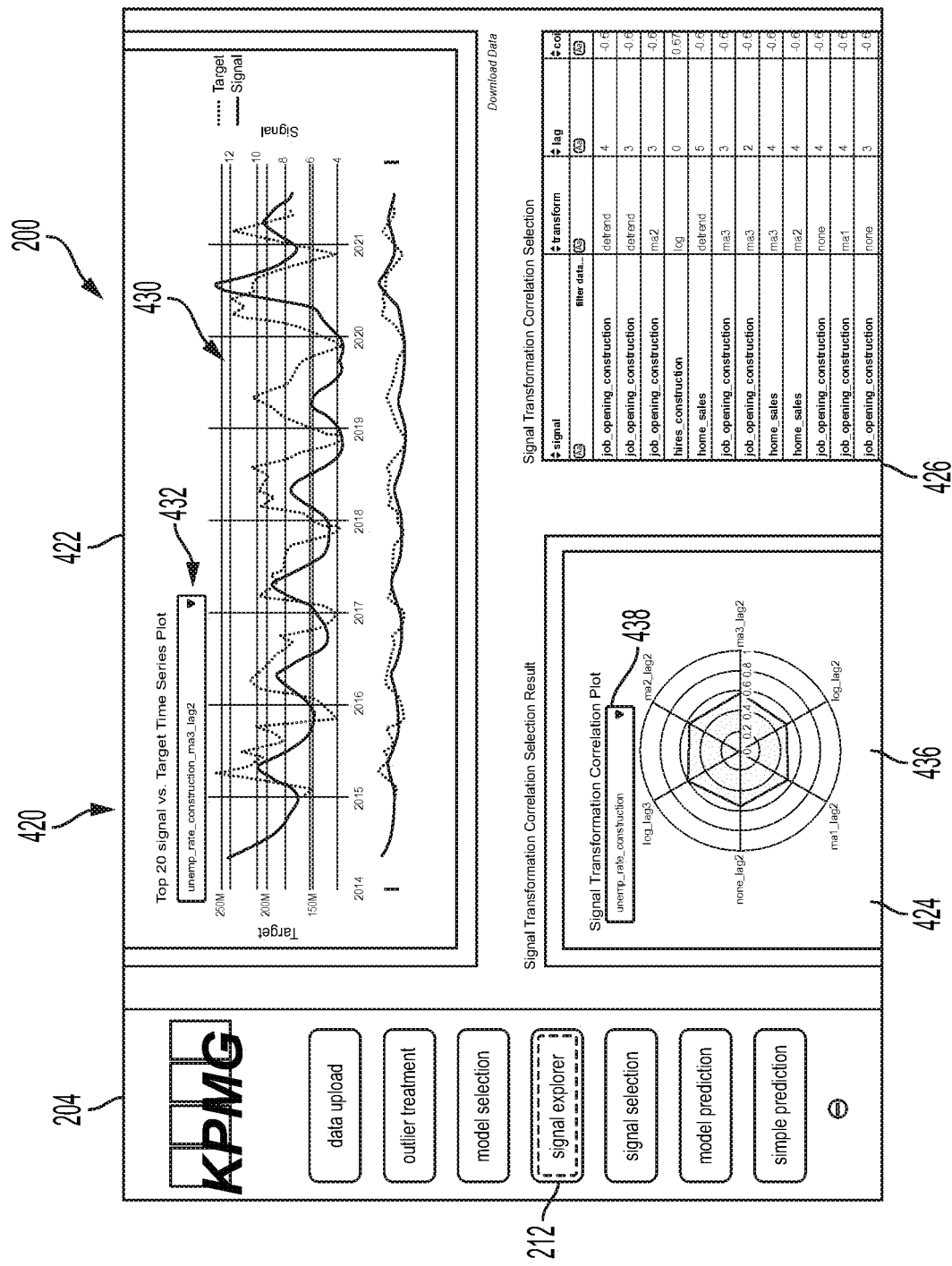
FIG. 16 is a user interface generated by the system of the present invention for display on a display device showing the window and additional pane regions when the Signal Explorer soft button in the navigation pane is actuated by the user.

The user interface generator 54 can also generate the user interface 420 shown in FIG. 16 when the Signal Explorer soft button 212 is actuated by the user. The user interface 420 can display the illustrated selected information or can include a set or series of pane regions to display the information. According to one practice, the user interface 420 can include a top pane region 422 and a pair of horizontally adjacent bottom pane regions 424, 426 that are disposed vertically below the top pane region 422. The illustrated top pane region 422 and the bottom pane regions 424 and 426 can be simultaneously displayed on the user interface 420. The top pane region 422 can include a graph or plot 430 that graphically illustrates an actual target data value as compared to a target signal value over a selected period of time. Specifically, the plot 430 includes a target value along the Y-axis and a time duration along the X-axis. The graph can include multiple overlaid graphs, including for example a target graph and a signal graph. As such, the plot 430 graphically illustrates a target variable versus signal time series plot and shows the trend and seasonality between target and signals. The top pane region can also include a drop down menu element 432 that allows the user to select specific signals to be plotted in the graph 430.

The bottom pane region 424 can also display a graphical representation of selected signal data, such as for example a signal transformation correlation plot 436 of one or more of the signals. The plot 436 shows the top six transformation types for each selected signal. The bottom pane region 424 can also include a drop down menu 438 that allows the user to select a signal that can be plotted in the plot 436. The adjacent bottom pane region 426 can display a signal transformation correlation table 440 that has selected rows and columns for tabulating the signals selected by the user via the field box 394. The columns can be representative of the selected signals, the type of correlation method applied to the signal selected via the field box 390B, a lag value column indicative of the lag of the signal data, and the like. For example, a time period of shipping activity can be compared against a forecast that is set for a time period for a specific number of days/months prior which is called Lag. The Lag is based on the lead time from order placement to order delivery.

Figure 17:
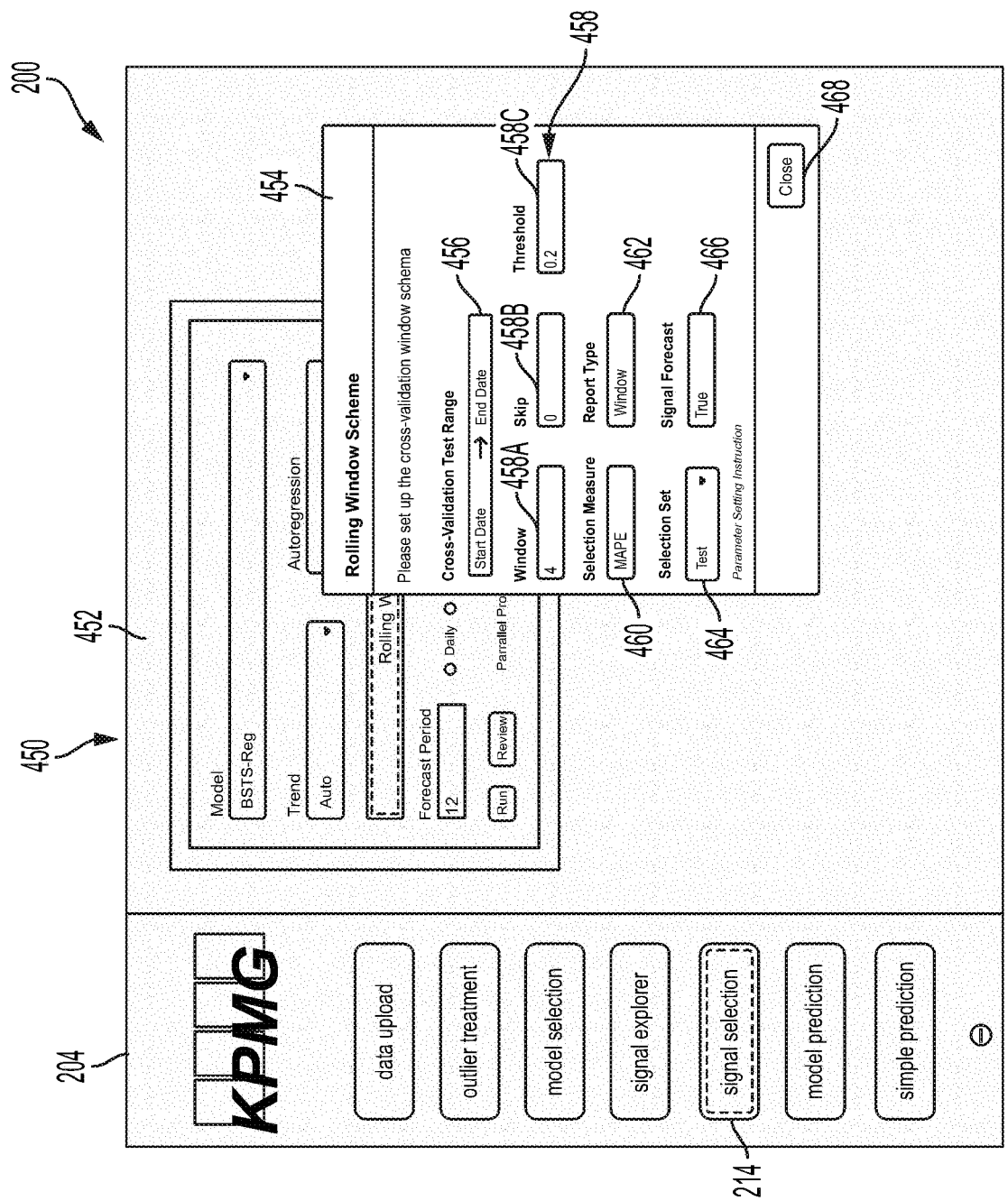
FIG. 17 is a user interface generated by the system of the present invention for display on a display device showing the window and associated action box when the Signal Selection soft button in the navigation pane is actuated by the user.
Figure 18:
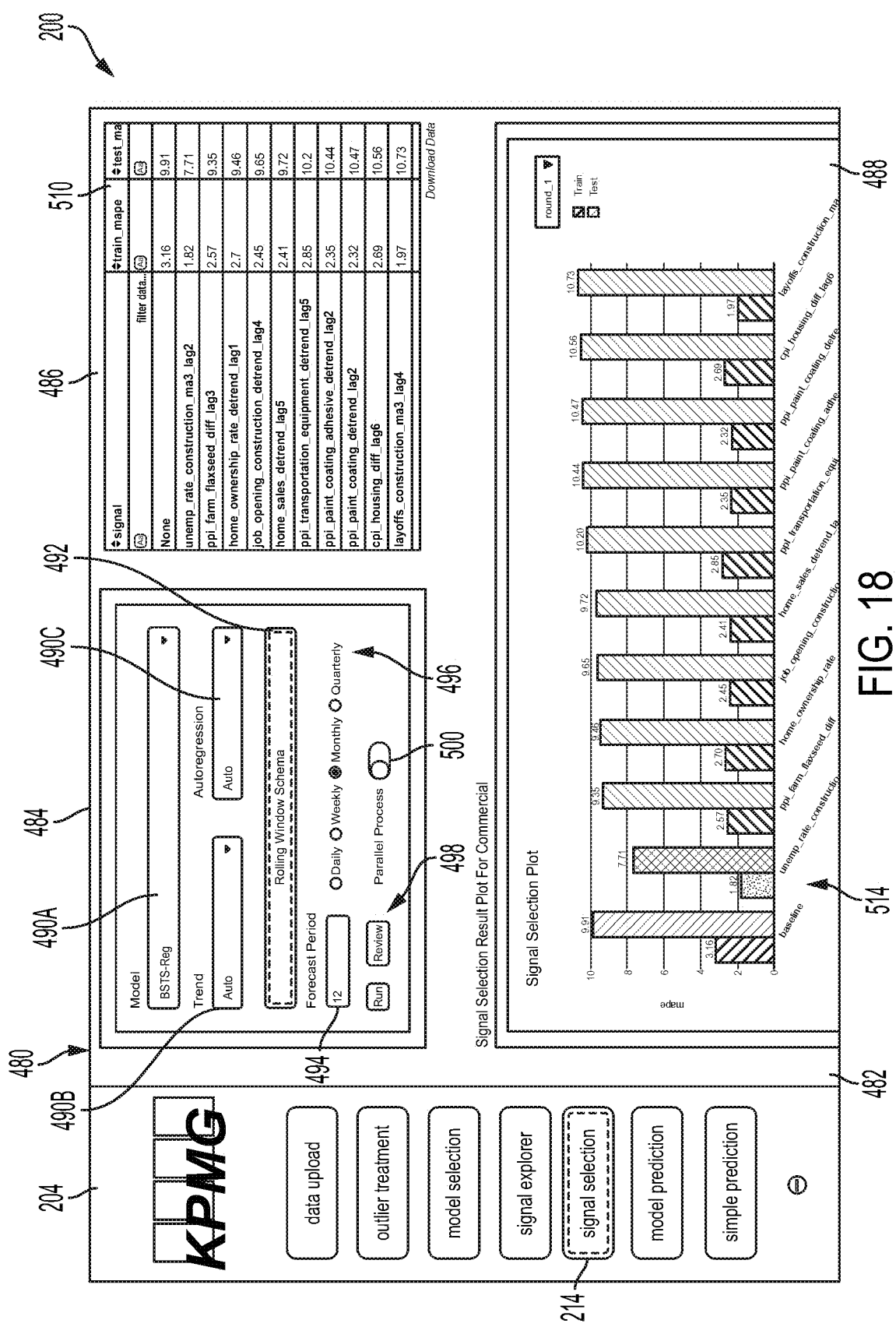
FIG. 18 is a user interface generated by the system of the present invention for display on a display device showing the window and associated pane regions when the Signal Selection soft button in the navigation pane is actuated by the user.

FIG. 17 illustrates the user interface 450 that is generated when the Signal Selection soft button 214 is selected from the navigation pane 204 or when the Rolling Window Schema soft button 492, FIG. 18, is actuated by the user. The Signal Selection soft button 214 allows the user to run forward signal selection and backward signal elimination so as to add signals into one or more selected time series models of the input data. Specifically, the actuation of the Signal Selection soft button 214 processes a time series model with a number of signals and then dropping one at a time, or adding one at a time, based on some criteria of model improvement until the "best" model is found or determined. As such, the user interface generator 54 can generate the interface 450, which can be configured to simultaneously display the navigation pane 204 and a pane element 452. The illustrated pane element 452 can include, according to one embodiment, a Rolling Window Schema action box 454 for allowing the user to select certain metrics or parameters of a validation process associated with a rolling window. As illustrated, the action box 454 can include a Test Range field box 456 for allowing the user to input date ranges that define the temporal extents of the rolling window. Specifically, the Test Range field box 276 allows the user to enter selected dates that function as the start and end dates for a test date range of a rolling window covering a designated portion of the input data. The action box 454 can also include a set of additional field boxes 458 for allowing the user to select additional parameters associated with the rolling window and any selected statistical measuring and forecasting models associated therewith. For example, the field boxes 458 include a Window field box 458A for allowing the user to define or select one or more parameters associated with the rolling window, such as the length or size of the window, by entering a selected numeric value in the field box. The rolling window can be a defined portion of the input data to which the forecast model is applied. The field boxes 458 can also include a Skip field box 458B that is disposed horizontally adjacent to and aligned with the Window field box 458A for allowing the user to designate a portion or segment of the rolling window that should be skipped or omitted. The field boxes 458 can also include a Threshold field box disposed adjacent to the Skip field box 458B for allowing the user to enter an error threshold value to terminate a signal selection function. By simple way of example, if the threshold is 0.5 (e.g., 0.5%), the function can reduce the forecast error by 0.5%. The action box 454 further includes a first horizontal set of drop down menu elements disposed below the field boxes 458. The drop down menu elements include a Selection Measure drop down menu element 460 for allowing the user to select one or more statistical prediction accuracy techniques (e.g., forecasting accuracy modes), such as the illustrated mean absolute percentage error (MAPE) technique, to apply to the input data forming part of the rolling window. The MAPE technique is a measure of prediction accuracy of a forecasting method. The action box 454 can also include a Report Type drop down menu element 462 that is disposed horizontally adjacent to the Selection Measure drop down menu element 460 for allowing the user to select via a drop down menu the type of report and associated reporting format. As shown, the report type can include a window type format. Other reporting selectable reporting types can include Period and Out. The action box 454 can be further configured to include another horizontally aligned set of drop down menu elements disposed below the drop down menu elements 460, 462. This set of drop down menu elements can include a Selection Set drop down menu element 464 that allows the user to select a set type, such as the illustrated Test set type, as well as a Signal Forecast drop down menu element 466 that allows the user to select a signal forecast condition, such as the indicated true condition. As such, the drop down menus can be used such that the forecast model generates forecasts of given signals so as to make out-of-sample errors more conservative than using the true values, which are only known after the fact. A Close soft button 468 can be employed so as to close the action box 454.

After the parameters are selected by the user via the action box 454 or when the Signal Selection soft button is actuated, the interface generating unit 54 can generate the user interface 480, as shown in FIG. 18. The user interface 480 includes the persistent navigation pane element 204 and the adjacent pane element 482. According to one embodiment, the pane element 482 can include a pair of horizontally adjacent and aligned top pane regions 484, 486 and a bottom pane region 488 disposed vertically below the top pane regions, which are simultaneously displayed along with the navigation pane element 204. The top pane region 484 can include a set of drop down menu elements 490A, 490B and 490C that allow the user to select certain information, trend models, and autoregression techniques to apply to the input data. For example, the Model drop down menu element 490A is a drop down menu that allows the user to select one or more preselected statistical forecasting or prediction models that can be applied to the input data. In the current illustrative example, the user has selected a Bayesian structural time series (BSTS) model for application to the input data. Other selectable statistical forecasting models can include, for example, an ARIMA model, an ETS model, and a Facebook (FB) prophet model. The top pane region 484 also includes a Trend drop down menu element 490B disposed vertically below the Model drop down menu element that allows the user to select the type of trend to apply to the input data, which in essence is the model parameter for the BSTS model selected by the drop down menu 490A. The Trend drop down menu element 490B is disposed vertically below the Model drop down menu element 490A. In the current illustrative example, the user can select to have the trend automatically (Auto) applied to the input data. The drop down menu element 490B can also include an auto regression parameter for allowing the user to add an autoregressive component to the selected model in order to correctly align the coefficients. The latent states of auto regression are aligned in a selected order (e.g., today – degree, today – degree +1, today –2, today –1), and the like. Similarly, the top pane element 484 can further include an Autoregression drop down menu element 490C disposed horizontally adjacent to and aligned with the Trend drop down menu element 490B that allows the user to determine whether an autoregression technique is to be applied to the input data. As shown, the user can select from the menu of options an Auto selection such that the selected technique is automatically applied to the input data.

The top pane region 484 can also include an actuatable Rolling Window Schema soft button 492 that allows the user, when actuated, to display the action box 454 in FIG. 17. The top pane region 484 further includes a Forecast Period field box 494 that allows the user to enter a selected time period for analysis. In connection with this time selection, the top pane region 484 also includes a series of selectable radio buttons 496 that are indicative of selected time periods. Specifically, the selectable radio buttons 496 can be associated with a series of time frames or frequency metrics that define the time frame over which the data can be analyzed by employing the selections in the drop down menu elements 490A-490C. In the current example, the radio buttons 496 can correspond to daily, weekly, monthly or quarterly time frames. The top pane region 484 can further include a set of actuatable soft buttons 498 that allows the user to select one or more predetermined functions to be performed on the data. In the current example, the soft buttons 498 include a Run soft button for running the selected forecasting model or technique on the data that is selected by the drop down menu element 490A, as well as a Review soft button that allows the user to review, when actuated, the features selected in the drop down menu elements 490A-490C field box 494, and the radio buttons 496. Still further, the top pane region 484 can include a selectable sliding soft button 500 for allowing the user to select whether to apply or select a parallel process feature so as to speed up the fitting function. The parallel algorithm can be significantly faster than the traditional iteration approach.

The other adjacent top pane region 486 can display in any selected data format, such as in a tabular format, the type of data being processed by the statistical forecasting model selected via the Model drop down menu element 490A along with any metrics selected in the action box 454. For example, the illustrated table 510 can include a series of columns and rows related to selected metrics, such as for example to the types of signals, forecasting models and measurement techniques, and the like, that are selected by the user. For example, the illustrated table 510 can include a column that sets forth the type of selected and analyzed signals and associated data sets, another column that identifies the selected test measurement technique and the model training measurements associated with each signal data set, another column that identifies the selected test measurement technique and the associated test measurements associated with the signal data sets, and the like. The table 510 can tabulate any selected type of information provided in the action box 454 and the top pane region 484. The table can thus set forth information associated with the signal selection result, and can tabulate information that shows the improvement after adding each signal.

Figure 19:
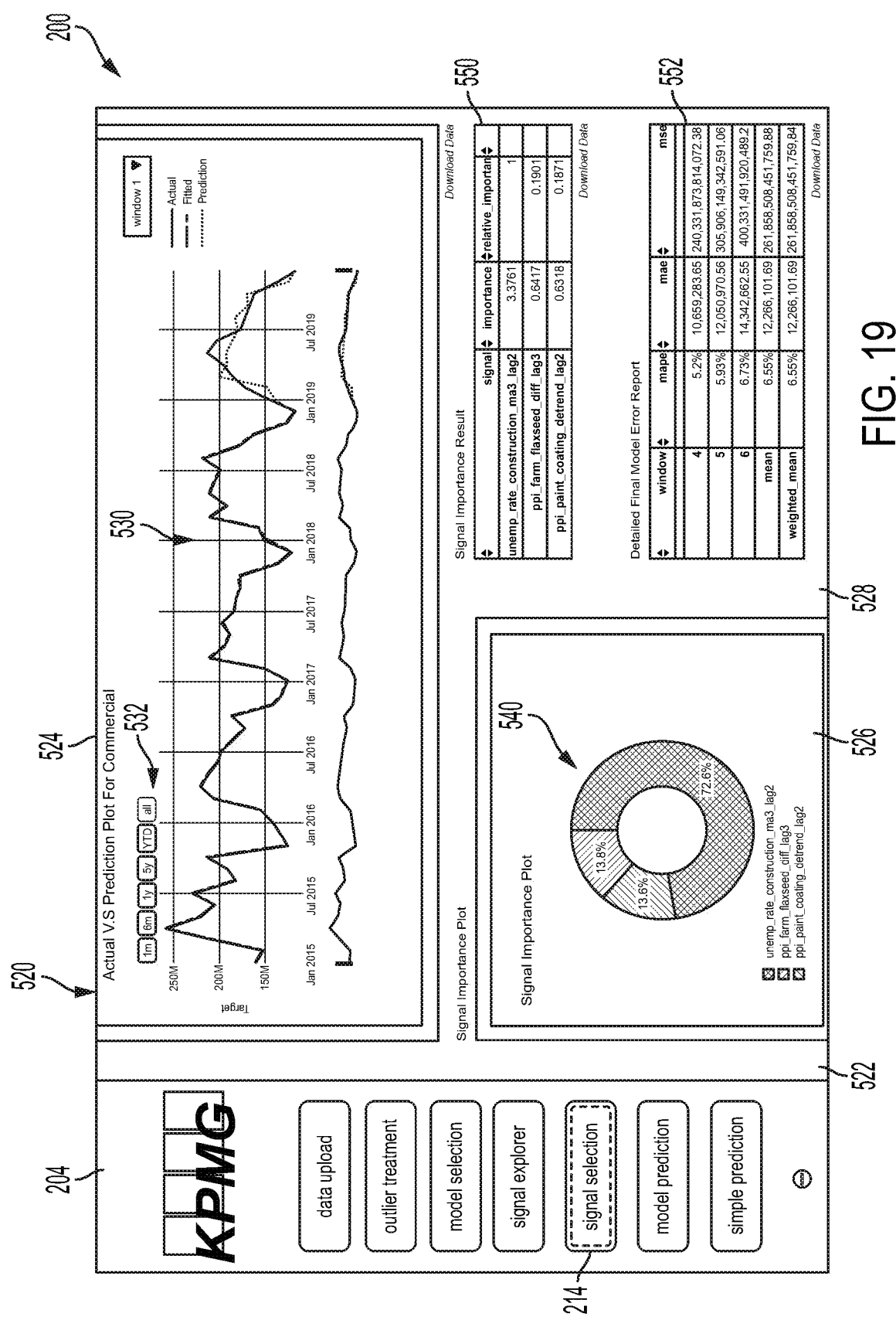
FIG. 19 is a user interface generated by the system of the present invention for display on a display device showing the window and additional pane regions when the Signal Selection soft button in the navigation pane is actuated by the user.

The bottom pane region 488 can display any selected type of information, and preferably displays a plot 514 of the data set forth in the table 510. For example, the plot 514 can be a graph of the selected forecasting method and the selected signals, while also displaying selected values associated with each signal. For example, the plot 514 can display prediction accuracy values using a MAPE technique associated with each signal. The train is running a selection using a training set and the test is running a selection using a test set. The user interface generator can also generate the illustrated user interface 520 when the signal selection soft button 214 is actuated by the user, as shown in FIG. 19. The user interface 520 includes and displays simultaneously the navigation pane 204 and the pane element 522. The pane element 522 includes and displays simultaneously a top pane region 524, and a pair of horizontally aligned bottom pane regions 526 and 528. The top pane region 522 can be configured to display a graph or plot 530 of a target signal value over a selected period of time. The plot 530 can graphically illustrate actual measurements of a selected signal and corresponding dataset, as well as display signal fitted portions, and if desired, predicted portions of the signal. The selected period of time can be selected from a series of radio buttons 532 that allow the user to select one or more selected time periods, such as for example monthly, six months, yearly, five year, and year to date (YTD) time periods. The plot 530 also shows the cross validation result of the final selected model along with the comparison of actual and predicted results.

The illustrated bottom pane region 526 can display a plot 540 of an importance of the selected and processed signal data relative to each other. The applied technique can employ a leave-one-out importance algorithm to calculate signal importance, which corresponds to the most important signal in the model. The leave-one-out algorithm borrows the concept from conditional independence structures that remove important features that usually cause larger changes in the conditional distribution. The leave-one-out algorithm defines the score of each feature as the performance change with respect to the absence of the feature from the full feature set. The importance of the objectives is then reflected in the scores. The plot 540 can be displayed in any selected format, such as a circular or pie chart. The plot 540 graphically displays the measurement of each selected signal relative to other selected signals. The plot 540 can be color coded so as to visually display and to visually indicate to the user the relative importance of each signal.

The adjacent bottom pane region 528 can include one or more tables for displaying to the user selected signal related information. In the current illustrative example, the pane region 528 can display a pair of tables 550, 552. The illustrated table 550 displays in tabular form the types of signals and related measured signal importance data. For example, the table can include a series of rows and columns, and specifically can include a column setting forth the different types of signals, a column setting forth the measured signal importance value associated with each listed signal, and a column setting forth a relative importance score. The relative importance is the normalized importance result, defined in a range from 0 to 1. Further, the illustrated table 552 also includes a series of rows and columns showing detailed signal importance information, and specifically can include a column setting forth the window number provided in the Window field box 458A, FIG. 17, a column setting forth in a header cell the selection measurement technique selected by the user in the drop down menu 460 as well as the measurement values associated with each selected window number, and the like.

Figure 20:
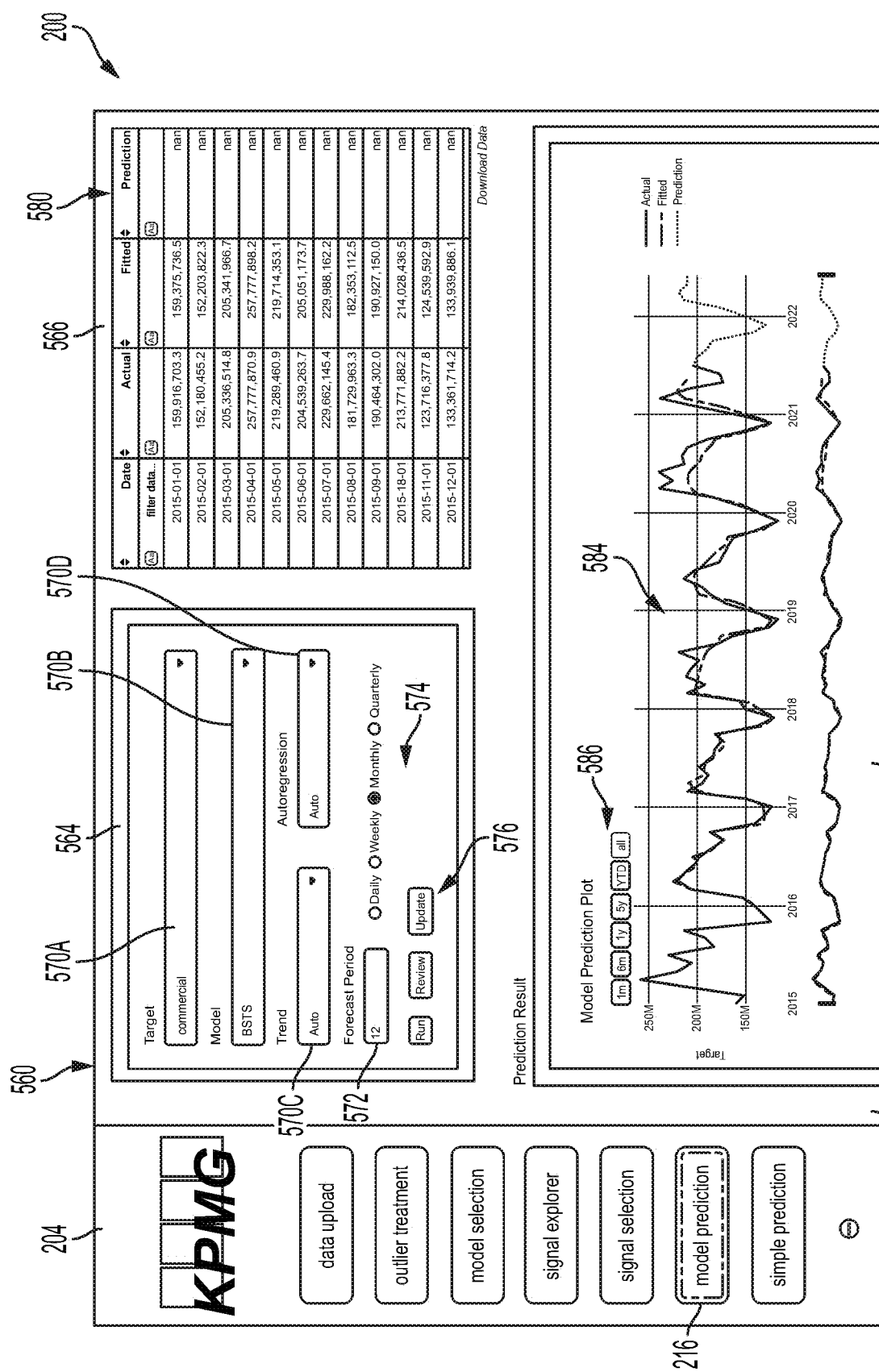
FIG. 20 is a user interface generated by the system of the present invention for display on a display device showing the window and associated pane regions when the Model Prediction soft button in the navigation pane is actuated by the user.

As shown in FIG. 20, when the user actuates the Model Prediction soft button 216 of the navigation pane element 204, the user interface generator 54 generates the user interface 560 of the window element 200. The illustrated user interface 560 can include and simultaneously display the navigation pane element 204 formed along a left hand side of the user interface 560, as well as a pane element 562, which covers the remaining area of the interface. The Model Prediction soft button 216 instructs the application, based on user selections, to apply one or more statistical forecasting models to generate forecasts and predictions for a single target variable (e.g., forecast one target variable at a time). The statistical forecasting models help collect, organize, analyze, interpret, and present data and uncover patterns and trends within the data. The statistical forecasting models can include, for example, data sampling, central tendency (e.g., mean, median, and mode), random variables (e.g., discrete, continuous, skewness, variance, and the like), probability distributions, statistical inference, confidence interval, hypothesis testing, quartile analysis, Bayesian structural time series (BSTS), TBATS forecasting method for modelling time series data, ETS, Facebook Prophet, and autoregressive integrated moving average (ARIMA) techniques. The illustrated pane element 562 includes a pair of horizontally adjacent and aligned top pane regions 564 and 566 and a bottom pane region 568 disposed below the top pane regions. The navigation pane element 204, the top pane regions 564 and 566, and the bottom pane region 568 are displayed simultaneously on the user interface 560. The top pane region 564 can include a vertically stacked set of drop down menu elements 570A-570D that allow the user to select certain types of data to be processed as well as to select one or more statistical forecasting models and trend and autoregression information to apply to the input data. For example, the Target drop down menu element 570A allows the user to select via a drop down menu selection caret a preselected data type as the input data. In the current illustrative example, the selected data type is commercial related data. The Model drop down menu element 570B allows the user to select via a drop down menu selection caret one or more statistical forecasting models from a set of preselected forecasting models to apply to the input data, such as the selected commercial data. In the current example, the user has selected a Bayesian structural time series (BSTS) model to be applied to the input data. The set of drop down menu elements also includes a Trend drop down menu element 570C that allows the user to select a type of trend to apply to the input data, where the trend is an additional model parameter for the selected BSTS model. In the illustrative example, the user can select to have the trend automatically (Auto) applied to the input data. Similarly, the Autoregression drop down menu element 570D allows the user to determine whether an autoregression technique is applied to the data. As shown, the user can select from the menu of options an Auto selection such that the autoregression technique is automatically applied to the data.

The top pane region 564 also includes a forecast period field box 572 that allows the user to enter a selected time period for analysis. In connection with this time period selection, the top pane region 564 also includes a series of selectable radio buttons 574 that are indicative of selected time period information. Specifically, the selectable radio buttons 574 can be associated with a series of time frames that define the time period over which the selected data can be analyzed by employing the selections in the drop down menu elements 570A-570D. In the current example, the radio buttons 574 can correspond to daily, weekly, monthly or quarterly time frames. The top pane region 564 can further include a set of actuatable soft buttons 576 that allows the user to select one or more predetermined functions to be performed on the data. In the current example, the soft buttons 576 include a Run soft button for running the selected statistical model or technique on the Commercial data that is selected by the drop down menu element 570A, a Review soft button that allows the user to review, when actuated, the features selected in the drop down menu elements, and an Update soft button that allows the user to update the displayed information and the techniques to be applied to the data by changing the selections in the drop down menu elements, field boxes, and radio buttons.

The adjacent top pane region 566 can display in any selected data format, such as in a tabular format, the data associated with the selected techniques and the selected commercial data. For example, the illustrated table 580 can include a series of columns and tables related to selected metrics, such as the results of the operations and models applied to the input data as selected by the user via the drop down menu element 570A-570D. The table 580 can show the model prediction result and can specifically include a date column that sets forth the date associated with the various datasets, an actual data column that sets forth the target data associated with the indicated dates, a fitted data column that sets forth model fitted data values associated with each date, and a prediction column that sets forth model prediction results associated with each date and associated actual and fitted data.

The illustrated bottom pane region 568 can display any selected types of information, and preferably displays a Model Prediction graph or plot 584 graphically illustrating model prediction data over a selected period of time. The bottom pane region also includes a series of selectable or actuatable soft buttons 586 that are directed to the time frame that is associated with the displayed plot 584. The time frame can be any selected time frame. According to one practice, the soft buttons 586 are associated with time frames of one month, six months, one year, five years, year to date (YTD), and an All button for selecting all of the time frames. The plot 584 shows the prediction result, the actual data, and the prediction output values.

Figure 21:
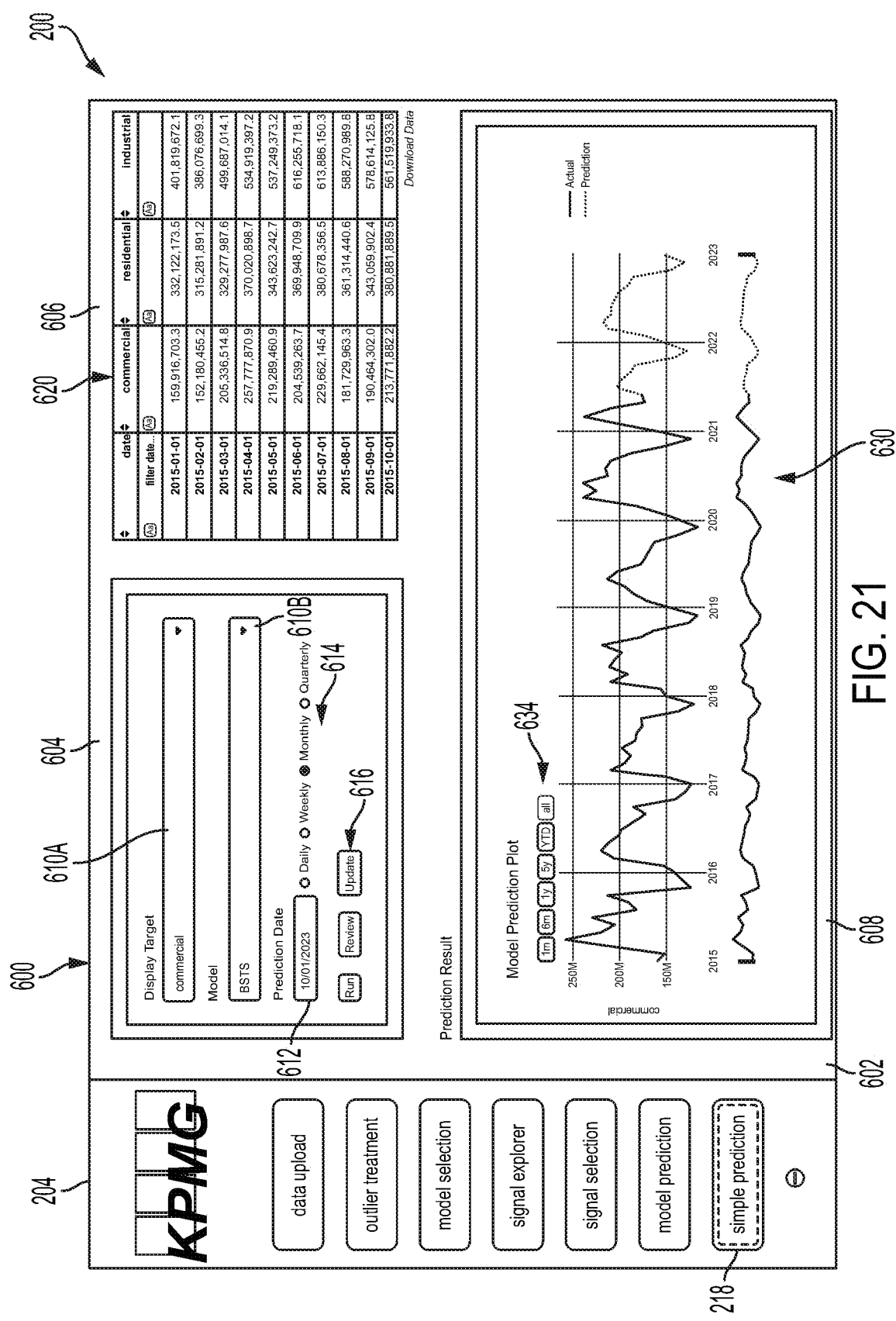
FIG. 21 is a user interface generated by the system of the present invention for display on a display device showing the window and associated pane regions when the Simple Prediction soft button in the navigation pane is actuated by the user.

As shown in FIG. 21, when the user actuates the Simple Prediction soft button 218 of the navigation pane element 204, the user interface generator 54 generates the user interface 600 of the window element 200. The illustrated user interface 600 can include and simultaneously display the navigation pane 204 that is formed along a left hand side of the interface 600, as well as a pane element 602, which covers the remaining area of the interface. The Simple Prediction soft button 218 instructs the application, based on user selections, to automatically create a set of simple forecasts for all target variables in a selected dataset by applying to the datasets one or more statistical forecasting models. The statistical forecasting models help collect, organize, analyze, interpret, and present data and uncover patterns and trends within the data. The statistical forecasting models can include, for example, data sampling, central tendency (e.g., mean, median, and mode), random variables (e.g., discrete, continuous, skewness, variance, and the like), probability distributions, statistical inference, confidence interval, hypothesis testing, quartile analysis, Bayesian structural time series (BSTS), TBATS forecasting method for modelling time series data, ETS, Facebook Prophet, and autoregressive integrated moving average (ARIMA) techniques.

The illustrated top pane element 602 includes a pair of horizontally adjacent and aligned top pane regions 604 and 606 and a bottom pane region 608 disposed below the top pane regions. The navigation pane element 204, the top panes regions 604 and 606, and the bottom pane region 608 are displayed simultaneously on the user interface 600. The top pane region 604 can include a vertically stacked set of drop down menu elements 610A and 610B that allow the user to select certain types of data to be processed as well as to select one or more statistical models to apply to the data. For example, the drop down men element 610A is a Display Target drop down menu that allows the user to select via a drop down menu selection caret a preselected data type to form the input data. In the current illustrative example, the selected data type is commercial related data. The Model drop down menu element 610B allows the user to select via a drop down menu selection caret one or more statistical forecasting models from a set of preselected forecasting models to apply to the input data, such as the selected commercial data. In the current example, the user has selected a Bayesian structural time series (BSTS) model to be applied to the data.

The top pane region 604 also includes a Prediction Date field box 612 that allows the user to enter a selected prediction date or time period for analysis. In connection with this date selection, the top pane region also includes a series of selectable radio buttons 614 that are indicative of selected time frames or periods. Specifically, the selectable radio buttons 614 can be associated with a series of time frames or periods that define the time period over which the selected data can be analyzed by employing the selections in the drop down menu elements 610A, 610B. In the current example, the radio buttons 614 can correspond to daily, weekly, monthly or quarterly time frames. The top pane region 604 can further include a set of actuatable soft buttons 616 that allows the user to select one or more predetermined functions to be performed on the data. In the current example, the soft buttons 616 include a Run soft button for running the selected statistical model or technique on the Commercial data that is selected by the drop down menu element 610A, a Review soft button that allows the user to review, when actuated, the features selected in the drop down menu elements, and an Update soft button that allows the user to update the displayed information and the techniques to be applied to the data by changing the selections in the drop down menu elements, field boxes, and radio buttons.

The adjacent top pane region 606 can display in any selected data format, such as in a tabular format, the data associated with the selected techniques and data types. For example, the illustrated table 620 can include a series of rows and columns related to selected metrics, such as the results of the operations and techniques applied to the input data as selected by the user via the drop down menu elements. The table 620 can specifically include a date column that sets forth the dates associated with the various datasets, and one or more columns setting forth different types of datasets and prediction values associated with the displayed datasets. The table thus shows the prediction result for all targets. For example, the example input file has three targets, so there are three columns in the table. The table shows both history and prediction for each target.

The illustrated bottom pane region 608 can display any selected type of information, and preferably displays a Model Prediction graph or plot 630 graphically illustrating model prediction data for selected data types over a selected period of time. The bottom pane region 608 also includes a series of selectable or actuatable soft buttons 634 that are directed to the time frame that is associated with the displayed plot 630. The time frame can be any selected time frame. According to one practice, the soft buttons 634 are associated with time frames of one month, six months, one year, five years, year to date (YTD), and an All button for selecting all of the time frames. The plot 630 shows the prediction result, the actual data, and the prediction output results.

It is to be understood that although the invention has been described above in terms of particular embodiments, the foregoing embodiments are provided as being illustrative only, and are not intended to limit or define the scope of the invention. Various other embodiments, including but not limited to those described herein are also within the scope of the claims and current invention. For example, the foregoing elements, units, modules, tools and components described herein may be further divided into additional components or sub-components or joined together to form fewer components for performing the same functions.

Any of the functions disclosed herein may be implemented using means for performing those functions. Such means include, but are not limited to, any of the components or units disclosed herein, as well as known electronic and computing devices and associated components.

The techniques described herein may be implemented, for example, in hardware, one or more computer programs tangibly stored on one or more computer-readable media, firmware, hardware or any combination thereof. The techniques described herein may be implemented in one or more computer programs executing on (or executable by) a programmable computer or electronic device having any combination of any number of the following: a processor, a storage medium readable and/or writable by the processor (including, for example, volatile and non-volatile memory and/or storage elements), an input device, an output device, and a display. Program code may be applied to input entered using the input device to perform the functions described and to generate output using the output device.

The term computing device or electronic device as used herein can refer to any device, such as a computer, smart phone, server and the like, that includes a processor and a computer-readable memory capable of storing computer-readable instructions, and in which the processor is capable of executing the computer-readable instructions in the memory. The terms electronic device, computer system and computing system refer herein to a system containing one or more computing devices that are configured to implement one of more units, modules, or components of the data aggregation and normalization system 10 of the present invention.

Embodiments of the present invention include features which are only possible and/or feasible to implement with the use of one or more computers or servers, processors, and/or other elements of a computer or server system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which cannot be solved manually or mentally by humans.

Any claims herein which by implication or affirmatively require an electronic device such as a computer or server, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited electronic device or computer-related element(s). Such a method claim should not be interpreted, for example, to encompass a method that is performed mentally or by hand (e.g., using pencil and paper). Similarly, any product or computer readable medium claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to determine the lineage of business terms and application interfaces between multiple software applications. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed herein are primarily for illustrative purposes and for providing or describing the operating environment of the system of the present invention. The data aggregation and normalization system 10 and/or elements or units thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like. The system 10 or any associated units or components of the system can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device. In one embodiment, the server may be referred to as a remote machine or a node. In another embodiment, a plurality of nodes may be in the path between any two communicating servers or clients.

We claim:

1. An intelligent forecasting system, comprising
one or more sources of financial and non-financial data,
an electronic device having
 a processor for processing one or more of the financial and non-financial data to form input data,
 a storage element for storing the input data, and
 a user interface generator for generating a plurality of user interfaces having one or more window elements that display selected portions of the processed input data, wherein the window element of one or more of the plurality of user interfaces includes:
 a persistent navigation pane element formed along a left side of the window element having a plurality of vertically stacked actuatable navigation soft buttons for accessing one or more portions of an intelligent forecasting sequence having a plurality of forecasting steps, wherein the plurality of navigation soft buttons includes two or more of:
 a Data Upload soft button for allowing a user, when actuated, to upload one or more files having at least a portion of the input data,
 an Outlier Treatment soft button for allowing the user, when actuated, to process at least a portion of the input data by applying thereto one or more statistical processing models to detect one or more outliers in the input data having an outlier value associated therewith and to replace one or more of the outlier values with a replacement value,
 a Model Selection soft button for allowing the user, when actuated, to select one or more statistical forecasting models to apply to the input data,
 a Signal Explorer soft button for allowing the user, when actuated, to select one or more signal transformation methods for processing and transforming the input data,
 a Signal Selection soft button for allowing the user, when actuated, to select one or more signals to incorporate into the input data,
 a Model Prediction soft button for allowing the user, when selected, to select one or more of the statistical forecasting models to apply to the input data,
 a Simple Prediction soft button for allowing the user to automatically generate a plurality of forecasts by processing the data using one or more of the statistical forecasting models, and
 a pane element for simultaneously displaying along with the navigation pane element and the plurality of navigation soft buttons information associated with one or more of the navigation soft buttons and one or more of the plurality of forecasting steps,
 wherein when the Outlier Treatment (OT) soft button is actuated by the user, then the user interface generator generates a first user interface having first and second horizontally aligned OT top pane regions and an OT bottom pane region disposed below the first and second OT top pane regions, wherein the first OT top pane region includes for display on the first user interface a plurality of drop down menu elements including a Treatment Model drop down menu element for allowing a user to select from a drop down menu one or more statistical treatment models to apply to the one or more outlier data points to treat the outlier data points by replacing the outlier data point value with a replacement data point value.

2. The system of claim 1, wherein the plurality of drop down menu elements further includes:
 a first Target drop down menu element for allowing a user to select from a drop down menu a type of input data to be processed to form an input data type, and
 a Detection Model drop down menu element for allowing a user to select from a drop down menu one or more statistical processing models to apply to the input data type that is selected in the first Target drop down menu element so as to detect and identify one or more outlier data points in the input data type, wherein each of the outlier data points has an associated data point value.

3. The system of claim 2, wherein the statistical processing model selectable in the Detection Model drop down menu element comprises one or more of a Bayesian structural time series (BSTS) model, a Quartile Analysis model, a TBATS model, an ETS model, a Facebook (FB) Prophet model, and an auto regressive integrated moving average (ARIMA) model.

4. The system of claim 2, wherein the first OT top pane region further comprises an indicating element for visually indicating the status of one or more selected features of the top pane region, wherein the indicating element includes a horizontally extending scale element having a plurality of predetermined increments or units formed thereon.

5. The system of claim 4, wherein the first OT top pane region further comprises a first plurality of selectable radio buttons disposed below the indicating element, wherein each of the first plurality of selectable radio buttons is indicative of a selected data time period, and wherein the data time periods associated with the first plurality of selectable radio buttons includes daily, weekly, monthly and quarterly data time periods.

6. The system of claim 5, wherein the second OT top pane region is disposed horizontally adjacent to and aligned with the first OT top pane region and is configured for displaying a table element having tabulated therein selected time data related to the first plurality of selectable radio buttons and one or more of the input data types selected by the user via the first Target drop down menu element, and
 wherein the OT bottom pane region is disposed below the first and second OT top pane regions and is configured to display a plot graphically illustrating the input data type selected by the first Target drop down menu element over a selected period of time, and wherein the OT bottom pane region includes a second plurality of actuatable soft buttons that are directed to the selected period of time that is associated with the plot.

7. The system of claim 2, wherein when the Model Selection (MS) soft button of the navigation pane element is actuated by the user, the user interface generator generates a second user interface having first and second horizontally aligned MS top pane regions and an MS bottom pane region disposed vertically below the first and second MS top pane regions, wherein the first MS top pane region includes for display on the second user interface a plurality of drop down menu elements including
- a second Target drop down menu element for allowing a user to select the input data to be processed,
- a Model drop down menu element for allowing a user to select one or more statistical forecasting models to apply to the input data selected in the second Target drop down menu element so as to generate predictions based on the input data, a Display Model drop down menu element for allowing a user to select a type of statistical forecasting model to apply to the input data and to display in the bottom pane region,
- a Rolling Window Schema soft button horizontally aligned with the Display Model drop down menu element that allows the user, when actuated, to display a first action box for allowing the user to enter one or more selections, and
- a Forecast Period field box disposed vertically below the plurality of drop down menu elements, wherein the field box allows the user to enter a selected number of time periods within the field box.

8. The system of claim 7, wherein the first MS top pane region further comprises
- a plurality of selectable radio buttons disposed horizontally adjacent to the Forecast Period field box for allowing the user to enter a selected data time period, wherein the data time periods associated with the plurality of selectable radio buttons includes daily, weekly, monthly and quarterly data time periods, and
- a selectable sliding soft button for allowing the user to apply, when actuated, one or more tuning parameters to the target data.

9. The system of claim 8, wherein the second MS top pane region is configured to display a table configured to tabulated selected information associated with the input data, and wherein the MS bottom pane region is configured to include a plot of an output of the statistical forecasting model selected in the Display Model drop down menu element when applied to the input data selected by the second Target drop down menu element over a selected period of time.

10. The system of claim 7, wherein when the Rolling Window Schema soft button is actuated by the user, the user interface generator generates a third user interface that includes for display on the third user interface the first action box that is simultaneously displayed with the navigation pane element, wherein the first action box comprises
- a Test Range field box for allowing the user to enter a selected date period to define a date test range of a rolling window,
- a Window field box disposed vertically below the Test Range field box for allowing the user to define or select one or more parameters associated with the rolling window,
- a Skip field box disposed horizontally adjacent to the Window field box for allowing the user to designate a portion of the rolling window to skip,
- a Tuning Measure drop down menu element disposed vertically below the Window field box for allowing the user to select a tuning model to apply to the input data for determining a prediction accuracy of the selected statistical forecasting model selected by the user from the Model drop down menu element, and
- a Report Type drop down menu element disposed horizontally adjacent to the Tuning Measure drop down menu element and vertically below the Skip field box for allowing the user to select a report type for reporting the input data.

11. The system of claim 10, wherein the user interface generator generates a fourth user interface when the user enters the selections in the second Target drop down menu element and in the Model and Display Model drop down menu elements, wherein the fourth user interface includes first and second horizontally aligned and adjacent top pane regions and a bottom pane region disposed vertically below the first and second top pane regions,
- wherein the first top pane region includes for display on the fourth user interface a graphical element that graphs a comparison of an accuracy of a plurality of statistical forecasting models relative to each other,
- wherein the second pane region is horizontally adjacent to and aligned with the first pane region and is configured to display a first table that tabulates information associated with the graph in the first top pane region and a second table that tabulates information associated with one or more of the selected forecasting accuracy models, and
- wherein the bottom pane region is configured to display a plot that graphically represents information associated with the input data types selected by the user via the second Target drop down menu element and one or more of the statistical forecasting models selected by the user via the Model drop down menu element.

12. The system of claim 10, wherein when the Signal Explorer (SE) soft button of the navigation pane element is actuated by the user, the user interface generator generates a fourth user interface that includes first and second horizontally adjacent and aligned SE top pane regions and an SE bottom pane region disposed vertically below the first and second SE top pane regions, wherein the first SE top pane region includes for display on the fourth user interface a plurality of drop down menu elements including
- a third Target drop down menu element for allowing the user to select the input data to be processed, wherein the input data also includes a plurality of signals,
- a Method drop down menu element for allowing the user to select one or more correlation methods to apply to the input data selected in the third Target drop down menu element to determine a value indicative of a strength of the correlation between the plurality of signals in the input data,
- a Signal Transformation soft button disposed vertically below the Method drop down menu element for allowing the user, when actuated, to generate a second action box that allows the user to enter one or more parameters associated with a signal transformation of the plurality of signals, and
- a Returned Signal field box disposed vertically below the Signal Transformation soft button for allowing the user to enter a number of signals for processing by the one or more correlation methods selected via the Method drop down menu element.

13. The system of claim 12, wherein the first SE top pane region further comprises a plurality of selectable radio buttons disposed horizontally adjacent to the returned signal field box for allowing the user to enter a selected data time period for analysis, wherein the data time periods associated with the second plurality of selectable radio buttons includes daily, weekly, monthly and quarterly data time periods, and
  wherein the second SE top pane region includes a table having a first column listing one or more of the plurality of signals selected by the user via the Returned Signal field box, and a second column listing one or more correlation values generated by the correlation method selected by the user via the Method dop down menu element, and
  wherein the SE bottom pane element includes a plot of one or more of the plurality of signals selected by the user via the Returned Signal field box and one or more correlation values generated by the correlation method selected by the user via the Method dop down menu element.

14. The system of claim 12, wherein when the Signal Explorer soft button of the navigation pane element is actuated by the user, the user interface generator generates a fifth user interface having the second action box simultaneously displayed with the navigation pane element, wherein the second action box includes
  a Transformation Type drop down menu element for allowing the user to select one or more transformation methods to apply to the data,
  a first horizontal plurality of field boxes disposed below the Transformation Type drop down menu element for allowing the user to enter selected metrics associated with the transformation method selected by the user via the transformation type drop down menu element,
  a second horizontal plurality of field boxes disposed vertically below the first horizontal plurality of field boxes for allowing the user to enter selected metrics associated with the transformation method selected by the user via the transformation type drop down menu element,
  a Difference Type drop down menu element disposed vertically below the second horizontal plurality of field boxes for allowing the user to select a difference type to be applied to the input data, and
  a Difference Prior field box disposed horizontally adjacent to the Difference Type drop down menu element for allowing the user to enter a prior difference value therein to be applied to the input data.

15. The system of claim 14, wherein when the Signal Selection (SS) soft button in the navigation pane element is actuated by the user, the user interface generator generates a sixth user interface having first and second horizontally aligned SS top pane regions and an SS bottom pane region disposed vertically below the first and second SS top pane regions, wherein the first SS top pane region includes for display on the sixth user interface a plurality of drop down menu elements including
  a second Model drop down menu element for allowing the user to select one or more statistical forecasting models to apply to the input data,
  a Trend drop down menu element disposed vertically below the second Model drop down menu element for allowing the user to select a type of trend to apply to the input data,
  an Autoregression drop down menu element disposed horizontally adjacent to the Trend drop down menu element for allowing the user to determine whether an autoregression technique is applied to the input data,
  a second Rolling Window Schema soft button disposed vertically below the Trend drop down menu element and the Autoregression drop down menu element for allowing the user, when actuated, to display a third action box for entering information associated with the statistical forecasting model, and
  a second Forecast Period field box disposed vertically below the Rolling Window Schema soft button for allowing the user to enter a selected number of time periods within the field box for the rolling window.

16. The system of claim 15, wherein the first SS top pane element further comprises
  a plurality of selectable radio buttons disposed horizontally adjacent to the forecast period field box for allowing the user to enter a selected data time period, wherein the data time periods associated with the third plurality of selectable radio buttons includes daily, weekly, monthly and quarterly data time periods, and
  a second selectable sliding soft button for allowing the user to apply, when actuated, a parallel process to the data.

17. The system of claim 15, wherein when the second Rolling Window Schema soft button is actuated by the user, the user interface generator generates a seventh user interface for displaying a third action box for allowing the user to select one or more parameters associated with the rolling window, wherein the third action box includes
  a second Test Range soft button for allowing the user to input date ranges that define the temporal extents of the rolling window,
  a plurality of horizontally aligned field boxes disposed vertically below the second Test Range soft button, wherein the plurality of aligned field boxes includes a second Window field box disposed vertically below the Test Range field box for allowing the user to define or select one or more parameters associated with the rolling window, a second Skip field box disposed horizontally adjacent to the Window field box for allowing the user to designate a portion of the rolling window to skip, and a Threshold field box for setting a threshold value associated with the rolling window,
  a first plurality of horizontally arranged and aligned drop down menu elements disposed below the plurality of field boxes, wherein the first plurality of drop down menu elements includes a Selection Measure drop down menu element for allowing the user to select one or more forecasting accuracy models, and a second Report Type drop down menu element for allowing the user to select a type of report, and
  a second plurality of horizontally arranged and aligned drop down menu elements disposed below the first plurality of drop down menu elements, wherein the second plurality of drop down menu elements includes a Selection Set drop down menu element for allowing the user to select a set type, and a Signal Forecast drop down menu element for allowing the user to select a signal forecast condition.

18. The system of claim 17, wherein when the Model Prediction (MP) soft button is actuated, the user interface generator generates an eighth user interface that includes first and second horizontally aligned MP top pane regions and an MP bottom pane region disposed below the first and second MP top pane regions, wherein the first MP top pane region includes for display on the eighth user interface a plurality of drop down menu elements including
  a fourth Target drop down menu element for allowing the user to select the type of data to be processed as the input data,
  a third Model drop down menu element disposed below the fourth Target drop down menu element for allowing the user to select one or more statistical forecasting models to apply to the input data, a second Trend drop down menu element disposed vertically below the third Model drop down menu element for allowing the user to select a type of trend to apply to the input data, and a second Autoregression drop down menu element disposed horizontally adjacent to and aligned with the second Trend drop down menu element for allowing the user to determine whether an autoregression technique is to be applied to the input data, wherein the first MP top pane region further includes a third Forecast Period field box disposed vertically below the second Trend drop down menu element for allowing the user to enter a selected number of time periods within the field box for the rolling window.

19. The system of claim 18, wherein the first MP top pane region further comprises a plurality of selectable radio buttons disposed horizontally adjacent to and aligned with the third Forecast Period field box for allowing the user to select a data time period for processing the input data, wherein the data time periods associated with the fourth plurality of selectable radio buttons includes daily, weekly, monthly and quarterly data time periods, wherein the second MP top pane region is configured for displaying a table element having tabulated therein time data related to the forecast periods selected by the user in the third Forecast Period field box and the fourth plurality of selectable radio buttons and prediction information related to the input data selected by the fourth Target drop down menu element and generated by the statistical forecasting model selected by the user by the third Model drop down menu element, and wherein the MP bottom pane region is configured to display a plot graphically illustrating model prediction data over a selected period of time, and wherein the MP bottom pane region includes a plurality of actuatable soft buttons that are directed to a time frame that is associated with the plot.

20. The system of claim 17, wherein when the Simple Prediction (SP) soft button is actuated, the user interface generator generates a ninth user interface that includes first and second horizontally aligned SP top pane regions and an SP bottom pane region disposed below the first and second SP top pane regions, wherein the first SP top pane region includes for display on the ninth user interface:

a fifth Target drop down menu element for allowing the user to select the type of data to be processed as the input data, a fourth Model drop down menu element disposed below the fifth Target drop down menu element for allowing the user to select one or more statistical forecasting models to apply to the input data, and a Prediction Date field box for allowing the user to enter a date for which a prediction is requested.

21. The system of claim 20, wherein the second SP top pane region is configured for displaying a table element having tabulated therein time data related to the time data entered by the user in the Prediction Date field box, and a plurality of different data types selected by the user via the fifth Target drop down menu element, and wherein the SP bottom pane region is configured to display a plot graphically illustrating the data type over a selected period of time, and wherein the SP bottom pane region includes a plurality of actuatable soft buttons that are directed to the period of time that is associated with the plot.

22. A computer implemented method, comprising receiving one or more sources of financial and non-financial data to form input data, processing and storing the input data, generating a plurality of user interfaces having one or more window elements that display selected portions of the input data, wherein the window element of one or more of the plurality of user interfaces includes:

a persistent navigation pane element formed along a left side of the window element having a plurality of vertically stacked actuatable navigation soft buttons for accessing one or more portions of an intelligent forecasting sequence having a plurality of forecasting steps, wherein the plurality of navigation soft buttons includes two or more of:

a Data Upload soft button for allowing a user, when actuated, to upload one or more files having at least a portion of the input data, an Outlier Treatment soft button for allowing the user, when actuated, to process at least a portion of the input data by applying thereto one or more statistical processing models to detect one or more outliers in the input data having an outlier value associated therewith and to replace one or more of the outlier values with a replacement value, a Model Selection soft button for allowing the user, when actuated, to select one or more statistical forecasting models to apply to the input data, a Signal Explorer soft button for allowing the user, when actuated, to select one or more signal transformation methods for processing and transforming the input data, a Signal Selection soft button for allowing the user, when actuated, to select one or more signals to incorporate into the input data, a Model Prediction soft button for allowing the user, when selected, to select one or more of the statistical forecasting models to apply to the input data, a Simple Prediction soft button for allowing the user to automatically generate a plurality of forecasts by processing the data using one or more of the statistical forecasting models, simultaneously displaying a pane element along with the navigation pane element and the plurality of navigation soft buttons information associated with one or more of the navigation soft buttons and one or more of the plurality of forecasting steps, and generating a first user interface when the Outlier Treatment (OT) soft button is actuated by the user, wherein the first user interface includes first and second horizontally aligned OT top pane regions and an OT bottom pane region disposed below the first and second OT top pane regions, wherein the first OT top pane region includes for display on the first user interface a plurality of drop down menu elements including a Treatment Model drop down menu element for allowing a user to select from a drop down menu one or more statistical treatment models to apply to the one or more outlier data points to treat the outlier data points by replacing the outlier data point value with a replacement data point value.

23. The computer implemented method of claim 22, wherein the plurality of drop down menu elements further includes a first Target drop down menu element for allowing a user to select from a drop down menu a type of input data to be processed to form an input data type, and a Detection Model drop down menu element for allowing a user to select from a drop down menu one or more statistical processing models to apply to the input data type that is selected in the first Target drop down menu element so as to detect and identify one or more outlier data points in the input data type, wherein each of the outlier data points has an associated data point value.

24. The computer implemented method of claim 23, further comprising generating a second user interface when the Model Selection (MS) soft button of the navigation pane element is actuated by the user, wherein the second user interface includes first and second horizontally aligned MS top pane regions and an MS bottom pane region disposed vertically below the first and second MS top pane regions, wherein the first MS top pane region includes for display on the second user interface a plurality of drop down menu elements including a second Target drop down menu element for allowing a user to select the input data to be processed, a Model drop down menu element for allowing a user to select one or more statistical forecasting models to apply to the input data selected in the second Target drop down menu element so as to generate predictions based on the input data, a Display Model drop down menu element for allowing a user to select a type of statistical forecasting model to apply to the input data and to display in the bottom pane region, a Rolling Window Schema soft button horizontally aligned with the Display Model drop down menu element that allows the user, when actuated, to display a first action box for allowing the user to enter one or more selections, and a Forecast Period field box disposed vertically below the plurality of drop down menu elements, wherein the field box allows the user to enter a selected number of time periods within the field box.

25. The computer implemented method of claim 24, further comprising generating a third user interface when the Rolling Window Schema soft button is actuated by the user, wherein the third user interface includes for display thereon the first action box that is simultaneously displayed with the navigation pane element, wherein the first action box comprises a Test Range field box for allowing the user to enter a selected date period to define a date test range of a rolling window, a Window field box disposed vertically below the Test Range field box for allowing the user to define or select one or more parameters associated with the rolling window, a Skip field box disposed horizontally adjacent to the Window field box for allowing the user to designate a portion of the rolling window to skip, a Tuning Measure drop down menu element disposed vertically below the Window field box for allowing the user to select a tuning model to apply to the input data for determining a prediction accuracy of the selected statistical forecasting model selected by the user from the Model drop down menu element, and a Report Type drop down menu element disposed horizontally adjacent to the Tuning Measure drop down menu element and vertically below the Skip field box for allowing the user to select a report type for reporting the input data.

26. The computer implemented method of claim 25, further comprising generating a fourth user interface when the user enters the selections in the second Target drop down menu element and in the Model and Display Model drop down menu elements, wherein the fourth user interface includes first and second horizontally aligned and adjacent top pane regions and a bottom pane region disposed vertically below the first and second top pane regions, wherein the first top pane region includes for display on the fourth user interface a graphical element that graphs a comparison of an accuracy of a plurality of statistical forecasting models relative to each other, wherein the second pane region is horizontally adjacent to and aligned with the first pane region and is configured to display a first table that tabulates information associated with the graph in the first top pane region and a second table that tabulates information associated with one or more of the selected forecasting accuracy models, and wherein the bottom pane region is configured to display a plot that graphically represents information associated with the input data types selected by the user via the second Target drop down menu element and one or more of the statistical forecasting models selected by the user via the Model drop down menu element.

27. The computer implemented method of claim 26, further comprising generating a fourth user interface when the Signal Explorer (SE) soft button of the navigation pane element is actuated by the user, wherein the fourth user interface includes first and second horizontally adjacent and aligned SE top pane regions and an SE bottom pane region disposed vertically below the first and second SE top pane regions, wherein the first SE top pane region includes for display on the fourth user interface a plurality of drop down menu elements including a third Target drop down menu element for allowing the user to select the input data to be processed, wherein the input data also includes a plurality of signals, a Method drop down menu element for allowing the user to select one or more correlation methods to apply to the input data selected in the third Target drop down menu element to determine a value indicative of a strength of the correlation between the plurality of signals in the input data, a Signal Transformation soft button disposed vertically below the Method drop down menu element for allowing the user, when actuated, to generate a second action box that allows the user to enter one or more parameters associated with a signal transformation of the plurality of signals, and a Returned Signal field box disposed vertically below the Signal Transformation soft button for allowing the user to enter a number of signals for processing by the one or more correlation methods selected via the Method drop down menu element.

28. The computer implemented method of claim 27, further comprising generating a fifth user interface when the Signal Explorer soft button of the navigation pane element is actuated by the user, wherein the fifth user interface has the second action box simultaneously displayed with the navigation pane element, wherein the second action box includes a Transformation Type drop down menu element for allowing the user to select one or more transformation methods to apply to the data, a first horizontal plurality of field boxes disposed below the Transformation Type drop down menu element for allowing the user to enter selected metrics associated with the transformation method selected by the user via the transformation type drop down menu element, a second horizontal plurality of field boxes disposed vertically below the first horizontal plurality of field boxes for allowing the user to enter selected metrics associated with the transformation method selected by the user via the transformation type drop down menu element, a Difference Type drop down menu element disposed vertically below the second horizontal plurality of field boxes for allowing the user to select a difference type to be applied to the input data, and a Difference Prior field box disposed horizontally adjacent to the Difference Type drop down menu element for allowing the user to enter a prior difference value therein to be applied to the input data.

29. The computer implemented method of claim 28, further comprising generating a sixth user interface when the Signal Selection (SS) soft button in the navigation pane element is actuated by the user, wherein the sixth user interface includes first and second horizontally aligned SS top pane regions and an SS bottom pane region disposed vertically below the first and second SS top pane regions, wherein the first SS top pane region includes for display on the sixth user interface a plurality of drop down menu elements including a second Model drop down menu element for allowing the user to select one or more statistical forecasting models to apply to the input data, a Trend drop down menu element disposed vertically below the second Model drop down menu element for allowing the user to select a type of trend to apply to the input data, an Autoregression drop down menu element disposed horizontally adjacent to the Trend drop down menu element for allowing the user to determine whether an autoregression technique is applied to the input data, a second Rolling Window Schema soft button disposed vertically below the Trend drop down menu element and the Autoregression drop down menu element for allowing the user, when actuated, to display a third action box for entering information associated with the statistical forecasting model, and a second Forecast Period field box disposed vertically below the Rolling Window Schema soft button for allowing the user to enter a selected number of time periods within the field box for the rolling window.

30. The computer implemented method of claim 29, further comprising generating a seventh user interface when the second Rolling Window Schema soft button is actuated by the user, wherein the seventh user interface displays a third action box for allowing the user to select one or more parameters associated with the rolling window, wherein the third action box includes a second Test Range soft button for allowing the user to input date ranges that define the temporal extents of the rolling window, a plurality of horizontally aligned field boxes disposed vertically below the second Test Range soft button, wherein the plurality of aligned field boxes includes a second Window field box disposed vertically below the Test Range field box for allowing the user to define or select one or more parameters associated with the rolling window, a second Skip field box disposed horizontally adjacent to the Window field box for allowing the user to designate a portion of the rolling window to skip, and a Threshold field box for setting a threshold value associated with the rolling window, a first plurality of horizontally arranged and aligned drop down menu elements disposed below the plurality of field boxes, wherein the first plurality of drop down menu elements includes a Selection Measure drop down menu element for allowing the user to select one or more forecasting accuracy models, and a second Report Type drop down menu element for allowing the user to select a type of report, and a second plurality of horizontally arranged and aligned drop down menu elements disposed below the first plurality of drop down menu elements, wherein the second plurality of drop down menu elements includes a Selection Set drop down menu element for allowing the user to select a set type, and a Signal Forecast drop down menu element for allowing the user to select a signal forecast condition.

31. An intelligent forecasting system, comprising
one or more sources of financial and non-financial data,
an electronic device having
  a processor for processing one or more of the financial and non-financial data to form input data,
  a storage element for storing the input data, and
  a user interface generator for generating a plurality of user interfaces having one or more window elements that display selected portions of the processed input data, wherein the window element of one or more of the plurality of user interfaces includes:
  a persistent navigation pane element formed along a left side of the window element having a plurality of vertically stacked actuatable navigation soft buttons for accessing one or more portions of an intelligent forecasting sequence having a plurality of forecasting steps, wherein the plurality of navigation soft buttons includes two or more of:
  a Data Upload soft button for allowing a user, when actuated, to upload one or more files having at least a portion of the input data,
  an Outlier Treatment soft button for allowing the user, when actuated, to process at least a portion of the input data by applying thereto one or more statistical processing models to detect one or more outliers in the input data having an outlier value associated therewith and to replace one or more of the outlier values with a replacement value,
  a Model Selection soft button for allowing the user, when actuated, to select one or more statistical forecasting models to apply to the input data,
  a Signal Explorer soft button for allowing the user, when actuated, to select one or more signal transformation methods for processing and transforming the input data,
  a Signal Selection soft button for allowing the user, when actuated, to select one or more signals to incorporate into the input data,
  a Model Prediction soft button for allowing the user, when selected, to select one or more of the statistical forecasting models to apply to the input data,
  a Simple Prediction soft button for allowing the user to automatically generate a plurality of forecasts by processing the data using one or more of the statistical forecasting models, and
a pane element for simultaneously displaying along with the navigation pane element and the plurality of navigation soft buttons information associated with one or more of the navigation soft buttons and one or more of the plurality of forecasting steps, wherein when the Model Selection (MS) soft button of the navigation pane element is actuated by the user, the user interface generator generates a first user interface having first and second horizontally aligned MS top pane regions and an MS bottom pane region disposed vertically below the first and second MS top pane regions, wherein the first MS top pane region includes for display on the first user interface a plurality of drop down menu elements including a second Target drop down menu element for allowing a user to select the input data to be processed, a Model drop down menu element for allowing a user to select one or more statistical forecasting models to apply to the input data selected in the second Target drop down menu element so as to generate predictions based on the input data, a Display Model drop down menu element for allowing a user to select a type of statistical forecasting model to apply to the input data and to display in the bottom pane region, a Rolling Window Schema soft button horizontally aligned with the Display Model drop down menu element that allows the user, when actuated, to display a first action box for allowing the user to enter one or more selections, and a Forecast Period field box disposed vertically below the plurality of drop down menu elements, wherein the field box allows the user to enter a selected number of time periods within the field box.

32. A computer implemented method, comprising
receiving one or more sources of financial and non-financial data to form input data,
processing and storing the input data,
generating a plurality of user interfaces having one or more window elements that display selected portions of the input data, wherein the window element of one or more of the plurality of user interfaces includes:
   a persistent navigation pane element formed along a left side of the window element having a plurality of vertically stacked actuatable navigation soft buttons for accessing one or more portions of an intelligent forecasting sequence having a plurality of forecasting steps, wherein the plurality of navigation soft buttons includes two or more of:
   a Data Upload soft button for allowing a user, when actuated, to upload one or more files having at least a portion of the input data,
   an Outlier Treatment soft button for allowing the user, when actuated, to process at least a portion of the input data by applying thereto one or more statistical processing models to detect one or more outliers in the input data having an outlier value associated therewith and to replace one or more of the outlier values with a replacement value,
   a Model Selection soft button for allowing the user, when actuated, to select one or more statistical forecasting models to apply to the input data,
   a Signal Explorer soft button for allowing the user, when actuated, to select one or more signal transformation methods for processing and transforming the input data,
   a Signal Selection soft button for allowing the user, when actuated, to select one or more signals to incorporate into the input data,
   a Model Prediction soft button for allowing the user, when selected, to select one or more of the statistical forecasting models to apply to the input data,
   a Simple Prediction soft button for allowing the user to automatically generate a plurality of forecasts by processing the data using one or more of the statistical forecasting models,
simultaneously displaying a pane element along with the navigation pane element and the plurality of navigation soft buttons information associated with one or more of the navigation soft buttons and one or more of the plurality of forecasting steps, and
generating a first user interface when the Model Selection (MS) soft button of the navigation pane element is actuated by the user, wherein the first user interface includes first and second horizontally aligned MS top pane regions and an MS bottom pane region disposed vertically below the first and second MS top pane regions, wherein the first MS top pane region includes for display on the first user interface a plurality of drop down menu elements including
   a second Target drop down menu element for allowing a user to select the input data to be processed,
   a Model drop down menu element for allowing a user to select one or more statistical forecasting models to apply to the input data selected in the second Target drop down menu element so as to generate predictions based on the input data, a Display Model drop down menu element for allowing a user to select a type of statistical forecasting model to apply to the input data and to display in the bottom pane region,
   a Rolling Window Schema soft button horizontally aligned with the Display Model drop down menu element that allows the user, when actuated, to display a first action box for allowing the user to enter one or more selections, and
   a Forecast Period field box disposed vertically below the plurality of drop down menu elements, wherein the field box allows the user to enter a selected number of time periods within the field box.

33. An intelligent forecasting system, comprising
one or more sources of financial and non-financial data,
an electronic device having
   a processor for processing one or more of the financial and non-financial data to form input data,
   a storage element for storing the input data, and
   a user interface generator for generating a plurality of user interfaces having one or more window elements that display selected portions of the processed input data, wherein the window element of one or more of the plurality of user interfaces includes:
   a persistent navigation pane element formed along a left side of the window element having a plurality of vertically stacked actuatable navigation soft buttons for accessing one or more portions of an intelligent forecasting sequence having a plurality of forecasting steps, wherein the plurality of navigation soft buttons includes two or more of:
   a Data Upload soft button for allowing a user, when actuated, to upload one or more files having at least a portion of the input data,
   an Outlier Treatment soft button for allowing the user, when actuated, to process at least a portion of the input data by applying thereto one or more statistical processing models to detect one or more outliers in the input data having an outlier value associated therewith and to replace one or more of the outlier values with a replacement value, a Model Selection soft button for allowing the user, when actuated, to select one or more statistical forecasting models to apply to the input data, a Signal Explorer soft button for allowing the user, when actuated, to select one or more signal transformation methods for processing and transforming the input data, a Signal Selection soft button for allowing the user, when actuated, to select one or more signals to incorporate into the input data, a Model Prediction soft button for allowing the user, when selected, to select one or more of the statistical forecasting models to apply to the input data, a Simple Prediction soft button for allowing the user to automatically generate a plurality of forecasts by processing the data using one or more of the statistical forecasting models, and a pane element for simultaneously displaying along with the navigation pane element and the plurality of navigation soft buttons information associated with one or more of the navigation soft buttons and one or more of the plurality of forecasting steps, wherein when the Signal Explorer (SE) soft button of the navigation pane element is actuated by the user, the user interface generator generates a first user interface that includes first and second horizontally adjacent and aligned SE top pane regions and an SE bottom pane region disposed vertically below the first and second SE top pane regions, wherein the first SE top pane region includes for display on the first user interface a plurality of drop down menu elements including a third Target drop down menu element for allowing the user to select the input data to be processed, wherein the input data also includes a plurality of signals, a Method drop down menu element for allowing the user to select one or more correlation methods to apply to the input data selected in the third Target drop down menu element to determine a value indicative of a strength of the correlation between the plurality of signals in the input data, a Signal Transformation soft button disposed vertically below the Method drop down menu element for allowing the user, when actuated, to generate a second action box that allows the user to enter one or more parameters associated with a signal transformation of the plurality of signals, and a Returned Signal field box disposed vertically below the Signal Transformation soft button for allowing the user to enter a number of signals for processing by the one or more correlation methods selected via the Method drop down menu element.

34. A computer implemented method, comprising receiving one or more sources of financial and non-financial data to form input data, processing and storing the input data, generating a plurality of user interfaces having one or more window elements that display selected portions of the input data, wherein the window element of one or more of the plurality of user interfaces includes:

a persistent navigation pane element formed along a left side of the window element having a plurality of vertically stacked actuatable navigation soft buttons for accessing one or more portions of an intelligent forecasting sequence having a plurality of forecasting steps, wherein the plurality of navigation soft buttons includes two or more of:

a Data Upload soft button for allowing a user, when actuated, to upload one or more files having at least a portion of the input data, an Outlier Treatment soft button for allowing the user, when actuated, to process at least a portion of the input data by applying thereto one or more statistical processing models to detect one or more outliers in the input data having an outlier value associated therewith and to replace one or more of the outlier values with a replacement value, a Model Selection soft button for allowing the user, when actuated, to select one or more statistical forecasting models to apply to the input data, a Signal Explorer soft button for allowing the user, when actuated, to select one or more signal transformation methods for processing and transforming the input data, a Signal Selection soft button for allowing the user, when actuated, to select one or more signals to incorporate into the input data, a Model Prediction soft button for allowing the user, when selected, to select one or more of the statistical forecasting models to apply to the input data, a Simple Prediction soft button for allowing the user to automatically generate a plurality of forecasts by processing the data using one or more of the statistical forecasting models, simultaneously displaying a pane element along with the navigation pane element and the plurality of navigation soft buttons information associated with one or more of the navigation soft buttons and one or more of the plurality of forecasting steps, generating a first user interface when the Signal Explorer (SE) soft button of the navigation pane element is actuated by the user, wherein the first user interface includes first and second horizontally adjacent and aligned SE top pane regions and an SE bottom pane region disposed vertically below the first and second SE top pane regions, wherein the first SE top pane region includes for display on the first user interface a plurality of drop down menu elements including a third Target drop down menu element for allowing the user to select the input data to be processed, wherein the input data also includes a plurality of signals, a Method drop down menu element for allowing the user to select one or more correlation methods to apply to the input data selected in the third Target drop down menu element to determine a value indicative of a strength of the correlation between the plurality of signals in the input data, a Signal Transformation soft button disposed vertically below the Method drop down menu element for allowing the user, when actuated, to generate a second action box that allows the user to enter one or more parameters associated with a signal transformation of the plurality of signals, and a Returned Signal field box disposed vertically below the Signal Transformation soft button for allowing the user to enter a number of signals for processing by the one or more correlation methods selected via the Method drop down menu element.

* * * * *